United States Patent
Goldstein et al.

(10) Patent No.: US 12,183,341 B2
(45) Date of Patent: *Dec. 31, 2024

(54) PERSONALIZED SOUND MANAGEMENT AND METHOD

(71) Applicant: ST CasesTech, LLC, Delray Beach, FL (US)

(72) Inventors: Steven Goldstein, Delray Beach, FL (US); John P. Keady, Fairfax Station, VA (US)

(73) Assignee: ST CasesTech, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,606

(22) Filed: Feb. 7, 2023

(65) Prior Publication Data

US 2023/0197080 A1    Jun. 22, 2023

Related U.S. Application Data

(63) Continuation of application No. 17/736,180, filed on May 4, 2022, now Pat. No. 11,610,587, which is a
(Continued)

(51) Int. Cl.
*H04R 5/04*    (2006.01)
*B25F 5/00*    (2006.01)
(Continued)

(52) U.S. Cl.
CPC ............... *G10L 15/22* (2013.01); *B25F 5/00* (2013.01); *G06F 21/10* (2013.01); *G06Q 30/012* (2013.01);
(Continued)

(58) Field of Classification Search
CPC .... H04R 25/30; H04R 25/305; H04R 25/453; H04R 25/505; H04R 25/70; H04R 5/04; G06F 17/30743; G06F 17/3074
(Continued)

(56) References Cited

U.S. PATENT DOCUMENTS 2,803,308 A    8/1957   Mattia
3,028,454 A    4/1962   Kohorn
(Continued)

FOREIGN PATENT DOCUMENTS

AU    2006200446    2/2006
CA       2215764    11/1996
(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Xu Mei
(74) *Attorney, Agent, or Firm* — Peter A. Chiabotti; Akerman LLP

(57) ABSTRACT

A personalized sound management system for an acoustic space includes at least one transducer, a data communication system, one or more processors operatively coupled to the data communication system and the at least one transducer, and a medium coupled to the one or more processors. The processors access a database of sonic signatures and display a plurality of personalized sound management applications that perform at least one or more tasks among identifying a sonic signature, calculating a sound pressure level, storing metadata related to a sonic signature, monitoring sound pressure level dosage levels, switching to an ear canal
(Continued)

microphone in a noisy environment, recording a user's voice, storing the user's voice in a memory of an earpiece device, or storing the user's voice in a memory of a server system, or converting received text received in texts or emails to voice using text to speech conversion. Other embodiments are disclosed.

20 Claims, 15 Drawing Sheets

Related U.S. Application Data continuation of application No. 17/203,731, filed on Mar. 16, 2021, now Pat. No. 11,443,746, which is a continuation of application No. 16/671,689, filed on Nov. 1, 2019, now Pat. No. 10,997,978, which is a continuation of application No. 14/846,994, filed on Sep. 7, 2015, now Pat. No. 10,529,325, which is a continuation of application No. 12/560,097, filed on Sep. 15, 2009, now Pat. No. 9,129,291.

(60) Provisional application No. 61/098,914, filed on Sep. 22, 2008.

(51) Int. Cl.
*G05B 19/042* (2006.01)
*G06F 3/16* (2006.01)
*G06F 21/10* (2013.01)
*G06Q 30/012* (2023.01)
*G06Q 30/018* (2023.01)
*G06Q 30/02* (2023.01)
*G06Q 30/0601* (2023.01)
*G06Q 40/08* (2012.01)
*G10L 13/00* (2006.01)
*G10L 15/22* (2006.01)
*G10L 25/84* (2013.01)
*H03G 3/32* (2006.01)
*H04R 1/10* (2006.01)
*H04R 25/00* (2006.01)

(52) U.S. Cl.
CPC ........... *G06Q 30/018* (2013.01); *G06Q 30/02* (2013.01); *G06Q 30/0281* (2013.01); *G06Q 30/0601* (2013.01); *G06Q 30/0621* (2013.01); *G06Q 40/08* (2013.01); *G10L 13/00* (2013.01); *G10L 25/84* (2013.01); *H03G 3/32* (2013.01); *H04R 1/1083* (2013.01); *H04R 5/04* (2013.01); *H04R 25/453* (2013.01); *H04R 25/505* (2013.01); *G05B 19/042* (2013.01); *G06F 3/16* (2013.01); *G06F 2221/2137* (2013.01); *H04R 2460/17* (2013.01)

(58) Field of Classification Search
USPC .................................. 381/57, 72, 74; 700/94
See application file for complete search history.

(56) References Cited

U.S. PATENT DOCUMENTS

| | | |
|---|---|---|
| 3,729,598 A | 4/1973 | Tegt |
| 3,876,843 A | 4/1975 | Moen |
| 4,041,256 A | 8/1977 | Ohta |
| 4,054,749 A | 10/1977 | Suzuki et al. |
| 4,088,849 A | 5/1978 | Usami et al. |
| 4,533,795 A | 8/1985 | Baumhauer |
| 4,555,677 A | 11/1985 | Beesley |
| 4,596,902 A | 6/1986 | Gilman |
| 4,941,187 A | 7/1990 | Slater |
| 4,947,440 A | 8/1990 | Bateman et al. |
| 5,002,151 A | 3/1991 | Oliveira et al. |
| 5,033,090 A | 7/1991 | Weinrich |
| 5,204,906 A | 4/1993 | Nohara |
| 5,208,867 A | 5/1993 | Stites, III |
| 5,251,263 A | 10/1993 | Andrea |
| 5,259,033 A | 11/1993 | Goodings |
| 5,267,321 A | 11/1993 | Langberg |
| 5,276,740 A | 1/1994 | Inanaga et al. |
| 5,298,692 A | 3/1994 | Ikeda |
| 5,317,273 A | 5/1994 | Hanson |
| 5,327,506 A | 7/1994 | Stites |
| 5,345,430 A | 9/1994 | Moe |
| 5,390,254 A | 2/1995 | Adelman |
| 5,430,826 A | 7/1995 | Webster |
| 5,473,684 A | 12/1995 | Bartlett |
| 5,479,522 A | 12/1995 | Lindemann |
| 5,524,056 A | 6/1996 | Killion et al. |
| 5,526,819 A | 6/1996 | Martin |
| 5,528,739 A | 6/1996 | Lucas et al. |
| 5,539,831 A | 7/1996 | Harley |
| 5,550,923 A | 8/1996 | Hotvet |
| 5,557,659 A | 9/1996 | Hyde-Thomson |
| 5,577,511 A | 11/1996 | Killion |
| 5,632,002 A | 5/1997 | Hashimoto et al. |
| 5,649,055 A | 7/1997 | Gupta |
| 5,692,059 A | 11/1997 | Kruger |
| 5,764,778 A | 6/1998 | Zurek |
| 5,787,187 A | 7/1998 | Bouchard |
| 5,799,273 A | 8/1998 | Mitchell et al. |
| 5,887,070 A | 3/1999 | Iseberg |
| 5,903,868 A | 5/1999 | Yuen et al. |
| 5,909,667 A | 6/1999 | Leontiades et al. |
| 5,920,835 A | 7/1999 | Huzenlaub et al. |
| 5,923,624 A | 7/1999 | Groeger |
| 5,933,506 A | 8/1999 | Aoki |
| 5,933,510 A | 8/1999 | Bryant |
| 5,937,070 A | 8/1999 | Todter |
| 5,946,050 A | 8/1999 | Wolff |
| 5,953,392 A | 9/1999 | Rhie et al. |
| 5,956,681 A | 9/1999 | Yamakita |
| 6,005,525 A | 12/1999 | Kivela |
| 6,021,205 A | 2/2000 | Yamada |
| 6,021,207 A | 2/2000 | Puthuff et al. |
| 6,021,325 A | 2/2000 | Hall |
| 6,028,514 A | 2/2000 | Lemelson |
| 6,056,698 A | 5/2000 | Iseberg |
| 6,069,963 A | 5/2000 | Martin |
| 6,072,645 A | 6/2000 | Sprague |
| 6,094,494 A | 6/2000 | Haroldson |
| 6,094,492 A | 7/2000 | Boesen |
| 6,101,256 A | 8/2000 | Steelman |
| 6,118,877 A | 9/2000 | Lindemann |
| 6,118,878 A | 9/2000 | Jones |
| 6,141,426 A | 10/2000 | Stobba |
| 6,151,571 A | 11/2000 | Pertrushin |
| 6,160,758 A | 12/2000 | Spiesberger |
| 6,163,338 A | 12/2000 | Johnson et al. |
| 6,163,508 A | 12/2000 | Kim et al. |
| 6,173,259 B1 | 1/2001 | Bijl |
| 6,175,633 B1 | 1/2001 | Morrill |
| 6,198,971 B1 | 3/2001 | Leysieffer |
| 6,226,389 B1 | 5/2001 | Lemelson et al. |
| 6,263,147 B1 | 7/2001 | Tognazzini |
| 6,269,161 B1 | 7/2001 | McLaughlin |
| 6,298,323 B1 | 10/2001 | Kaemmerer |
| 6,308,158 B1 | 10/2001 | Kuhnen et al. |
| 6,311,092 B1 | 10/2001 | Yamada |
| 6,338,038 B1 | 1/2002 | Hanson |
| 6,359,993 B2 | 3/2002 | Brimhall |
| 6,400,652 B1 | 6/2002 | Goldberg et al. |
| 6,405,165 B1 | 6/2002 | Blum et al. |
| 6,408,272 B1 | 6/2002 | White |
| 6,415,034 B1 | 7/2002 | Hietanen |
| 6,424,721 B1 | 7/2002 | Hohn |
| 6,445,799 B1 | 9/2002 | Taenzer |
| 6,456,975 B1 | 9/2002 | Chang |
| 6,463,413 B1 | 10/2002 | Applebaum |
| 6,475,163 B1 | 11/2002 | Smits |

(56) References Cited

U.S. PATENT DOCUMENTS

| | | |
|---|---|---|
| 6,483,899 B2 | 11/2002 | Agraharam et al. |
| 6,490,557 B1 | 12/2002 | Jeppesen |
| 6,513,621 B1 | 2/2003 | Deslauriers et al. |
| 6,526,148 B1 | 2/2003 | Jourjine |
| 6,526,381 B1 | 2/2003 | Wilson |
| 6,554,761 B1 | 4/2003 | Puria |
| 6,567,524 B1 | 5/2003 | Svean et al. |
| 6,593,848 B1 | 7/2003 | Atkins |
| 6,597,787 B1 | 7/2003 | Lindgren |
| 6,606,598 B1 | 8/2003 | Holthouse |
| 6,639,987 B2 | 10/2003 | McIntosh |
| 6,647,123 B2 | 11/2003 | Kandel |
| 6,647,368 B2 | 11/2003 | Nemirovski |
| 6,648,368 B2 | 11/2003 | Nemirovski |
| RE38,351 E | 12/2003 | Iseberg |
| 6,658,122 B1 | 12/2003 | Westermann |
| 6,661,886 B1 | 12/2003 | Huart |
| 6,661,901 B1 | 12/2003 | Svean et al. |
| 6,671,379 B2 | 12/2003 | Nemirovski |
| 6,671,643 B2 | 12/2003 | Kachler |
| 6,674,862 B1 | 1/2004 | Magilen |
| 6,687,339 B2 | 2/2004 | Martin |
| 6,687,377 B2 | 2/2004 | Voix |
| 6,687,671 B2 | 2/2004 | Gudorf et al. |
| 6,717,991 B1 | 4/2004 | Gustafsson |
| 6,725,194 B1 | 4/2004 | Bartosik et al. |
| 6,728,385 B2 | 4/2004 | Kvaloy et al. |
| 6,738,485 B1 | 5/2004 | Boesen |
| 6,748,238 B1 | 6/2004 | Lau |
| 6,754,359 B1 | 6/2004 | Svean et al. |
| 6,775,206 B2 | 8/2004 | Karhu |
| 6,785,394 B1 | 8/2004 | Olsen |
| 6,738,482 B1 | 9/2004 | Jaber |
| 6,789,060 B1 | 9/2004 | Wolfe et al. |
| 6,804,638 B2 | 10/2004 | Fiedler |
| 6,804,643 B1 | 10/2004 | Kiss |
| 6,837,857 B2 | 1/2005 | Stirnemann |
| 6,879,692 B2 | 4/2005 | Nielsen |
| 6,910,013 B2 | 6/2005 | Allegro |
| 6,912,289 B2 | 6/2005 | Vonlanthen |
| 6,941,161 B1 | 9/2005 | Bobisuthi |
| 6,987,992 B2 | 1/2006 | Hundal |
| 7,003,099 B1 | 2/2006 | Zhang |
| 7,003,123 B2 | 2/2006 | Kanevsky |
| 7,020,297 B2 | 3/2006 | Fang |
| 7,037,274 B2 | 5/2006 | Thornton |
| 7,039,195 B1 | 5/2006 | Svean |
| 7,039,585 B2 | 5/2006 | Wilmot |
| 7,043,037 B2 | 5/2006 | Lichtblau |
| 7,050,592 B1 | 5/2006 | Iseberg |
| 7,050,966 B2 | 5/2006 | Schneider |
| 7,050,971 B1 | 5/2006 | Kaufholz |
| 7,072,482 B2 | 7/2006 | Van Doorn et al. |
| 7,082,393 B2 | 7/2006 | Lahr |
| 7,092,532 B2 | 8/2006 | Luo |
| 7,103,188 B1 | 9/2006 | Jones |
| 7,107,109 B1 | 9/2006 | Nathan et al. |
| 7,110,554 B2 | 9/2006 | Brennan |
| 7,130,437 B2 | 10/2006 | Stonikas et al. |
| 7,158,933 B2 | 1/2007 | Balan |
| 7,162,041 B2 | 1/2007 | Haapapuro |
| 7,174,022 B1 | 2/2007 | Zhan |
| 7,177,433 B2 | 2/2007 | Sibbald |
| 7,181,020 B1 | 2/2007 | Riley |
| 7,181,030 B2 | 2/2007 | Rasmussen |
| 7,209,569 B2 | 4/2007 | Boesen |
| 7,215,766 B2 | 5/2007 | Wurtz |
| 7,223,245 B2 | 5/2007 | Zoth |
| 7,246,058 B2 | 7/2007 | Burnett |
| 7,277,722 B2 | 10/2007 | Rosenzweig |
| 7,280,849 B1 | 10/2007 | Bailey |
| 7,312,699 B2 | 12/2007 | Chornenky |
| 7,346,504 B2 | 3/2008 | Liu |
| 7,359,504 B1 | 4/2008 | Reuss |
| 7,383,178 B2 | 6/2008 | Visser |
| 7,395,090 B2 | 7/2008 | Alden |
| 7,430,299 B2 | 9/2008 | Armstrong et al. |
| 7,430,300 B2 | 9/2008 | Vosburgh |
| 7,433,463 B2 | 10/2008 | Alves |
| 7,433,714 B2 | 10/2008 | Howard et al. |
| 7,444,353 B1 | 10/2008 | Chen |
| 7,450,730 B2 | 11/2008 | Bertg et al. |
| 7,464,029 B2 | 12/2008 | Visser |
| 7,477,754 B2 | 1/2009 | Rasmussen |
| 7,477,756 B2 | 1/2009 | Wickstrom et al. |
| 7,477,922 B2 | 1/2009 | Lewis |
| 7,502,484 B2 | 3/2009 | Ngia |
| 7,512,245 B2 | 3/2009 | Rasmussen |
| 7,519,193 B2 | 4/2009 | Fretz |
| 7,529,379 B2 | 5/2009 | Zurek |
| 7,532,734 B2 | 5/2009 | Pham |
| 7,536,006 B2 | 5/2009 | Patel |
| 7,562,020 B2 | 7/2009 | Le et al. |
| 7,574,917 B2 | 8/2009 | Von Dach |
| 7,590,254 B2 | 9/2009 | Olsen |
| 7,617,099 B2 | 11/2009 | Yang |
| 7,623,823 B2 | 11/2009 | Zito |
| 7,634,094 B2 | 12/2009 | Reber |
| 7,659,827 B2 | 2/2010 | Gunderson |
| 7,680,465 B2 | 3/2010 | Issa |
| 7,702,482 B2 | 4/2010 | Graepel et al. |
| 7,710,654 B2 | 5/2010 | Ashkenazi |
| 7,715,568 B2 | 5/2010 | Nakano |
| 7,715,577 B2 | 5/2010 | Allen |
| 7,729,912 B1 | 6/2010 | Bacchiani |
| 7,756,281 B2 | 7/2010 | Goldstein et al. |
| 7,756,283 B2 | 7/2010 | Bramslow |
| 7,756,285 B2 | 7/2010 | Sjursen et al. |
| 7,773,743 B2 | 8/2010 | Stokes |
| 7,773,759 B2 | 8/2010 | Alves |
| 7,773,763 B2 | 8/2010 | Pedersen |
| 7,774,202 B2 | 8/2010 | Spengler |
| 7,778,434 B2 | 8/2010 | Juneau et al. |
| 7,801,318 B2 | 9/2010 | Bartel |
| 7,801,726 B2 | 9/2010 | Ariu |
| 7,804,974 B2 | 9/2010 | Paludan-Muller |
| 7,813,520 B2 | 10/2010 | Dach |
| 7,817,808 B2 | 10/2010 | Konchitsky |
| 7,844,070 B2 | 11/2010 | Abolfathi |
| 7,844,248 B2 | 11/2010 | Sotack |
| 7,853,031 B2 | 12/2010 | Hamacher |
| 7,861,723 B2 | 1/2011 | Dedrick |
| 7,869,606 B2 | 1/2011 | Fichtl |
| 7,903,825 B1 | 3/2011 | Melanson |
| 7,903,826 B2 | 3/2011 | Boersma |
| 7,903,833 B2 | 3/2011 | Goldberg |
| 7,920,557 B2 | 4/2011 | Moote |
| 7,925,007 B2 | 4/2011 | Stokes |
| 7,929,713 B2 | 4/2011 | Victorian |
| 7,933,423 B2 | 4/2011 | Baekgaard Jensen et al. |
| 7,936,885 B2 | 5/2011 | Frank |
| 7,953,241 B2 | 5/2011 | Jorgensen |
| 7,983,433 B2 | 7/2011 | Nemirovski |
| 7,983,907 B2 | 7/2011 | Visser |
| 7,986,791 B2 | 7/2011 | Bostick |
| 7,986,802 B2 | 7/2011 | Ziller |
| 7,995,773 B2 | 8/2011 | Mao |
| 8,014,553 B2 | 9/2011 | Radivojevic et al. |
| 8,018,337 B2 | 9/2011 | Jones |
| 8,019,091 B2 | 9/2011 | Burnett |
| 8,027,481 B2 | 9/2011 | Beard |
| 8,045,840 B2 | 10/2011 | Murata et al. |
| 8,047,207 B2 | 11/2011 | Perez |
| 8,050,143 B2 | 11/2011 | Nicholas |
| 8,068,627 B2 | 11/2011 | Zhan |
| 8,077,872 B2 | 12/2011 | Dyer |
| 8,081,780 B2 | 12/2011 | Goldstein |
| 8,085,943 B2 | 12/2011 | Bizjak |
| 8,086,093 B2 | 12/2011 | Stuckman |
| 8,111,839 B2 | 2/2012 | Goldstein |
| 8,111,840 B2 | 2/2012 | Haulick |
| 8,111,849 B2 | 2/2012 | Tateno |
| 8,116,472 B2 | 2/2012 | Mizuno |
| 8,116,489 B2 | 2/2012 | Mejia |

(56) References Cited

U.S. PATENT DOCUMENTS

| | | |
|---|---|---|
| 8,121,301 B2 | 2/2012 | Suzuki |
| 8,140,325 B2 | 3/2012 | Kanevsky |
| 8,144,881 B2 | 3/2012 | Crockett |
| 8,144,891 B2 | 3/2012 | Her |
| 8,150,044 B2 | 4/2012 | Goldstein |
| 8,150,084 B2 | 4/2012 | Jessen |
| 8,160,261 B2 | 4/2012 | Schulein |
| 8,160,273 B2 | 4/2012 | Visser |
| 8,162,846 B2 | 4/2012 | Epley |
| 8,184,823 B2 | 5/2012 | Itabashi |
| 8,186,478 B1 | 5/2012 | Grason |
| 8,189,803 B2 | 5/2012 | Bergeron |
| 8,194,864 B2 | 6/2012 | Goldstein et al. |
| 8,194,865 B2 | 6/2012 | Goldstein |
| 8,199,919 B2 | 6/2012 | Goldstein et al. |
| 8,199,942 B2 | 6/2012 | Mao |
| 8,204,435 B2 | 6/2012 | Seshadri |
| 8,208,609 B2 | 6/2012 | Harris |
| 8,208,644 B2 | 6/2012 | Goldstein et al. |
| 8,208,652 B2 | 6/2012 | Keady |
| 8,213,629 B2 | 7/2012 | Goldstein |
| 8,218,784 B2 | 7/2012 | Schulein |
| 8,221,861 B2 | 7/2012 | Keady |
| 8,229,128 B2 | 7/2012 | Keady |
| 8,229,148 B2 | 7/2012 | Rasmssen |
| 8,229,513 B2 | 7/2012 | Ibe |
| 8,251,925 B2 | 8/2012 | Staab et al. |
| 8,254,586 B2 | 8/2012 | Voix |
| 8,254,591 B2 | 8/2012 | Goldstein |
| 8,270,629 B2 | 9/2012 | Bothra |
| 8,270,634 B2 | 9/2012 | Harney |
| 8,306,235 B2 | 11/2012 | Mahowald |
| 8,312,960 B2 | 11/2012 | Keady |
| 8,322,222 B2 | 12/2012 | Goldberg |
| 8,340,309 B2 | 12/2012 | Burnett |
| 8,351,634 B2 | 1/2013 | Khenkin |
| 8,369,901 B2 | 2/2013 | Haulick |
| 8,374,361 B2 | 2/2013 | Moon |
| 8,385,560 B2 | 2/2013 | Solbeck |
| 8,391,534 B2 | 3/2013 | Ambrose et al. |
| 8,401,200 B2 | 3/2013 | Tiscareno |
| 8,411,880 B2 | 4/2013 | Wang |
| 8,437,492 B2 | 5/2013 | Goldstein et al. |
| 8,447,370 B2 | 5/2013 | Ueda |
| 8,462,969 B2 | 6/2013 | Claussen |
| 8,462,974 B2 | 6/2013 | Jeong |
| 8,472,616 B1 | 6/2013 | Jiang |
| 8,477,955 B2 | 7/2013 | Engle |
| 8,493,204 B2 | 7/2013 | Wong et al. |
| 8,515,089 B2 | 8/2013 | Nicholson |
| 8,522,916 B2 | 9/2013 | Keady |
| 8,548,181 B2 | 10/2013 | Kraemer |
| 8,550,206 B2 | 10/2013 | Keady et al. |
| 8,554,350 B2 | 10/2013 | Keady et al. |
| 8,577,062 B2 | 11/2013 | Goldstein |
| 8,594,341 B2 | 11/2013 | Rothschild |
| 8,600,067 B2 | 12/2013 | Usher et al. |
| 8,611,548 B2 | 12/2013 | Bizjak |
| 8,611,560 B2 | 12/2013 | Goldstein |
| 8,625,818 B2 | 1/2014 | Stultz |
| 8,625,819 B2 | 1/2014 | Goldstein |
| 8,631,801 B2 | 1/2014 | Keady |
| 8,649,540 B2 | 2/2014 | Killion et al. |
| 8,652,040 B2 | 2/2014 | LeBoeuf |
| 8,657,064 B2 | 2/2014 | Staab et al. |
| 8,678,011 B2 | 3/2014 | Goldstein et al. |
| 8,693,704 B2 | 4/2014 | Kim |
| 8,718,288 B2 | 5/2014 | Woods |
| 8,718,305 B2 | 5/2014 | Usher |
| 8,718,313 B2 | 5/2014 | Keady |
| 8,744,091 B2 | 6/2014 | Chen et al. |
| 8,750,295 B2 | 6/2014 | Liron |
| 8,774,433 B2 | 7/2014 | Goldstein |
| 8,774,435 B2 | 7/2014 | Ambrose et al. |
| 8,792,669 B2 | 7/2014 | Harsch |
| 8,798,278 B2 | 8/2014 | Isabelle |
| 8,798,279 B2 | 8/2014 | Ranta |
| 8,798,289 B1 | 8/2014 | Every |
| 8,804,974 B1 | 8/2014 | Melanson |
| 8,848,939 B2 | 9/2014 | Keady et al. |
| 8,851,372 B2 | 10/2014 | Zhou |
| 8,855,343 B2 | 10/2014 | Usher |
| 8,903,113 B2 | 12/2014 | Gebert |
| 8,917,880 B2 | 12/2014 | Goldstein et al. |
| 8,917,892 B2 | 12/2014 | Poe |
| 8,917,894 B2 | 12/2014 | Goldstein |
| 8,942,370 B2 | 1/2015 | Li |
| 8,942,405 B2 | 1/2015 | Jones et al. |
| 8,948,428 B2 | 2/2015 | Kates |
| 8,983,081 B2 | 3/2015 | Bayley |
| 8,992,710 B2 | 3/2015 | Keady |
| 9,002,023 B2 | 4/2015 | Gauger |
| 9,013,351 B2 | 4/2015 | Park |
| 9,037,458 B2 | 5/2015 | Park et al. |
| 9,053,697 B2 | 6/2015 | Park |
| 9,076,427 B2 | 7/2015 | Alderson |
| 9,112,701 B2 | 8/2015 | Sano |
| 9,113,240 B2 | 8/2015 | Ramakrishman |
| 9,113,267 B2 | 8/2015 | Usher et al. |
| 9,123,323 B2 | 9/2015 | Keady |
| 9,123,343 B2 | 9/2015 | Kurki-Suonio |
| 9,129,291 B2 * | 9/2015 | Goldstein .......... G06Q 30/0621 |
| 9,135,797 B2 | 9/2015 | Couper et al. |
| 9,135,809 B2 | 9/2015 | Chang |
| 9,137,597 B2 | 9/2015 | Usher |
| 9,138,353 B2 | 9/2015 | Keady |
| 9,142,207 B2 | 9/2015 | Hendrix |
| 9,165,567 B2 | 10/2015 | Visser |
| 9,185,481 B2 | 11/2015 | Goldstein et al. |
| 9,191,732 B2 | 11/2015 | Wurtz |
| 9,191,740 B2 | 11/2015 | McIntosh |
| 9,196,247 B2 | 11/2015 | Harada |
| 9,216,237 B2 | 12/2015 | Keady |
| 9,288,592 B2 | 3/2016 | Basseas |
| 9,338,568 B2 | 5/2016 | van Hal |
| 9,357,288 B2 | 5/2016 | Goldstein |
| 9,369,814 B2 | 6/2016 | Victorian |
| 9,445,183 B2 | 9/2016 | Dahl |
| 9,462,100 B2 | 10/2016 | Usher |
| 9,491,542 B2 | 11/2016 | Usher |
| 9,497,423 B2 | 11/2016 | Moberly |
| 9,539,147 B2 | 1/2017 | Keady et al. |
| 9,628,896 B2 | 4/2017 | Ichimura |
| 9,653,869 B1 | 5/2017 | Hersman |
| 9,684,778 B2 | 6/2017 | Tharappel |
| 9,685,921 B2 | 6/2017 | Smith |
| 9,757,069 B2 | 9/2017 | Keady et al. |
| 9,763,003 B2 | 9/2017 | Usher |
| 9,779,716 B2 | 10/2017 | Gadonniex |
| 9,781,530 B2 | 10/2017 | Usher et al. |
| 9,843,854 B2 | 12/2017 | Keady |
| 9,894,452 B1 | 2/2018 | Termeulen |
| 9,943,185 B2 | 4/2018 | Chen |
| 10,012,529 B2 | 7/2018 | Goldstein et al. |
| 10,045,107 B2 | 8/2018 | Kirsch et al. |
| 10,142,332 B2 | 11/2018 | Ravindran |
| 10,190,904 B2 | 1/2019 | Goldstein et al. |
| 10,284,939 B2 | 5/2019 | Radin |
| 10,297,246 B2 | 5/2019 | Asada |
| 10,413,197 B2 | 9/2019 | LeBoeuf |
| 10,506,320 B1 | 12/2019 | Lott |
| 10,529,325 B2 * | 1/2020 | Goldstein ................ H04R 5/04 |
| 10,709,339 B1 | 7/2020 | Lusted |
| 10,760,948 B2 | 9/2020 | Goldstein |
| 10,917,711 B2 | 2/2021 | Higgins |
| 10,970,375 B2 | 4/2021 | Shila |
| 10,997,978 B2 * | 5/2021 | Goldstein .............. G06Q 30/02 |
| 11,006,198 B2 | 5/2021 | Lott |
| 11,012,770 B2 | 5/2021 | Hatfield et al. |
| 11,051,704 B1 | 7/2021 | Tran |
| 11,115,750 B2 | 9/2021 | Monsarrant-Chanon |
| 11,122,357 B2 | 9/2021 | Burnett |
| 11,172,298 B2 | 11/2021 | Carrigan |
| 11,277,700 B2 | 3/2022 | Goldstein |

(56) References Cited

U.S. PATENT DOCUMENTS

| | | | |
|---|---|---|---|
| 11,294,619 B2 | 4/2022 | Usher et al. | |
| 11,383,158 B2 | 7/2022 | Bonanno | |
| 11,443,746 B2 * | 9/2022 | Goldstein | G10L 25/84 |
| 11,610,587 B2 * | 3/2023 | Goldstein | G06Q 40/08 |
| 2001/0041559 A1 | 11/2001 | Salabaschew | |
| 2001/0046304 A1 | 11/2001 | Rast | |
| 2002/0003889 A1 | 1/2002 | Fischer | |
| 2002/0009203 A1 | 1/2002 | Erten | |
| 2002/0026311 A1 | 2/2002 | Okitsu | |
| 2002/0057817 A1 | 5/2002 | Darbut | |
| 2002/0069056 A1 | 6/2002 | Nofsinger | |
| 2002/0076057 A1 | 6/2002 | Voix | |
| 2002/0076059 A1 | 6/2002 | Joynes | |
| 2002/0085690 A1 | 7/2002 | Davidson et al. | |
| 2002/0098878 A1 | 7/2002 | Mooney | |
| 2002/0106091 A1 | 8/2002 | Furst et al. | |
| 2002/0111798 A1 | 8/2002 | Huang | |
| 2002/0118798 A1 | 8/2002 | Langhart et al. | |
| 2002/0123893 A1 | 9/2002 | Woodward | |
| 2002/0133513 A1 | 9/2002 | Townsend et al. | |
| 2002/0141599 A1 | 10/2002 | Trajkovic | |
| 2002/0141602 A1 | 10/2002 | Nemirovski | |
| 2002/0143534 A1 | 10/2002 | Hol | |
| 2002/0165719 A1 | 11/2002 | Wang | |
| 2002/0169596 A1 | 11/2002 | Brill et al. | |
| 2002/0169615 A1 | 11/2002 | Kruger et al. | |
| 2002/0191799 A1 | 12/2002 | Nordqvist | |
| 2002/0191952 A1 | 12/2002 | Fiore | |
| 2002/0193130 A1 | 12/2002 | Yang | |
| 2003/0008633 A1 | 1/2003 | Bartosik | |
| 2003/0026438 A1 | 2/2003 | Ray | |
| 2003/0033152 A1 | 2/2003 | Cameron | |
| 2003/0035551 A1 | 2/2003 | Light | |
| 2003/0048882 A1 | 3/2003 | Smith | |
| 2003/0050777 A1 | 3/2003 | Walker | |
| 2003/0055627 A1 | 3/2003 | Balan | |
| 2003/0061032 A1 | 3/2003 | Gonopolskiy | |
| 2003/0065512 A1 | 4/2003 | Walker | |
| 2003/0065620 A1 | 4/2003 | Gailey et al. | |
| 2003/0069002 A1 | 4/2003 | Hunter | |
| 2003/0083879 A1 | 5/2003 | Cyr et al. | |
| 2003/0083883 A1 | 5/2003 | Cyr et al. | |
| 2003/0110040 A1 | 6/2003 | Holland et al. | |
| 2003/0130016 A1 | 7/2003 | Matsuura | |
| 2003/0152359 A1 | 8/2003 | Kim | |
| 2003/0156725 A1 | 8/2003 | Boone | |
| 2003/0161097 A1 | 8/2003 | Le et al. | |
| 2003/0165246 A1 | 9/2003 | Kvaloy et al. | |
| 2003/0165319 A1 | 9/2003 | Barber | |
| 2003/0198357 A1 | 10/2003 | Schneider | |
| 2003/0198359 A1 | 10/2003 | Killion | |
| 2003/0200096 A1 | 10/2003 | Asai | |
| 2003/0228019 A1 | 12/2003 | Eichler | |
| 2003/0228023 A1 | 12/2003 | Burnett | |
| 2004/0008850 A1 | 1/2004 | Gustavsson | |
| 2004/0019482 A1 | 1/2004 | Holub | |
| 2004/0042103 A1 | 3/2004 | Mayer | |
| 2004/0047474 A1 | 3/2004 | Vries | |
| 2004/0047486 A1 | 3/2004 | Van Doorn | |
| 2004/0049385 A1 | 3/2004 | Lovance et al. | |
| 2004/0086138 A1 | 5/2004 | Kuth | |
| 2004/0088162 A1 | 5/2004 | He et al. | |
| 2004/0109579 A1 | 6/2004 | Izuchi | |
| 2004/0109668 A1 | 6/2004 | Stuckman | |
| 2004/0125965 A1 | 7/2004 | Alberth, Jr. et al. | |
| 2004/0128136 A1 | 7/2004 | Irani | |
| 2004/0133421 A1 | 7/2004 | Burnett | |
| 2004/0150717 A1 | 8/2004 | Page | |
| 2004/0160573 A1 | 8/2004 | Jannard | |
| 2004/0165742 A1 | 8/2004 | Shennib | |
| 2004/0185804 A1 | 9/2004 | Kanamori | |
| 2004/0190737 A1 | 9/2004 | Kuhnel et al. | |
| 2004/0196992 A1 | 10/2004 | Ryan | |
| 2004/0202333 A1 | 10/2004 | Csermak | |
| 2004/0202339 A1 | 10/2004 | O'Brien | |
| 2004/0202340 A1 | 10/2004 | Armstrong | |
| 2004/0203351 A1 | 10/2004 | Shearer et al. | |
| 2004/0252852 A1 | 12/2004 | Taenzer | |
| 2004/0258263 A1 | 12/2004 | Saxton et al. | |
| 2004/0264938 A1 | 12/2004 | Felder | |
| 2005/0008167 A1 | 1/2005 | Gleissner | |
| 2005/0028212 A1 | 2/2005 | Laronne | |
| 2005/0033384 A1 | 2/2005 | Sacha | |
| 2005/0033571 A1 | 2/2005 | Huang | |
| 2005/0047611 A1 | 3/2005 | Mao | |
| 2005/0049854 A1 | 3/2005 | Reding | |
| 2005/0058300 A1 | 3/2005 | Suzuki | |
| 2005/0058313 A1 | 3/2005 | Victorian | |
| 2005/0060142 A1 | 3/2005 | Visser | |
| 2005/0068171 A1 | 3/2005 | Kelliher | |
| 2005/0070337 A1 | 3/2005 | Byford | |
| 2005/0071158 A1 | 3/2005 | Byford | |
| 2005/0071626 A1 | 3/2005 | Bear | |
| 2005/0078838 A1 | 4/2005 | Simon | |
| 2005/0078842 A1 | 4/2005 | Vonlanthen | |
| 2005/0090295 A1 | 4/2005 | Ali | |
| 2005/0096764 A1 | 5/2005 | Weiser | |
| 2005/0096899 A1 | 5/2005 | Padhi et al. | |
| 2005/0102142 A1 | 5/2005 | Soufflet | |
| 2005/0114124 A1 | 5/2005 | Liu | |
| 2005/0123146 A1 | 6/2005 | Voix et al. | |
| 2005/0134710 A1 | 6/2005 | Nomura | |
| 2005/0163289 A1 | 7/2005 | Caspi et al. | |
| 2005/0175194 A1 | 8/2005 | Anderson | |
| 2005/0182620 A1 | 8/2005 | Kabi | |
| 2005/0207605 A1 | 9/2005 | Dehe | |
| 2005/0215907 A1 | 9/2005 | Toda | |
| 2005/0216531 A1 | 9/2005 | Blandford | |
| 2005/0222820 A1 | 10/2005 | Chung | |
| 2005/0227674 A1 | 10/2005 | Kopra | |
| 2005/0254640 A1 | 11/2005 | Ohki | |
| 2005/0254676 A1 | 11/2005 | Rass | |
| 2005/0258942 A1 | 11/2005 | Manasseh | |
| 2005/0260978 A1 | 11/2005 | Rader | |
| 2005/0264425 A1 | 12/2005 | Sato | |
| 2005/0281422 A1 | 12/2005 | Armstrong | |
| 2005/0281423 A1 | 12/2005 | Armstrong | |
| 2005/0283369 A1 | 12/2005 | Clauser et al. | |
| 2005/0288057 A1 | 12/2005 | Lai et al. | |
| 2006/0013410 A1 | 1/2006 | Wurtz | |
| 2006/0053007 A1 | 3/2006 | Niemisto | |
| 2006/0064037 A1 | 3/2006 | Shalon et al. | |
| 2006/0067551 A1 | 3/2006 | Cartwright et al. | |
| 2006/0074895 A1 | 4/2006 | Belknap | |
| 2006/0083387 A1 | 4/2006 | Emoto | |
| 2006/0083388 A1 | 4/2006 | Rothschild | |
| 2006/0083390 A1 | 4/2006 | Kaderavek | |
| 2006/0083395 A1 | 4/2006 | Allen et al. | |
| 2006/0088176 A1 | 4/2006 | Werner | |
| 2006/0092043 A1 | 5/2006 | Lagassey | |
| 2006/0095199 A1 | 5/2006 | Lagassey | |
| 2006/0116877 A1 | 6/2006 | Pickering | |
| 2006/0126821 A1 | 6/2006 | Sahashi | |
| 2006/0126865 A1 | 6/2006 | Blamey | |
| 2006/0140425 A1 | 6/2006 | Berg | |
| 2006/0147063 A1 | 7/2006 | Chen | |
| 2006/0153394 A1 | 7/2006 | Beasley | |
| 2006/0154642 A1 | 7/2006 | Scannell, Jr. | |
| 2006/0167687 A1 | 7/2006 | Kates | |
| 2006/0173563 A1 | 8/2006 | Borovitski | |
| 2006/0182287 A1 | 8/2006 | Schulein | |
| 2006/0184983 A1 | 8/2006 | Casey | |
| 2006/0188075 A1 | 8/2006 | Peterson | |
| 2006/0188105 A1 | 8/2006 | Baskerville | |
| 2006/0195322 A1 | 8/2006 | Broussard et al. | |
| 2006/0204014 A1 | 9/2006 | Isenberg et al. | |
| 2006/0233413 A1 | 10/2006 | Nam | |
| 2006/0241948 A1 | 10/2006 | Abrash | |
| 2006/0258325 A1 | 11/2006 | Tsutaichi | |
| 2006/0262935 A1 | 11/2006 | Goose | |
| 2006/0262938 A1 | 11/2006 | Gauger | |
| 2006/0262944 A1 | 11/2006 | Rasmussen et al. | |
| 2006/0264176 A1 | 11/2006 | Hong | |
| 2006/0274166 A1 | 12/2006 | Lee | |

(56) References Cited

U.S. PATENT DOCUMENTS

| | | |
|---|---|---|
| 2006/0285709 A1 | 12/2006 | Barthel |
| 2006/0287014 A1 | 12/2006 | Matsuura |
| 2007/0003090 A1 | 1/2007 | Anderson |
| 2007/0009122 A1 | 1/2007 | Hamacher |
| 2007/0009127 A1 | 1/2007 | Klemenz et al. |
| 2007/0014423 A1 | 1/2007 | Darbut et al. |
| 2007/0019817 A1 | 1/2007 | Siltmann |
| 2007/0021958 A1 | 1/2007 | Visser et al. |
| 2007/0036377 A1 | 2/2007 | Stirnemann |
| 2007/0043563 A1 | 2/2007 | Comerford et al. |
| 2007/0076896 A1 | 4/2007 | Hosaka |
| 2007/0086600 A1 | 4/2007 | Boesen |
| 2007/0092087 A1 | 4/2007 | Bothra |
| 2007/0100637 A1 | 5/2007 | McCune |
| 2007/0143820 A1 | 6/2007 | Pawlowski |
| 2007/0147635 A1 | 6/2007 | Dijkstra |
| 2007/0160243 A1 | 7/2007 | Dijkstra |
| 2007/0185601 A1 | 8/2007 | Lee |
| 2007/0189544 A1 | 8/2007 | Rosenberg |
| 2007/0194893 A1 | 8/2007 | Deyoe |
| 2007/0206825 A1 | 9/2007 | Thomasson |
| 2007/0223717 A1 | 9/2007 | Boersma |
| 2007/0225035 A1 | 9/2007 | Gauger |
| 2007/0230734 A1 | 10/2007 | Beard |
| 2007/0233487 A1 | 10/2007 | Cohen |
| 2007/0239294 A1 | 10/2007 | Brueckner |
| 2007/0253569 A1 | 11/2007 | Bose |
| 2007/0255435 A1 | 11/2007 | Cohen |
| 2007/0260460 A1 | 11/2007 | Hyatt |
| 2007/0274531 A1 | 11/2007 | Camp |
| 2007/0291953 A1 | 12/2007 | Ngia et al. |
| 2008/0037801 A1 | 2/2008 | Alves et al. |
| 2008/0063228 A1 | 3/2008 | Mejia |
| 2008/0069369 A1 | 3/2008 | Dyer |
| 2008/0091421 A1 | 4/2008 | Gustavsson |
| 2008/0101638 A1 | 5/2008 | Ziller |
| 2008/0107282 A1 | 5/2008 | Asada |
| 2008/0123866 A1 | 5/2008 | Rule |
| 2008/0130908 A1 | 6/2008 | Cohen |
| 2008/0137873 A1 | 6/2008 | Goldstein |
| 2008/0145032 A1 | 6/2008 | Lindroos |
| 2008/0152167 A1 | 6/2008 | Taenzer |
| 2008/0152169 A1 | 6/2008 | Asada |
| 2008/0159547 A1 | 7/2008 | Schuler |
| 2008/0162133 A1 | 7/2008 | Couper |
| 2008/0165988 A1 | 7/2008 | Terlizzi et al. |
| 2008/0175411 A1 | 7/2008 | Greve |
| 2008/0181419 A1 | 7/2008 | Goldstein |
| 2008/0201138 A1 | 8/2008 | Visser |
| 2008/0221880 A1 | 9/2008 | Cerra et al. |
| 2008/0240458 A1 | 10/2008 | Goldstein |
| 2008/0257047 A1 | 10/2008 | Pelecanos |
| 2008/0260180 A1 | 10/2008 | Goldstein |
| 2008/0269926 A1 | 10/2008 | Xiang |
| 2009/0010456 A1 | 1/2009 | Goldstein et al. |
| 2009/0016501 A1 | 1/2009 | May |
| 2009/0016541 A1 | 1/2009 | Goldstein |
| 2009/0024234 A1 | 1/2009 | Archibald |
| 2009/0034748 A1 | 2/2009 | Sibbald |
| 2009/0046867 A1 | 2/2009 | Clemow |
| 2009/0067661 A1 | 3/2009 | Keady |
| 2009/0071487 A1 | 3/2009 | Keady |
| 2009/0076821 A1 | 3/2009 | Brenner |
| 2009/0085873 A1 | 4/2009 | Betts |
| 2009/0087003 A1 | 5/2009 | Zurek |
| 2009/0122996 A1 | 5/2009 | Klein |
| 2009/0286515 A1 | 5/2009 | Othmer |
| 2009/0175474 A1 | 7/2009 | Salvetti |
| 2009/0180631 A1 | 7/2009 | Michael |
| 2009/0192688 A1 | 7/2009 | Padmanabhan |
| 2009/0227888 A1 | 9/2009 | Salmi |
| 2009/0238386 A1 | 9/2009 | Usher |
| 2009/0274314 A1 | 11/2009 | Arndt |
| 2010/0061564 A1 | 3/2010 | Clemow et al. |
| 2010/0119077 A1 | 5/2010 | Platz |
| 2010/0150367 A1 | 6/2010 | Mizuno |
| 2010/0166203 A1 | 7/2010 | Peissig |
| 2010/0223223 A1 | 9/2010 | Sandler |
| 2010/0241256 A1 | 9/2010 | Goldstein et al. |
| 2010/0296668 A1 | 11/2010 | Lee et al. |
| 2010/0316033 A1 | 12/2010 | Atwal |
| 2010/0328224 A1 | 12/2010 | Kerr et al. |
| 2011/0055256 A1 | 3/2011 | Phillips |
| 2011/0079227 A1 | 4/2011 | Turncot et al. |
| 2011/0096939 A1 | 4/2011 | Ichimura |
| 2011/0116643 A1 | 5/2011 | Tiscareno |
| 2011/0125063 A1 | 5/2011 | Shalon |
| 2011/0135120 A1 | 6/2011 | Larsen |
| 2011/0187640 A1 | 8/2011 | Jacobsen et al. |
| 2011/0264447 A1 | 10/2011 | Visser et al. |
| 2011/0288860 A1 | 11/2011 | Schevciw |
| 2011/0293103 A1 | 12/2011 | Park et al. |
| 2012/0076317 A1 | 3/2012 | Fratti |
| 2012/0170412 A1 | 7/2012 | Calhoun |
| 2013/0098706 A1 | 4/2013 | Keady |
| 2013/0136285 A1 | 5/2013 | Naumann |
| 2013/0149192 A1 | 6/2013 | Keady |
| 2013/0219345 A1 | 8/2013 | Saukko |
| 2013/0251172 A1 | 9/2013 | Mosseri |
| 2014/0003644 A1 | 1/2014 | Keady et al. |
| 2014/0010378 A1 | 1/2014 | Voix |
| 2014/0023203 A1 | 1/2014 | Rotschild |
| 2014/0026665 A1 | 1/2014 | Keady |
| 2014/0089672 A1 | 3/2014 | Luna |
| 2014/0122092 A1 | 5/2014 | Goldstein |
| 2014/0148101 A1 | 5/2014 | Seshadri |
| 2014/0163976 A1 | 6/2014 | Park |
| 2014/0205123 A1 | 7/2014 | Lafort et al. |
| 2014/0373854 A1 | 12/2014 | Keady |
| 2015/0150728 A1 | 6/2015 | Duvall |
| 2015/0215701 A1 | 7/2015 | Usher |
| 2015/0358730 A1 | 12/2015 | Kirsch |
| 2016/0012714 A1 | 1/2016 | Patenaude |
| 2016/0015568 A1 | 1/2016 | Keady |
| 2016/0050483 A1 | 2/2016 | Inc. |
| 2016/0058378 A1 | 3/2016 | Wisby et al. |
| 2016/0104452 A1 | 4/2016 | Guan et al. |
| 2016/0127818 A1 | 5/2016 | Ambrose |
| 2016/0192077 A1 | 6/2016 | Keady |
| 2016/0277854 A1 | 9/2016 | Puria |
| 2016/0295311 A1 | 10/2016 | Keady et al. |
| 2017/0134865 A1 | 5/2017 | Goldstein et al. |
| 2017/0142511 A1 | 5/2017 | Dennis |
| 2017/0223451 A1 | 8/2017 | Kirsch |
| 2018/0054668 A1 | 2/2018 | Keady |
| 2018/0132048 A1 | 5/2018 | Usher et al. |
| 2018/0220239 A1 | 8/2018 | Keady et al. |
| 2018/0233125 A1 | 8/2018 | Mitchell |
| 2019/0038224 A1 | 2/2019 | Zhang |
| 2019/0082272 A9 | 3/2019 | Goldstein et al. |
| 2019/0387305 A1 | 12/2019 | Keady |
| 2021/0014597 A1 | 1/2021 | Andersen |
| 2021/0152924 A1 | 5/2021 | Keady |
| 2022/0061767 A1 | 3/2022 | Goldstein et al. |

FOREIGN PATENT DOCUMENTS

| | | |
|---|---|---|
| DE | 4312155 | 10/1994 |
| DE | 102012221233 | 3/2014 |
| DE | 102013203334 | 5/2014 |
| EP | 0643881 | 12/1998 |
| EP | 0935236 | 8/1999 |
| EP | 1415505 | 12/2002 |
| EP | 1033063 B1 | 5/2003 |
| EP | 1320281 | 6/2003 |
| EP | 0692169 | 7/2003 |
| EP | 1483591 | 11/2003 |
| EP | 1385324 | 1/2004 |
| EP | 1401240 | 3/2004 |
| EP | 1570244 | 6/2004 |
| EP | 1489596 | 12/2004 |
| EP | 1519625 A2 | 3/2005 |
| EP | 1594344 | 9/2005 |
| EP | 1638079 | 3/2006 |

(56) References Cited

FOREIGN PATENT DOCUMENTS

| | | |
|---|---|---|
| EP | 1640972 | 3/2006 |
| EP | 1640972 A1 | 3/2006 |
| EP | 1674061 | 6/2006 |
| EP | 1681903 | 7/2006 |
| EP | 1800950 | 6/2007 |
| EP | 1841283 | 10/2007 |
| EP | 2749043 | 7/2014 |
| EP | 2991381 | 4/2019 |
| EP | 3068142 | 9/2019 |
| FR | 2560520 | 9/1985 |
| GB | 1518299 | 7/1978 |
| GB | 2082820 | 8/1980 |
| GB | 2441835 | 8/2008 |
| JP | 5145623 | 6/1993 |
| JP | H05199590 | 8/1993 |
| JP | H05336599 | 12/1993 |
| JP | H0877468 | 3/1996 |
| JP | H10162283 | 6/1998 |
| JP | H10294989 | 11/1998 |
| JP | 297362 | 9/1999 |
| JP | 12878298 | 11/1999 |
| JP | H11331990 | 11/1999 |
| JP | 3085237 | 7/2000 |
| JP | 2001045585 | 2/2001 |
| JP | 2001054184 | 2/2001 |
| JP | 3353701 | 12/2002 |
| JP | 3353701 B2 | 12/2002 |
| JP | 2003304599 | 10/2003 |
| JP | 3556987 | 5/2004 |
| JP | 2005064744 | 3/2005 |
| JP | 2005130205 | 5/2005 |
| JP | 2005168888 | 6/2005 |
| JP | 2005227511 | 8/2005 |
| JP | 2005260944 | 9/2005 |
| JP | 2005295175 | 10/2005 |
| JP | 2006107044 | 4/2006 |
| JP | 2004289762 | 2/2007 |
| JP | 2009003040 | 1/2009 |
| JP | 2017147677 | 8/2017 |
| KR | 20020086433 | 11/2002 |
| KR | 100366231 | 12/2002 |
| KR | 20030013732 | 2/2003 |
| KR | 20030058432 | 7/2003 |
| KR | 20030068021 | 8/2003 |
| KR | 20030069471 | 8/2003 |
| KR | 101154948 | 7/2006 |
| KR | 100607492 | 8/2006 |
| KR | 100783099 | 12/2007 |
| KR | 101194923 | 10/2012 |
| TW | 200615862 | 5/2006 |
| WO | WO1986000133 | 1/1986 |
| WO | WO9326085 | 12/1993 |
| WO | WO1993026085 | 12/1993 |
| WO | WO1997025790 | 7/1997 |
| WO | WO1998054878 | 12/1998 |
| WO | WO1999043185 | 8/1999 |
| WO | WO2001001731 | 1/2001 |
| WO | WO2001057852 | 8/2001 |
| WO | WO2002013522 | 2/2002 |
| WO | WO2002017836 | 3/2002 |
| WO | WO2002093891 | 11/2002 |
| WO | WO2002101720 | 12/2002 |
| WO | WO2003023766 | 3/2003 |
| WO | WO2003073790 | 9/2003 |
| WO | WO2004016037 | 2/2004 |
| WO | WO2006026812 | 3/2004 |
| WO | WO2007028250 | 3/2004 |
| WO | WO2004114722 | 12/2004 |
| WO | WO2005029468 | 3/2005 |
| WO | WO2005073875 | 8/2005 |
| WO | WO2005107320 | 11/2005 |
| WO | WO2006034029 | 3/2006 |
| WO | 2006037156 A1 | 4/2006 |
| WO | WO2006037156 | 4/2006 |
| WO | WO2006054205 | 5/2006 |
| WO | WO2006054698 | 5/2006 |
| WO | WO2006074082 | 7/2006 |
| WO | WO2006114101 | 11/2006 |
| WO | WO2007007916 | 1/2007 |
| WO | WO2007017809 | 2/2007 |
| WO | WO2007017810 | 2/2007 |
| WO | WO2007073818 | 7/2007 |
| WO | WO2007082579 | 7/2007 |
| WO | WO2007092660 | 8/2007 |
| WO | WO2007147077 | 12/2007 |
| WO | WO2008017326 | 2/2008 |
| WO | WO2008050583 | 5/2008 |
| WO | WO2008096125 | 8/2008 |
| WO | WO2009023633 | 2/2009 |
| WO | WO2009023784 | 2/2009 |
| WO | WO2009097009 | 8/2009 |
| WO | WO2011110901 | 9/2011 |
| WO | WO2011161487 | 12/2011 |
| WO | WO2012097150 | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

Samsung Electronics Co., Ltd., Samsung Electronics, America, Inc., and *Harman International Industries, Inc.v. Staton Techiya, LLC*, IPR2024-00559, Feb. 9, 2024.

*Samsung Electronics Co., Ltd., And Samsung Electronics, America, Inc., v. Staton Techiya, LLC*, IPR2022-00282, Dec. 21, 2021.

*Samsung Electronics Co., Ltd., And Samsung Electronics, America, Inc., v. Staton Techiya, LLC*, IPR2022-00242, Dec. 23, 2021.

*Samsung Electronics Co., Ltd., And Samsung Electronics, America, Inc., v. Staton Techiya, LLC*, IPR2022-00243, Dec. 23, 2021.

*Samsung Electronics Co., Ltd., And Samsung Electronics, America, Inc., v. Staton Techiya, LLC*, IPR2022-00234, Dec. 21, 2021.

*Samsung Electronics Co., Ltd., And Samsung Electronics, America, Inc., v. Staton Techiya, LLC*, IPR2022-00253, Jan. 18, 2022.

*Samsung Electronics Co., Ltd., And Samsung Electronics, America, Inc., v. Staton Techiya, LLC*, IPR2022-00324, Jan. 13, 2022.

*Samsung Electronics Co., Ltd., And Samsung Electronics, America, Inc., v. Staton Techiya, LLC*, IPR2022-00281, Jan. 18, 2022.

*Samsung Electronics Co., Ltd., And Samsung Electronics, America, Inc., v. Staton Techiya, LLC*, IPR2022-00302, Jan. 13, 2022.

*Samsung Electronics Co., Ltd., And Samsung Electronics, America, Inc., v. Staton Techiya, LLC*, IPR2022-00369, Feb. 18, 2022.

*Samsung Electronics Co., Ltd., And Samsung Electronics, America, Inc., v. Staton Techiya, LLC*, IPR2022-00388, Feb. 18, 2022.

*Samsung Electronics Co., Ltd., And Samsung Electronics, America, Inc., v. Staton Techiya, LLC*, IPR2022-00410, Feb. 18, 2022.

*Samsung Electronics Co., Ltd., And Samsung Electronics, America, Inc., v. Staton Techiya, LLC*, IPR2022-01078, Jun. 9, 2022.

*Samsung Electronics Co., Ltd., And Samsung Electronics, America, Inc., v. Staton Techiya, LLC*, IPR2022-01099, Jun. 9, 2022.

*Samsung Electronics Co., Ltd., And Samsung Electronics, America, Inc., v. Staton Techiya, LLC*, IPR2022-01106, Jun. 9, 2022.

*Samsung Electronics Co., Ltd., And Samsung Electronics, America, Inc., v. Staton Techiya, LLC*, IPR2022-01098, Jun. 9, 2022.

*Samsung Electronics Co., Ltd., And Samsung Electronics, America, Inc., v. Staton Techiya, LLC*, IPR2022-00559, Feb. 9, 2024.

U.S. Appl. No. 90/015,146, Samsung Electronics Co., Ltd. and Samsung Electronics, America, Inc., Request For Ex Parte Reexamination Of U.S. Pat. No. 10,979,836.

U.S. Appl. No. 90/019,169, Samsung Electronics Co., Ltd. and Samsung Electronics, America, Inc., Request For Ex Parte Reexamination Of U.S. Pat. No. 11,244,666.

Samsung's Invalidity Contentions and P.R. 3-3 And 3-4 Disclosures for U.S. Pat. Nos. 8,111,839, 8,254,591, 8,315,400, 9,124,982,

(56) References Cited

OTHER PUBLICATIONS 9,270,244, 9,491,542, 9,609,424, 10,405,082, 10,966,015 (Case No. 2:22-CV-00053-JRG-RSP), served May 18, 2022.
Appendix 1A-1C for Patent No. 8,111,839 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 2A-2C for Patent No. 8,254,591 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 3A-3C for Patent No. 8,315,400 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 4A-4C for Patent No. 9,124,982 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 5A-5C for Patent No. 9,270,244 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 6A-6C for Patent No. 9,491,542 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 7A-7C for Patent No. 9,609,424 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 8A-8C for Patent No. 10,405,082 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 9A-9Cfor Patent No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 10A-10C for Patent No. 10,979,836 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 11A-11C for Patent No. 11,039,259 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 12A-12C for Patent No. 11,057,701 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 13A-13C for Patent No. 11,217,237 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 14A-14C for Patent No. 11,244,666 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A1 (Nacre QuietPro) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A2 (Silynx QuietOps) to Samsung's Invalidity Contentions and P.R. 3-3 And 3- 4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A3 (Motorola H5) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A4 (Jawbone Aliph) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A5 (Snooper) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A6 (NCH Swift) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A11 (NaturalRecorder) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A12 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A16 to Samsung's Invalidity Contentions and P.R. 3-3 And 3-4 Disclosures for U.S. Pat. Nos. 8,111,839, 8,254,591, 8,315,400,

(56) References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.
Ex. A17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A32 (Olympus WS-320M) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B16 to Samsung's Invalidity Contentions and P.R. 3-3 And 3-4 Disclosures for U.S. Pat. Nos. 8,111,839, 8,254,591, 8,315,400,

(56) References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.

Ex. B17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D7 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D8 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D9 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D10 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D11 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D12 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D13 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D14 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D15 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D16 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D18 to Samsung's Invalidity Contentions and P.R. 3-3 And 3-4 Disclosures for U.S. Pat. Nos. 8,111,839, 8,254,591, 8,315,400,

(56) References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.
Ex. D19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D26 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D27 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D28 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D29 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D30 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D31 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D32 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E1 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E2 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E3 to Samsung's Invalidity Contentions and P.R. 3-3 And 3-4 Disclosures for US Patent Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F2 to Samsung's Invalidity Contentions and P.R. 3-3 And 3-4 Disclosures for U.S. Pat. Nos. 8,111,839, 8,254,591, 8,315,400,

(56) References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.
Ex. F3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F4 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F5 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. G16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. H18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J3 to Samsung's Invalidity Contentions and P.R. 3-3 And 3-4 Disclosures for U.S. Pat. Nos. 8,111,839, 8,254,591, 8,315,400, 9,124,982, 9,270,244, 9,609,424, 10,405,082, 10,966,015 (Case No. 2:22-CV-00053-JRG-RSP), served May 18, 2022.
Ex. J4 to Samsung's Invalidity Contentions and P.R. 3-3 And 3-4 Disclosures for U.S. Pat. Nos. 8,111,839, 8,254,591, 8,315,400, 9,124,982, 9,270,244, 9,609,424, 10,405,082, 10,966,015 (Case No. 2:22-CV-00053-JRG-RSP), served May 18, 2022.
Ex. J5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. J17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K1 (Calhoun) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K2 (Cerra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K3 (Chen '353) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K4 (Comerford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K5 (Couper) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K6 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K7 (Zaykovskiy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K8 (Hunter) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K9 (Jones) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K10 (Kelliher) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K11 (Kopra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K12 (Lagassey '043) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K13 (Lemelson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K14 (Pickering) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K15 (Schuler) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K16 (Soufflet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K17 (White) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K18 (BlueAnt V1) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K19 (LG Chocolate) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K20 (Midomi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit K21 (Promptu) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K22 (Samsung SCH-a950) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K23 (W850) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K24 (Ears) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K25 (Motorola Pebl) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K26 (Silynx QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K27 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K28 (Shazam) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K29 (Vlingo) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K30 (Yoon) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L1 (Alves 801) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L2 (Burnett 421) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L3 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L4 (Huang 798) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L5 (Jaber) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L6 (LG HBM-730) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L7 (Nokia BH-600) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L8 (Nokia BH-900) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L9 (Pedersen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L10 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L11 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L12 (Visser '958) to Samsung's Invalidity Contentions and P.R. 3-3 And 3- 4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L13 (Zhang 099) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L14 (Byford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L15 (Mejia '156) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L16 (Yang '130) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M1 (Armstrong) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M2 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M3 (Dijsktra 972) to Samsung's Invalidity Contentions and P.R. 3-3 And 3- 4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M4 (Hamacher 031) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M5 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M6 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M7 (Kondo 701) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M8 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M9 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit M10 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M11 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M12 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M13 (Rasmussen 245) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M14 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M15 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M16 (Zurek 379) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M17 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M18 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M19 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M20 (SenSay) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M21 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M22 (Darbut) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M23 (Ramakrishnan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N1 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N2 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N3 (Inanaga) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N4 (Rosenberg) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N5 (Visser 958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N6 (Terlizzi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N7 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N8 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N9 (McCune) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N10 (Bose) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N11 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N12 (Dijkstra 243) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N13 (Cohen 908) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N14 (Rast) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N15 (Bothra 629) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N16 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N17 (Engle) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N18 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N19 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N20 (Killion 056) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N21 (Bothra 087) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit N22 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N23 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N24 (Hohman) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N25 (Bergeron) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N26 (Frank) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N27 (Darbut 423) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N28 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N29 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N30 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N31 (EarSet 2) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N32 (Etymotic ER-6) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N33 (Zen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N34 (Motorola H605) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N35 (Peltor Lite-Com II) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N36 (Discovery 655) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N37 (MX200 Series) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N38 (Sony S700) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N39 (H5 Miniblue) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N40 (3D Active Ambient IEM) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N41 (Armstrong 422) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N42 (Hohn) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N43 (Mejia 228) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N44 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N45 (Thomasson) to Samsung's Invalidity Contentions and P.R. 3-3 And 3- 4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N46 (Zurek 003) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N47 (Kurcan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N48 (Rafaely) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N49 (Vaidyanathan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N50 (Westerlund) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N51 (Zhang) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
3M/Aearo Technologies' E-A-RFitTM Validation System ("E-A-RFit"), Sep. 10, 2015 WayBack Machine capture of 3M's website depicts a brochure describing the E-A-RFit and "Individual Fit Testing Using F-Mire." https://web.archive.org/web/20150910084252/http:/multimedia.3m.com/mws/media/670/earfit-dual-ear-brochure-us.pdf?fn-EARfit%20Dual- Ear%20Brochure%20US.pdf (SAM-TECH_000523336—SAM-TECH_00052336; SAM-TECH_00052339—SAM-TECH_00052339).
3M/Aearo Technologies' E-A-RFitTM Validation System ("E-A-RFit"), 2010 brochure from 3M's website describes the E-A-RFit and identifies model 393-1000 as an available mode. https://multimedia.3m.com/mws/media/62914 9O/3m-e-a-rfit-validation-system-brochure.pdf (SAM-TECH_00052186):.
3M/Acaro Technologies' E-A-RFitTM Validation System ("E-A-RFit"), Abstract titled "New from ISEA member 3M Company (www.3m.com] is the E-A-Rfit Validation System a quantitative hearing protector fittest", published in Jul. 2012. New from ISEA member 3M Company (www.3m.com] is the E-A-Rfit Validation System a quantitative hearing protector fittest, EHS today, vol. 5, Issue 7, ISSN 1945-9599, Gale Group Trade & Industry Database

(56) References Cited

OTHER PUBLICATIONS (Jul. 2012), available at https://dialog.proquest.com/professional/docview/1095272736?accountid=154502 (SAM-TECH_00052203);.
3M/Acaro Technologies' E-A-RFitTM Validation System ("E-A-RFit"), Apr. 24, 2007 article published by E.H. Berger from Aearo Technologies discusses E-A-RFit and notes that "[t]he E-A-RFitTM Validation System is a quick and accurate method of estimating real-ear attenuation for a given fitting of a pair of earplugs" and "has been designed and built to be an integral part of a comprehensive workplace hearing conservation program." See E.H. Berger, Recommended Applications for the E-A-RFitTM Validation System in a Workplace Hearing Conservation Program, Aearo Company (2007) (SAM-TECH_00056087—SAM-TECH_0005609).
3M/Acaro Technologies' E-A-RFitTM Validation System ("E-A-RFit"), At least by Feb. 9, 2007, A 2010 brochure for the E-A-RFit describes the validation system and lists Model 393-1000 as an available product. https://multimedia.3m.com/mws/media/6738280/earfit-brochure.pdf (SAM-TECH_00052179—SAM-TECH_00052184);.
Methods Of Developing And Validating A Field—MIRE Approach For Measuring Hearing Protector Attenuation, Berger, Elliott & Voix, Jérémie & Kieper, R., Feb. 9, 2007, in connection with 3M/Aearo Technologies' E-A-RFitTM Validation System ("E-A-RFit"); This article was originally prepared for the 32nd Annual Conference of the National Hearing Conservation Association, held on Feb. 15-17, 2007, in Savannah, Georgia, and published in Spectrum, vol. 24, Suppl. 1.
3M/Acaro Technologies' E-A-RFitTM Validation System ("E-A-RFit"), Mar. 16, 2016 WayBack Machine capture of 3M's website lists the E-A-RFit for purchase. https://web.archive.org/web/20160316180537/ http://www.3m.com/3M/en_US/company-us/all-3m-products/~/All-3M- Products/Personal-Protective-Equipment/Hearing-Protection/Safety/Worker-Health-Safety/E-A-R-Fit-Validation-Tools/?N=5002385+8709322+8711017+8711405+8720539+8720546+8720770+329 4857497&rt=r3 (SAM-TECH_00052201);.
3M/Acaro Technologies' E-A-RFitTM Validation System ("E-A-RFit"), Mar. 20, 2016 WayBack Machine capture of 3M's website describes the Validation System and protection that the system offers. https://web.archive.org/web/20160320080156/ http://www.3m.com/3M/en_US/company-us/all-3m-products/~/All-3M- Products/Personal-Protective-Equipment/Hearing-Protection/Safety/Worker-Health-Safety/?N=5002385+8709322+8711017+871 1405+8720539+8720546+3294857497&rt=r3 (SAM-TECH_00052278; Sam-TECH_00052292);.
3M/Acaro Technologies' E-A-RFitTM Validation System ("E-A-RFit"), Sep. 4, 2015 WayBack Machine capture of 3M's website contains an image of the E- A- RFit and states "[t]he 3MTM E-A-Rfit™M Dual Ear Validation System makes it easy to measure every employee's unique level of protection and takes the guesswork out of managing compliance in your hearing conservation program." https://web.archive.org/web/20150904132810/ http://solutions.3m.com/wps/portal/3M/en_US/3M-PPE-Safety-Solutions/Personal- Protective-Equipment/safety-management/safety-training/hearing- protection-fit- testing/?WT.mc_id=www.3m.com/EARfitDe mo/ (SAM-TECH_00052276; Sam-Tech_; SAM-TECH_00052274);.
A binaural processor for missing data speech recognition in the presence of noise and small-room reverberation, Kalle Palomäki, Guy Brown & Deliang Wang, Speech Communication, 43, 361-378.
A compact multi-sensor headset for hands-free communication, Liu, Zicheng & Seltzer, Michael & Acero, A. & Tashev, Ivan & Zhang, Zhengyou & Sinclair, Michael, IEEE Workshop on Applications of Signal Processing to Audio and Acoustics, 138-141. 10.1109/ASPAA.2005.1540188.
A Dual—Mode Human—Machine Interface for Robotic Control Based on Acoustic Sensitivity of the Aural Cavity—Ravi Vaidyanathan, et al., Feb. 2006.
A Local Active Noise Control System for Locomotive Drivers, internoise 2000, the 29th International Congress and Exhibition on Noise Control Enginerring, Nielsen, Saebo, Ottesen, Reinen, Sorsdal, Aug. 2000.
A MFCC-based CELP speech coder for server-based speech recognition in network environments, Yoon, Jae Sam, Gil Ho Lee, and Hong Kook Kim, IEICE Transactions on Fundamentals of Electronics, Communications and Computer Sciences 90.3, 626-632, Mar. 2007.
A Modified Coherence Based Method for Dual Microphone Speech Enhancement, M. Rahmani, et al., Signal Processing and Communications, 2007.
A New Two—Sensor Active Noise Cancellation Algorithm, K.C. Zangi, 1993 IEEE International Conference on Acoustics, Speech, and Signal Processing, Minneapolis, MN, USA, 1993, pp. 351-354 vol. 2, doi: 10.
A Pattern Recognition Approach to Voiced-Unvoiced-Silence Classification with Applications to Speech Recognition, B. Atal and L. Rabiner, IEEE Transactions on Acoustics, Speech, and Signal Processing, vol. 24, No. 3, pp. 201-212, Jun. 1976.
Active Noise Attenuation Using LQG/LTR Control, Garcia, José & Bortoloto, Edson & Ribeiro, Jean & Garcia, Eletrônica de Potência. 9. 23-27, Eletrônica de Potência. 9. 23-27. 10.18618/REP.2005.2.023027, Nov. 2004.
Active Noise Cancellation for Headphones Used in High Noise Environments Using Conventional Analog Circuitry, Mark C. Flohr, May 1, 1987.
Active Noise Control System for Headphone Applications Sen M. Kuo, et al. 2006.
Active Noise Control: Low—Frequency Techniques for Suppressing Acoustic Noise Leap Forward with Signal Processing, S.J. Elliott and P.A. Nelson, Oct. 1993.
Active Noise Reduction Headphone Measurement: Comparison Of Physical And Psychophysical Protocols And Effects Of Microphone Placement, PERALA, Apr. 10, 2006.
Active noise Reduction in an ear terminal, OTTESEN, The Journal of the Acoustical Society of America, vol. 105, Issue 2, Feb. 1999.
Adaptive Feedback Active Noise Control Headset: Implementation, Evaluation, and its Extensions, Woon S. Gan, et al. 2005.
Adaptive Filtering in the Frequency Domain, M. Dentino, J. McCool & B. Widrow, Proceedings of the IEEE, vol. 66, No. 12, pp. 1658-1659, Dec. 1978.
Adaptive Noise Cancellation in a Multimicrophone System for Distortion Product.
Otoacoustic Emission Acquisition, Rafael E. Delgado, et al., 2000
Adaptive Noise Cancelling In Headsets, Per Rubak, Henrik D. Green & Lars G. Johansen, Proceedings of IEEE Nordic Signal Processing Symposium, NORSIG'96, Sep. 24-27, 1996, Espoo, Finland.
Adaptive noise cancelling: Principles and applications, B. Widrow, et al., Proceedings of the IEEE, vol. 63, No. 12, pp. 1692-1716, Dec. 1975.
Air- and Bone-Conductive Integrated Microphones for Robust Speech Detection and Enhancement, Yanli Zheng, et al., 2003 IEEE Workshop on Automatic Speech Recognition and Understanding.
An Integrated Audio And Active Noise Control Headsets, W. S. Gan & S. M. Kuo, IEEE Transactions on Consumer Electronics, vol. 48, No. 2, pp. 242-247, May 2002.
Apple's AirPods Pro ("AirPods Pro"), Article on Apple's website published Apr. 15, 2020 mentions the AirPods Pro has an Ear Tip Fit test available. https://support.apple.com/en-us/HT210633 (SAM-TECH_00072120-SAM-TECH_00072123).
Apple's AirPods Pro ("AirPods Pro"), article published by Dan Seifert on Mar. 29, 2019 reviews the AirPods Pro and states Apple is selling the second-gen AirPods in two ways: with the new wireless charging case for $199 or with the standard case for the same $159 as before. https://www.theverge.com/2019/3/29/18286012/apple- airpods-2-new-2nd-gen-review- price-specs-features; (SAM-TECH_00057262-SAM-TECH_00057275).
Apple's AirPods Pro ("AirPods Pro"), Dec. 21, 2019 WayBack Machine capture of Apple's website displays an image of the AirPods Pro and states "[u]se the Ear Tip Fit Test to create the optimal listening experience - you'll get the right tip size for your

(56) References Cited

OTHER PUBLICATIONS ears, and the best seal for noise cancellation." https://web.archive.org/web/20191221170719/ https://www.apple.com/airpods-pro/ (SAM-TECH_00054447; SAM-TECH_00054134).

Apple's AirPods Pro ("AirPods Pro"), Nov. 2, 2019 article by Karisa Bell published on mashable.com discusses whether Apple's AirPods Pro are compatible with Androids. https://mashable.com/article/do-airpods-pro-work-with-android. (SAM-TECH_00052378-SAM-TECH_00052390).

Nov. 3, 2019 article published by Imran Hussain discusses how to use the ear tip fit test with the AirPods Pro and an iOS device such as the iphone 11 for the best fit. https://www.esquire.com/lifestyle/a29612084/apple-airpods-pro-active-noise-cancellation-review/ (SAM-TECH_00052413-SAM-TECH_00052424).

Oct. 20, 2019 article by Tim Hardwick discussing how to perform an ear tip fit test using Apple's AirPods Pro with Apple's iPhone 11. https://www.macrumors.com/how-to/perform-ear-tip-fit-test-airpods-pro/; (SAM-TECH_00052357—Sam-TECH_00052370);.

Apple's AirPods Pro ("AirPods Pro"), Oct. 29, 2019 artcile by Sarah Rense also discusses testing out the AirPods Pro with active-noise cancellation. https://www.esquire.com/lifestyle/a29612084/apple-airpods-pro-active-noise-cancellation-review/ (SAM-TECH_00058067-SAM-TECH_00058080);.

Apple's AirPods Pro ("AirPods Pro"), The specs of the AirPods Pro can be found here https://web.archive.org/web/20191224065355/https://www.apple.com/airpods-pro/specs/ (SAM-TECH_00052343—Sam-TECH_00052352; Sam-TECH_00053159);.

Apple's iPhone 11 (iPhone 11), Oct. 11, 2019 article published by Jake Peterson discusses the eartip fit test using AirPods Pro and an iPhone running iOS 13.2. https://ios.gadgethacks.com/how-to/make-your-airpods-pro-fit-better-by-testing-rubber-tips-0210500/ (Sam-TECH_00056564—SAM-TECH_00056569); Oct. 20, 2019 article by Tim Hardwick discussing how to perform an ear tip fit test using Apple's AirPods Pro with Apple's iPhone 11. https://www.macrumors.com/how- to/perform-ear-tip-fit-test-airpods-pro/; (SAM-TECH_00052357—SAM-TECH_00052370);.

Apple's iPhone 11 (iPhone 11), Press release from Apple's website dated Sep. 10, 2019 states "Apple introduces dual camera iPhone 11 " and that "Customers in the US, Puerto Rico, the US Virgin Islands and more than 30 other countries and regions will be able to pre-order iPhone 11 beginning at 5 a.m. PDT on Friday, Sep. 13 with availability beginning Friday, Sep. 20." https://www.apple.com/newsroom/2019/09/apple-introduces-dual-camera-iphone-11/ (SAM-TECH_00056571—SAM-TECH_00056588);.

Apple's iPhone 11 (iPhone 11), Sep. 15, 2019 WayBack Machine capture of Apple's website has an image of the iphone 11 and lists it for sale on the website. https://web.archive.org/web/20190915061032 /https://www.apple.com/shop/buy-iphone/iphone-11; (SAM-TECH_00055106—SAM-TECH_00055123);.

Apple's iPhone 11 (iPhone 11), WayBack Machine capture from Sep. 16, 2019 of Apple's website, displays the iPhone and states Available 9.20. https://web.archive.org/web/20190916102733/ https://www.apple.com/iphone-11/specs/. (SAM-TECH_00056907).

Audiometric Ear Canal Probe with Active Ambient Noise Control, B. Rafaely & M. Furst, IEEE Transactions on Speech and Audio Processing, vol. 4, No. 3, pp. 224-230, May 1996.

Bang and Olufsen EarSet 2 Bluetooth Headset, At least by 2006, https://www.beoworld.org/prod_details.asp?pid=733 (SAM-TECH_00094798).

Bang and Olufsen EarSet 2 Bluetooth Headset, At least by 2006, https://www.dexigner.com/news/9935 (SAM-TECH_00094865).

Brian Hobbs et al., Wideband Hearing, Intelligibility, and Sound Protection, Jan. 10, 2008 Final Report AFRL-RH-WP-TR-2009-0031 at 2 (SAM-TECH_00053002-116).

Build These Noise-Cancelling Headphones, Jules Ryckebusch, 1997.

Combined feedback-feedforward active noise-reducing headset—The effect of the acoustics on broadband performance, Boaz Rafaely & Matthew Jones, J. Acoust. Soc. Am. Sep. 1, 2002; 112 (3): 981-989.

Dec. 25, 2005 WayBack Machine Capture of Maico's website has an image of the Maico MI26 and discusses the products features. https://web.archive.org/web/20051225200404/http:/www.maico-diagnostics.com/eprise/main/Maico/Products/ Files/MI26/SpecSheet.MI24-26.NEW.pdf (SAM-TECH_00051161—SAM-TECH_00051162).

Direct filtering for air- and bone-conductive microphones, Zicheng Liu, Zhengyou Zhang, A. Acero, J. Droppo and Xuedong Huang , IEEE 6th Workshop on Multimedia Signal Processing, 2004., Siena, Italy, 2004, pp. 363-366.

DSP Software Development Techniques for Embedded and Real-Time Systems, Robert Oshana, 2006.

E-3 In-Flight Acoustic Exposure Studies and Mitigation Via Active Noise Reduction Headset, Frank Mobley, John Allen Hall, & Donald Yeager, Dec. 2002.

Efficient Tracking of the Cross-Correlation Coefficient, AARTS, IEEE Transactions on Speech and Audio Processing, vol. 10, No. 6, Sep. 2002.

Etymotic ER-6 Earphones, At least by Feb. 7, 2005, https://www.cnet.com/reviews/etymoti c-er-6-review/ (SAM-TECH_00095121).

Etymotic ER-6 Earphones, At least by Feb. 7, 2005, https://www.etymotic.com/ephp/er6i-ts.aspx (SAM-TECH_00095178).

Etymotic's ER-33 Occlusion Effect Meter ("ER-33"), Apr. 9, 2001 WayBack Machine capture of Etymotic's website contains an image of the ER-33 and states that "[t]he ER-33 Occlusion Effect Meter quickly quantifies the occlusion effect and earmold leakage" and was on sale for $350.00. https://web.archive.org/web/20010404224259/ https://www.etymotic.com/ (SAM-TECH_00054976);.

Etymotic's ER-33 Occlusion Effect Meter ("ER-33"), Aug. 2003 article by H. Gustav Mueller in the Hearing Journal, Mueller describes the ER-33 as a product Manufactured by Etymotic that "costs No. more than a few bottles of good wine." See H. Gustav Mueller, There's less talking in barrels, but the occlusion effect is still with US, 56 Hearing J. 10, 14 (2003) (SAM-TECH_00054761—SAM-TECH_00054764).

Etymotic's ER-33 Occlusion Effect Meter ("ER-33"), Dec. 5, 2004 article submitted by Wayne J. Staab to The Hearing Review, discusses the ER-33 and notes "[t]he occlusion effect was measured with the ER-33 Occlusion Effect meter (Figure 5) using a probe tube extending 2 mm beyond the receiver tip. The ER-33 is a hand-held device that measures both the magnitude of the occlusion effect and the leakage around an earmold." https://hearingreview.com/practice-building/practice-management/measuring- the-occlusion-effect-in-a-deep-fitting-hearing-device (SAM-TECH_00060339—SAM-TECH_00060350);.

Etymotic's ER-33 Occlusion Effect Meter ("ER-33"), Mar. 3, 2005 capture of Etymotic's website contains a description of the ER-33 which includes a sale price for $350.00. https://web.archive.org/web/20050303170952/ http://www.etymotic.com/pro/er33.asp (SAM-TECH_00054986);.

Etymotic's ER-33 Occlusion Effect Meter ("ER-33"), Mar. 4, 2005 WayBack Machine capture of Etymotic's website contains a user manual for the ER-33 which was on sale at that time. https://web.archive.org/web/20050304030715/ http://www.etymotic.com/pdf/er33-oem-usermanual.pdf (SAM-TECH_00055001; SAM-TECH_00060165).

Excerpts from Discrete-Time Signal Processing, Third Edition, Alan V. Oppenheim & Ronald W. Schafer, Aug. 18, 2009.

Experimentation To Address Appropriate Test Techniques For Measuring The Attenuation Provided By Double ANR Hearing Protectors, Susan E. Mercy, Christopher Tubb and Soo H. James, New Directions for Improving Audio Effectiveness (pp. 18-1-18-14). Meeting Proceedings RTO-MP-HFM-123, Paper 18. Neuilly-sur-seine, France: RTO.

Fit-Testing of Hearing Protection, WITT, The Hearing Review.

Gennum Zen Digital Wireless Headset ("Zen"), At least by 2004, CNET Article—Gennum Zen Bluetooth Headset Review (SAM-TECH_00098419).

Gennum Zen Digital Wireless Headset ("Zen"), At least by 2004, Gennum Zen User Manual (SAM-TECH_00098432).

(56) References Cited

OTHER PUBLICATIONS

Gennum Zen Digital Wireless Headset ("Zen") At least by 2004, Globe and Mail Article—Gennum Z-E-N Headset for Bluetooth (SAM-TECH_00098485).
Huseyin Dogan, Trym Holter, & Ingrid Svagard, Trial of a special end user terminal that aids field operators during emergency rescue operations, Proceedings of the 3rd International Iscram China Workshop, Harbin, China, at 4 (Aug. 2008) discusses the PARAT as well (SAM-TECH_00051920-SAM-TECH_00051931).
In-Ear Microphone Speech Data Recognition using HMMs, R. S. Kurcan, M. P. Fargues and R. Vaidyanathan, 2006 IEEE 12th Digital Signal Processing Workshop & 4th IEEE Signal Processing Education Workshop, Teton National Park, WY, USA, 2006.
In-Ear Microphone Speech Data Segmentation and Recognition using Neural Networks, G. Bulbuller, Monique Fargues & Ravi Vaidyanathan, IEEE 12th Digital Signal Processing Workshop and 4th IEEE Signal Processing Education Workshop, 2006.
In-Ear Microphone Techniques For Severe Noise Situations, N. Westerlund, M. Dahl, I. Claesson, Nov. 2005.
Interaction Techniques Using Prosodic Features of Speech and Audio Localization, Alex Olwal & Steven Feiner, Jan. 5, 2011.
Isolated Word Recognition from In-Ear Microphone Data Using Hidden Markov Models (HMM), Remzi Serdar Kurcan, Mar. 2006.
Jawbone Aliph, At least by Sep. 9, 2004, https://www.capecodtimes.com/story/news/20 06/12/24/new-earphones-let-you-go/50845129007 (SAM-TECH_00062054).
Jawbone Aliph, At least by Sep. 9, 2004, https://www.cnet.com/reviews/aliph-jawbone-bluetooth-headset-review/ (SAM-TECH_00060121).
Jawbone Aliph, At least by Sep. 9, 2004, https://www.wired.com/2004/09/military-headset-reaches-masses (SAM-TECH_00062036).
Jawbone Aliph, At least by Sep. 9, 2004, Jawbone User Manual (SAM-TECH_00061992).
Learning-Based Three Dimensional Sound Localization Using a Compact Non-Coplanar Array of Microphones, Kamen Y. Guentchev and John J. Weng, AAAI Technical Report SS-98-02, 1998.
Maico MI26 Tymp/audiometer combo ("Maico MI26"), Aug. 12, 2004 WayBack Machine Capture of Maico's website has an image of the Maico MI26 and lists the Maico MI26 as a product available for purchase. https://web.archive.org/web/20040422090329/http://www.maico-diagnostics.com:80/eprise/main/Maico/US_en/ProductCategories/LST01_Tympanometers (SAM-TECH_00060329- SAM-TECH_00060331).
Mar. 17, 2006 Wayback Machine capture of Maico's website has a user manual available for the Maico MI26 https://web.archive.org/web/20060317092410/ http:/www.maico-diagnostics.com/eprise/main/Maico/Products/Files/MI26/1162-0322REVD.pdf (SAM-Tech_00051168-SAM-TECH_00051215).
Mar. 17, 2006 WayBack Machine Capture of Maico's website discusses frequently asked questions about the Maico MI26 andis' features. https://web.archive.org/web/20060317092109/ http://www.maico-diagnostics.com/eprise/main/Maico/Products/Files/MI24/FAQ.MI24-26.pdf (SAM-Tech_00051250-SAM-TECH_00051251).
Methods of measuring the attenuation of hearing protection devices, E H Berger, The Journal of the Acoustical Society of America vol. 79,6 (1986).
Microphone Array for Headset with Spatial Noise Suppressor, Ivan Tashev, Michael Seltzer & Alex Acero, 2005.
Microphone Array Processing for Robust Speech Recognition, Michael L. Seltzer, Jul. 2003.
Motorola H5 Miniblue Bluetooth Headset, Jan. 14, 2005, https://newatlas.com/ces-2006-bluetooth-innovations-abound-inner-ear-headset- bluetooth-keyboard-and-wireless-ipod-companion/4977/ (SAM-TECH_00060368) (Motorola H5 Miniblue Bluetooth Headset).
Motorola H5 Miniblue Bluetooth Headset, Jan. 14, 2005, https://www.cnet.com/tech/mobile/motorola- h5-miniblue-bluetooth-headset/ (Sam-TECH_00060424) (Motorola H5 Miniblue Bluetooth Headset).
Motorola H5 Miniblue Bluetooth Headset, Jan. 14, 2005, https://www.engadget.com/2006-01-04-motorolas-h5-miniblue-bluetooth-headset.html (SAM-TECH_00060628).
Motorola H5 Miniblue Headset ("Miniblue"), Jan. 2006, Motorola H9 Bluetooth Headset User Manual (SAM-TECH_00060509-14).
Motorola H605, At least by 2006, CNET Article—Motorola H605 Bluetooth Headset Review (SAM-TECH_00098639).
Motorola H605, At least by 2006, Motorola H605 User Manual (SAM-TECH_00098719).
Motorola H605, At least by 2006, PhoneArena Article - Motorola H605 Review (SAM-TECH_00098743).
Motorola Miniblue Press Release (https://web.archive.org/web/20060212115000/ http://www.motorola.com/motoinfo/product/details/0,133,00.html) (SAM-TECH_00056060);.
Motorola's Astro XTS 5000 Digital Portable Radio ("Motorola XTS 5000"), At least by Jun. 2002, Motorola's Detailed Service Manuel has a release date in 2003. See Detailed Service Manuel for Astro XTS 5000 VHF/UHF Range 1/Range 2/700-800 MHZ, Digital Portable Radios (2003) (SAM-TECH_00051382-SAM-TECH_00051711);.
Motorola's Astro XTS 5000 Digital Portable Radio ("Motorola XTS 5000"), Jun. 14, WayBack Machine capture of Motorola Inc.'s website contains an image of the Motorola and states that "[t]he top of the line XTS 5000 portable radio is ready and equipped to meet the needs of demanding environments" and that it is "Motorola's newest maximum performance two-way radio." https://web.archive.org/web/20020614082842/ http://www.motorola.com:80/cgiss/portables/ xts5000.shtml (SAM-TECH_00051718).
Motorola's XTS 2500 Digital Portable Radio ("Motorola XTS 2500"), Motorola XTS 2500's Basic Service Manual dated 2002-2003, see XTS 2500 XTS 1500 MT 1500 700-800 MHz Digital Portable Radios, Basic Service Manual at 70 (SAM_00051287-SAM-TECH_00051374).
Motorola's XTS 2500 Digital Portable Radio ("Motorola XTS 2500"), Nov. 9, 2001, WayBack Machine capture of Motorola's website contains an image of the XTS 2500 and states that "[t]he XTS 2500 portable radio is Motorola's high- performance, small-sized, digital two-way radio." https://web.archive.org/web/20020804062125/ http://www.motorola.com:80/cgiss/portables/xts2500.shtml (SAM-TECH_00051258).
Multi-Microphone Correlation-Based Processing for Robust Automatic Speech Recognition, Thomas M. Sullivan, Department of Electrical and Computer Engineering Carnegie Mellon University.
Multi-Microphone Signal Acquisition for Speech Recognition Systems, Kevin Fink, EE 586—Speech Recognition Systems, Dec. 16, 1993.
Multi-sensory microphones for robust speech detection, enhancement and recognition, Zhengyou Zhang, Zicheng Liu, M. Sinclair, A. Acero, L. Deng, J. Droppo, Xuedong Huang, Yanli Zheng, 2004 IEEE International Conference on Acoustics, Speech, and Signal Processing 3 (2004).
NACRE QuietPro, In a Mar. 7, 2013 presentation by Blake Martin of Honeywell Safety Products to the Alberta Industrial Fire Protection Association, Mr. Martin identifies "2005" as the "First commercial success for Quietpro." (SAM-TECH_00054652).
NACRE QuietPro, In Aug. 2006, Nacre won U.S. Government Contract No W912DQ-06-D-0037 to supply the NACRE QuietPro to the U.S. military. U.S. Government Contract No. W912DQ-06-D-0037 (SAM-TECH_00055735).
NACRE QuietPro, In proceedings before the U.S. Trademark Trial and Appeal Board, Nacre stated that it "has used in commerce with the United States, long since prior to Apr. 28, 2006, the registered trademark QUIETPRO on one or more of headphones, earphones . ... " *Nacre AS v. Silynx Communications, Inc.*, Sep. 4, 2007 Notice of Opposition. (SAM-TECH_00054696).
NACRE QuietPro, Mar. 9, 2005, Honeywell Quietpro QP100ex Mar. 2013 presentation (SAM-TECH_00063985);.
NACRE QuietPro, Mar. 9, 2005, IEEE Explore Article (SAMTECH_00063687).
NACRE QuietPro, Mar. 9, 2005, NACRE QuietPro User Manual v2.0 (SAMTECH_00055181).
NACRE QuietPro, Mar. 9, 2005, New Scientist Article (SAMTECH_00064068).

(56) References Cited

OTHER PUBLICATIONS

NACRE QuietPro, Mar. 9, 2005, SoldierMod Article (SAM-TECH_00065729).

NACRE QuietPro, Mar. 9, 2005, Article posted at: https://www.tu.no/artikler/quietproverner-og-forsterker-horselen/261960 (SAM-TECH_00097600).

NACRE QuietPro, Mar. 9, 2005, WayBack Machine capture of Nacre's website contains an image of the NACRE QuietPro and states that "Nacre has secured MNOK 27,5 from a consortium led by Ferd Venture" and that "[m]ost of the money will be spent to boost efforts within sales and marketing of QUIETPRO in the global military market.".

Nacre's PARAT earplug ("Parat"), 1999 article published by one of the PARAT's designers Georg E. Ottensen, discusses the PARAT system and states, "[a]n active ear terminal is beeing designed at SEVTEF Telecom and informatics. The acronym of the consept is PARAT - Personal Active Radio/Audio Terminal." Georg E. Ottesen, Active noise reduction in an ear terminal, The Journal of the Acoustical Society of America 105, 1300 (1999); https://doi.org/10.1121/1.424828, SINTEF Telecom and Informatics, N-7465 (SAM-TECH_00051952—SAM-TECH_00051955);.

Nacre's PARAT earplug ("Parat"), Jan. 2004 publication by Fredrik Vraalsen et al., describes how "[p]articular attention has been given to voice interaction in noisy industrial scenarios, utilising the PARAT earplug." Fredrik Vraalsen, Trym Holter, Ingrid Storruste Svagard, and Oyvind Kvennas, A Multimodal Context Aware Mobile Maintenance Terminal For Noisy Environments, Sintef Ict, N-7465 Trondheim, Norway, 79, 79 (Jan. 2004) (SAM-TECH_00051938—SAM-TECH_00051951);.

Noise attenuation and proper insertion of earplugs into ear canals, Markku Toivonen, Rauno Pääkkönen, Seppo Savolainen, Kyösti Lehtomäki, The Annals of occupational hygiene, vol. 46,6 (2002): 527-530.

Oct. 29, 2019 on BusinessToday.in states the AirPods Pro require Apple devices running iOS 13.2 or later, iPadOS 13.2 or later, watchOS 6.1 or later, tvOS 13.2 or later, or macOS Catalina 10.15.1 or later. https://www.businesstoday.in/technology/lau nch/story/apple-airpods-pro-with-noise-cancellation-launched-check-out-price-in-india features-235269-2019-10-29 (SAM-TECH_00061346-SAM-TECH_00061349);.

Oct. 31, 2019 article published by Charlie Sorrel discusses the Ear tip fit test for the AirPods Pro in the iPhone settings. https://www.cultofmac.com/662548/airpods-pro-ear-tip-fit-test/; (SAM-TECH_00056870—SAM-TECH_00056881);

Olympus WS-320M, At least by Nov. 25, 2005 (Olympus WS-320M) https://web.archive.org/web/20051125000137mp_, http://www.olympusamerica.com/cpg_se ction/cpg_vr_digitalmusic.asp (SAM-TECH_00051760).

Olympus WS-320M, At least by Nov. 25, 2005 (Olympus WS-320M) https://web.archive.org/web/20060314095402/, http://www.olympusamerica.com/cpg_sectio n/product.asp?product=1195&fl=2 (SAM-TECH_00051767; SAM-TECH_00051753).

Olympus WS-320M, At least by Nov. 25, 2005 Olympus WS-320M Instruction Manual (SAM-TECH_00051833).

Optimal Feedback Control Formulation of the Active Noise Cancellation Problem: Pointwise and Distributed, Kambiz C. Zangi, Rle Technical Report No. 583, Research Laboratory of Electronics Massachusetts Institute of Technology, May 1994.

Peltor Lite-Com II, At least by 1999, Peltor Lite-Com II Manual (SAM-TECH_00099254).

Peltor Lite-Com II, At least by 1999, Peltor Lite-Com II Brochure (SAM-TECH_00099203).

Performance of dual microphone in-the-ear hearing aids, Michael Valente, Gerald Schuchmant, Lisa G. Potts & Lucille B. Beck, Journal of the American Academy of Audiology, 2000.

Plantronics Discovery 655, At least by 2006, CNET Article—Plantronics Discovery 655 Bluetooth Headset Review (SAM-TECH_00099287).

Plantronics Discovery 655, At least by 2006, Plantronics Discovery 655 Brochure (SAM-TECH_00099296).

Plantronics Discovery 655, At least by 2006, Plantronics Discovery 655 User Guide (SAM-TECH_00099344).

Plantronics Discovery 655, At least by 2006, Silicon Poip Culture Article—Plantronics Discovery 655 (SAM-TECH_00099387).

Plantronics MX200, At least by 2006, Plantronics MX200 Brochure (SAM-TECH_00099419).

Plantronics MX200, At least by 2006, Plantronics MX200 User Guide (SAM-TECH_00099435).

Plantronics MX200, At least by 2006, Plantronics MX250 User Guide (SAM-TECH_00099461).

PocketLint Article—Zen Gennum Bluetooth Headset (SAM-TECH_00098490).

Preferred methods for measuring hearing protector attenuation, Elliott Berger, International Congress on Noise Control Engineering 2005, INTERNOISE 2005.

Products of Interest, Project Muse, Computer Music Journal, vol. 30, No. 3, Fall 2006.

Reducing the Negative Effects of Ear-Canal Occlusion, Samuel S. Job, Department of Electrical and Computer Engineering Brigham Young University, 2002.

Research in Motion's BlackBerry 7520 ("BlackBerry"), At least by 2004, Blackberry 7520 Wireles Handheld Model No. RAL11IN, Version 4.1 User Guide, last modified Mar. 6, 2006 (SAM-TECH_00054461—SAM-TECH_00054618);.

Research in Motion's BlackBerry 7520 ("BlackBerry"), Jun. 28, 2006 WayBack Machine capture of the BlackBerry lists it for sale and describes the Blackberry as a "strong addition to the product line-up." https://web.archive.org/web/20060628035351 /http://www.blackberry-7520.com (Sam-TECH_00054619; SAM-TECH_00054624; SAM-TECH_00054622);.

Research in Motion's BlackBerry 7520 ("BlackBerry"), At least by 2004, BlackBerry Wireless Handheld Getting Started Guide (SAM-TECH_00228841).

Research in Motion's BlackBerry 7520 ("BlackBerry"), Nextel Services Guide for the Blackberry is dated the year 2004; (SAM-TECH_00226708).

SeboTek Hearing Systems' PAC (Post Auricular Canal) Instrument ("Sebotek"), Mar. 19, 2003 WayBack Machine capture of SeboTek's website contains a description of the PAC, which notes that "[t]he PAC is an exciting new hearing system by SeboTek that is significantly different from traditional hearing aids. If offers deep canal fitting, superior acoustics, incredible discreetness, and unmatched comfort.".

/http://www.sebotek.com:80/ (SAM-TECH_00052377);.

SeboTek Hearing Systems' PAC (Post Auricular Canal) Instrument ("Sebotek"), May 26, 2007 WayBack Machine capture of SeboTek's website contains a description of the PAC, and notes that "Prior to 2003, depending on the level of hearing loss, consumers could choose between four primary styles, none of which offered superior sound quality, comfort or cosmetic appeal. All that changed in 2003, when SeboTek introduced the PAC Voice-QTM hearing instrument, the first-ever speaker-in-the-canal device." https://web.archive.org/web/20070526135524 /http://www.sebotek.com:80/OurProducts/our Products.html (SAM-TECH_00052392);.

SeboTek Hearing Systems' PAC (Post Auricular Canal) Instrument ("Sebotek"), Oct. 6, 2003 post by Bruce Gefvert, Director of Sales and Marketing at SeboTek Hearing Systems, on audiologyonline.com discusses the PAC, and states "PAC refers to Post Auricular Canal, an entirely new style of hearing aid that is intended to provide hearing professionals with one more option for treating hearing loss in the mild to severe ranges." https://www.audiologyonline.com/ask-the- experts/sebotek-pac-post-auricular-canal- 601 (SAM_00052353—SAM-TECH_00052356);.

SeboTek Hearing Systems' PAC (Post Auricular Canal) Instrument ("Sebotek"), Publication by King Chung in 2004 mentions that "SeboTek VoiceQ and Vivatone have recently launched newly designed behind-the- ear or postauricular canal (PAC, as SeboTek preferred) hearing aids that have receivers situated in the ear canal." See King Chung, Challenges and recent developments in hearing aids. Part II. Feedback and occlusion effect reduction strategies, laser shell manufacturing processes, and other signal processing technologies, 8 Trends Amplif. 125, 150 (2004), available at https://

(56) References Cited

OTHER PUBLICATIONS www.ncbi.nlm.nih.gov/pmc/articles/P MC4111464/pdf/10.1177_ 108471380400800 402.pdf (SAM-TECH_00062067—SAM-TECH_ 00062106).
Sensaphonics 3D Active Ambient In-Ear Monitor System, At least by 2006, Products of Interest Article (SAM-TECH_00096723).
Sensaphonics 3D Active Ambient In-Ear Monitor System, At least by 2006, Sensaphonics 3D Active Ambient In- Ear Monitor System User Guide (SAM-TECH_00100046).
Sensaphonics 3D Active Ambient In-Ear Monitor System, At least by 2006, Sensaphonics 3D Active Ambient IEM System Article (SAM-TECH_00100065).
Silynx QuietOps, Oct. 4, 2007 Applicant's Answer to Opposer's Notice of Opposition (SAM-TECH_00052371).
Silynx QuietOps, https://defense- update.com/20080513_c4ops. html (SAM-TECH_00057150).
Silynx QuietOps, QuietOps Pocket Guide (Rev. 2.00) (Silynx QuietOps).
Small-footprint keyword spotting using deep neural networks, G. Chen, C. Parada and G. Heigold, 2014 IEEE International Conference on Acoustics, Speech and Signal Processing (ICASSP), Florence, Italy, 2014, pp. 4087-4091.
Sonar-operator active noise reduction insert-earphone: Prototype preliminary test and evaluation, Joseph S. Russotti, Naval Submarine Medical Research Laboratory, Report No. 1225.
Sonomax's Sonomax: SonoCustom and SonoPass ("Sonomax"), Apr. 8, 2006 WayBack Machine capture of Sonomax's website contains an image of the Sonomax and states that "[t]ens of Thousands of people around the world give the SonoCustom a big thumbs up for comfort." https://web.archive.org/web/20060408170243 /http://sonomax.com.au/index.cfm/aboutus/so nomax_solution/ (Sam-TECH_00052472; SAM-TECH_00052998);.
Sonomax's Sonomax: SonoCustom and SonoPass ("Sonomax"), Jun. 15, 2006 WayBack Machine capture of Sonomax's website contains frequently asked questions about the Sonomax and states that SonoPass, our proprietary Windows-based software, drives the fitting process and provides immediate proof of functionality. https:// web.archive.org/web/20060615054356 /http://www.sonomax.com. au:80/index.cfm/fa q/ (SAM-TECH_00052643).
Sonomax's Sonomax: SonoCustom and SonoPass ("Sonomax"), Apr. 8, 2006 WayBack Machine capture of Sonomax's website contains an image of the SonoCustom and describes it as a "cost effective, comfortable and resusable earpiece." https://web.archive. org/web/20060408165744 /http://sonomax.com.au:80/index.cfm/ fittingp rocess/ (SAM-TECH_00052436);.
Sonomax's Sonomax: SonoCustom and SonoPass ("Sonomax"), Apr. 8, 2006 WayBack Machine capture of Sonomax's website contains an image of the Sonomax and states that "[t]he Sonomax is a hearing protection system that combines a uniquely designed earpiece, the SonoCustom, with an optimised hardware and software application, called SonoPass." https://web.archive.org/web/ 20060408170221 /http://sonomax.com.au:80/index.cfm/testingp rocess/ (SAM-TECH_00052425);.
Sonomax's Sonomax: SonoCustom and SonoPass ("Sonomax"), Jun. 15, 2006 WayBack Machine capture of Sonomax's website contains an image of the Sonomax and states that "application provides employers the unique ability to quantify and track hearing protection performance and produce detailed reports." https://web. archive.org/web/20060615054658 /http://www.sonomax.com.au/ index.cfm/testi ngprocess/ (SAM-TECH_00052589);.
Sony S700 Walkman, At least by Oct. 13, 2006, EAFIT Article— The Sony Walkman (SAM-TECH_00099514).
Sony S700 Walkman, At least by Oct. 13, 2006, IDG Article— Sony's New Walkman Players Pack Noise Canceling (SAM-TECH_ 00099533).
Sony S700 Walkman, At least by Oct. 13, 2006, Sony Walkman User Manual (SAM-TECH_00099557).
Sony S700 Walkman, At least by Oct. 13, 2006, Stuff Article—Sony NW-S700 Review (SAM-TECH_00099579) Sound Source Localization and Separation, Biniyam Tesfaye Taddese, Mathematics, Statistics, and Computer Science Honors Projects (2006).
Speaker Turn Segmentation Based on Between-Channel Differences, Daniel P.W. Ellis & Jerry C. Liu, LabROSA, Dept. of Electrical Engineering, Columbia University.
Spectral analysis of speech by linear prediction, J. Makhoul, IEEE Transactions on Audio and Electroacoustics, vol. 21, No. 3, pp. 140-148, Jun. 1973.
Speech Input Hardware Investigation for Future Dismounted Soldier Computer Systems, Jeffrey C. Bos & David W. Tack, DRDC Toronto CR 2005-064, May 1, 2005.
Speech Modeling with Magnitude-Normalized Complex Spectra and Its Application to Multisensory Speech Enhancement, A. Subramanya, Z. Zhang, Z. Liu and A. Acero, 2006 IEEE International Conference on Multimedia and Expo, Toronto, ON, Canada, 2006, pp. 1157-1160.
Speech Recognition in Severely Disturbed Environments Combining Ear-Mic and Active Noise Control, N. Westerlund, M. Dahl, I. Claesson, Published 2002, Engineering, Computer Science.
Survey of the Speech Recognition Techniques for Mobile Devices, Dmitry Zaykovskiy, Department of Information Technology, SPECOM'2006, St. Petersburg, Jun. 2006.
Techniques and applications for wearable augmented reality audio, Härmä, Aki & Turku, Julia & Tikander, Miikka & Karjalainen, M & Lokki, Tapio & Nironen, H & Vesa, Sampo (2003).
The Effect of Hearing Aid Microphone Location on the Intelligibility of Hearing Aid—Transduced Speech, John Robert Franks, Dec. 1975.
Using Audio-Based Signal Processing to Passively Monitor Road Traffic, Orla Duffner, Centre for Digital Video Processing and School of Electronic Engineering Dublin City University, Jul. 2006.
Verifying the attenuation of earplugs in situ: Method validation using artificial head and numerical simulations, Annelies Bockstael, Bram De Greve, Timothy Van Renterghem, Dick Botteldooren, Wendy D'haenens, Hannah Keppler, Leen Maes, Birgit Philips, Freya Swinnen, Bart Vinck, The Journal of the Acoustical Society of America; 124 (2): 973-981, Aug. 1, 2008.

* cited by examiner

PERSONALIZED SOUND MANAGEMENT AND METHOD

CROSS-REFERENCE TO RELATED APPLICATIONS

This application is a continuation of and claims priority to U.S. application Ser. No. 17/736,180, filed 4 May 2022, which is a continuation of and claims priority benefit to U.S. application Ser. No. 17/203,731, filed 16 Mar. 2021, now U.S. patent Ser. No. 11/443,746, which is a continuation of U.S. application Ser. No. 16/671,689, filed 1 Nov. 2019, now U.S. patent Ser. No. 10/997,978, which is a continuation of U.S. application Ser. No. 14/846,994, filed 7 Sep. 2015, now U.S. patent Ser. No. 10/529,325, which is a continuation of U.S. application Ser. No. 12/560,097 filed on 15 Sep. 2009, now U.S. Pat. No. 9,129,291, and claims the benefit of U.S. provisional patent application No. 61/098,914 filed 22 Sep. 2008. The disclosure of the aforementioned applications are all incorporated herein by reference in their entireties and priority claimed to all.

FIELD OF THE INVENTION

The invention relates in general to methods of managing sound, and particularly though not exclusively, is related to personalized sound management.

BACKGROUND OF THE INVENTION

The world of two hundred years ago is substantially different than the present day earth. Similarly, the acoustic environment that surrounds us is also changing. For example, the sounds of a large city have changed as the mode of transportation transitioned from walking and horse and buggy, to cars, subways, and airplanes.

In general, humans are continuously inundated by a diversity of sounds. Many of the sounds are not critical to our lives but our brain processes these sounds and tries to distinguish between them. Background sound levels can also make it difficult to hear sounds that are important. Too much acoustic information can cause an auditory overload that can impact both the health and safety of an individual.

SUMMARY

The invention relates in general to methods and system for implementing a suite of personalized sound applications for modifying a user's acoustic environment and more particularly, though not exclusively, to facilitating the adoption of the technology, ensuring the technology functions properly, protecting both the manufacturers and consumer, and providing user selection and control over the management of sound.

At least one exemplary embodiment is directed to a method of personalized sound management comprising the steps of: selecting at least one of a plurality of personalized sound management applications through a client system where the user selects the at least one of the plurality of personalized sound management applications from a website; accepting a subscription contract for using the at least one of the personalized sound management applications; and loading the selected at least one of the plurality of applications from a server system to a device where the device has at least one microphone, at least one speaker, and a processor configured to identify sonic signatures where each sonic signature is identified using a Gaussian mixture model.

At least one exemplary embodiment is directed to a method of implementing personalized sound management comprising the steps of: recording sound with a microphone of a communication device; analyzing the sound for acoustic information relevant for personalized sound management applications; storing a sonic signature in a memory of the communication device; calculating a sound pressure level of the sonic signature; and attaching and storing metadata related to the sonic signature and sound pressure level including a time stamp and geocode.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS OF THE PRESENT INVENTION

Figure 1:
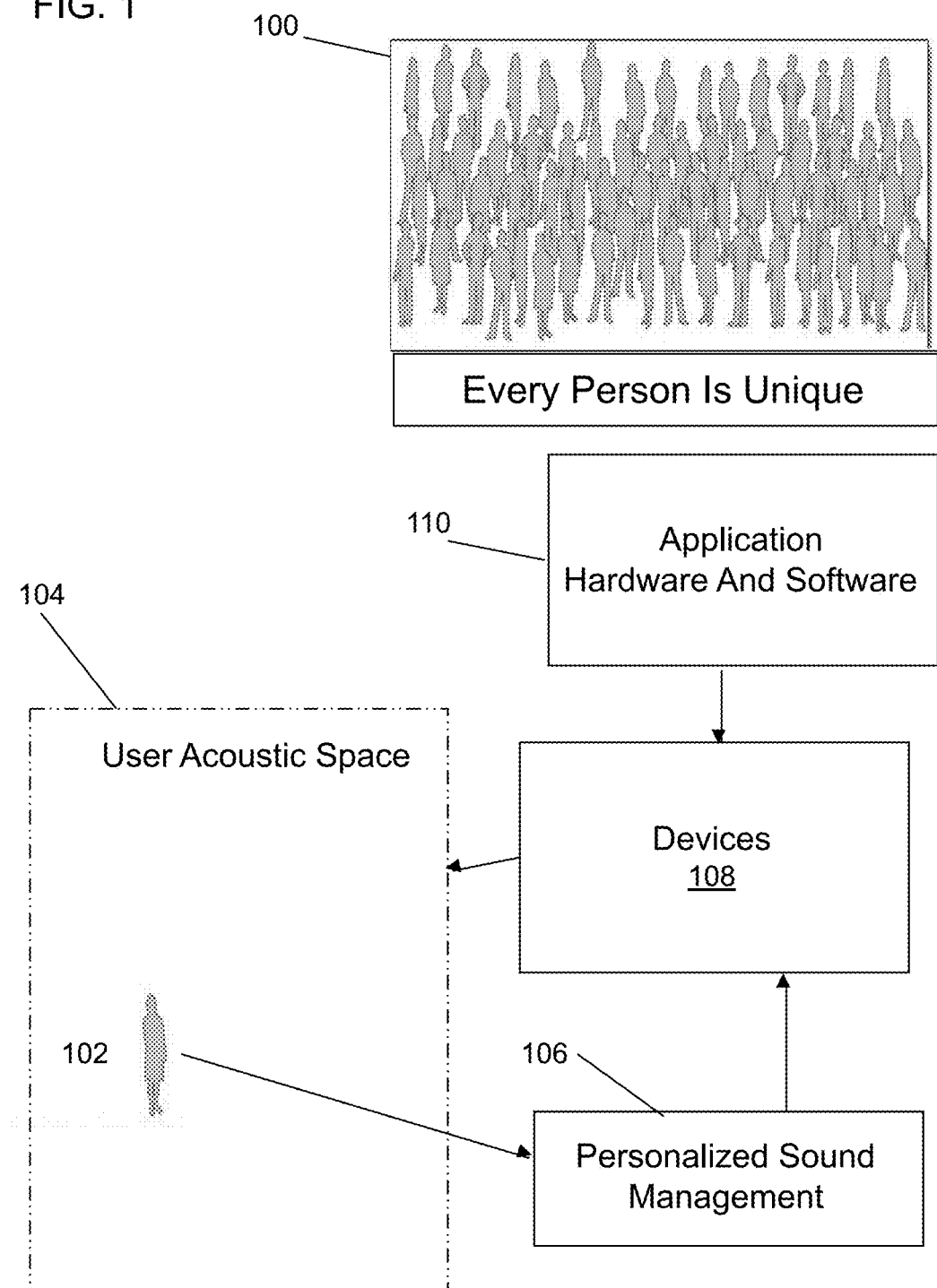
FIG. 1 illustrates a block diagram of the interaction of personalized sound management in accordance with at least one exemplary embodiment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally, the sizes of structures used in exemplary embodiments are not limited by any discussion herein (e.g., the sizes of structures can be macro (centimeter, meter, millimeter, micro (micro meter), nanometer size and smaller).

Notice that similar reference numerals and letters refer to similar items in the following figures, and thus once an item is defined in one figure, it may not be discussed or further defined in the following figures.

In all of the examples illustrated and discussed herein, any specific values, should be interpreted to be illustrative only and non-limiting. Thus, other examples of the exemplary embodiments could have different values.

FIG. 1 is a diagram of personal sound management in accordance with at least one exemplary embodiment. In our global community 100, each person is unique. The differences between individuals can be genetic, cultural, environmental, personal, or physical to name just a few. The combination of these traits is what makes us unique. One of the main senses a human relies on is our auditory sense. Hearing impacts every aspect of our life from communication to safety. How each individual perceives and uses sound is also unique.

From an acoustic perspective, sound pressure levels have been rising steadily. The diversity of sounds is also increasing. The human brain continuously processes the acoustic information provided by the ears. Both the sound pressure levels and the sound diversity puts increasing strain on a person to determine what they need to hear versus what they are hearing. Ultimately, this "acoustic overload" can manifest itself in physical ailments and health risks such as stress, sleeplessness, and depression.

A person 102 has an acoustic space 104 from which a majority of sounds they receive emanate. Some of the sounds are useful to person 102 and some sounds may have no use. Acoustic space 104 can be large or small. Acoustic space 104 will change with time and location. For example, acoustic space 104 can be a room, a stadium, a forest, an automobile, a plane, or the ear canal of person 102. Personalized sound management (PSM™) 106 is the ability to modify what is received from acoustic space 104 thereby tailoring or personalizing the received acoustic information to meet the needs of person 102.

Devices 108 are a source of acoustic information within acoustic space 104. In general, device(s) 108 have a speaker, a microphone, or one or more of both. In general, application hardware and software 110 is incorporated in, although can be external also, device(s) 108 to allow personalization of acoustic space 104. Person 102 selects the applications and controls device(s) 108 to modify acoustic space 104 to meet their personal needs and wants. The benefit and utility of personalizing and managing sound received by person 102 will be disclosed in more detail.

Figure 2:
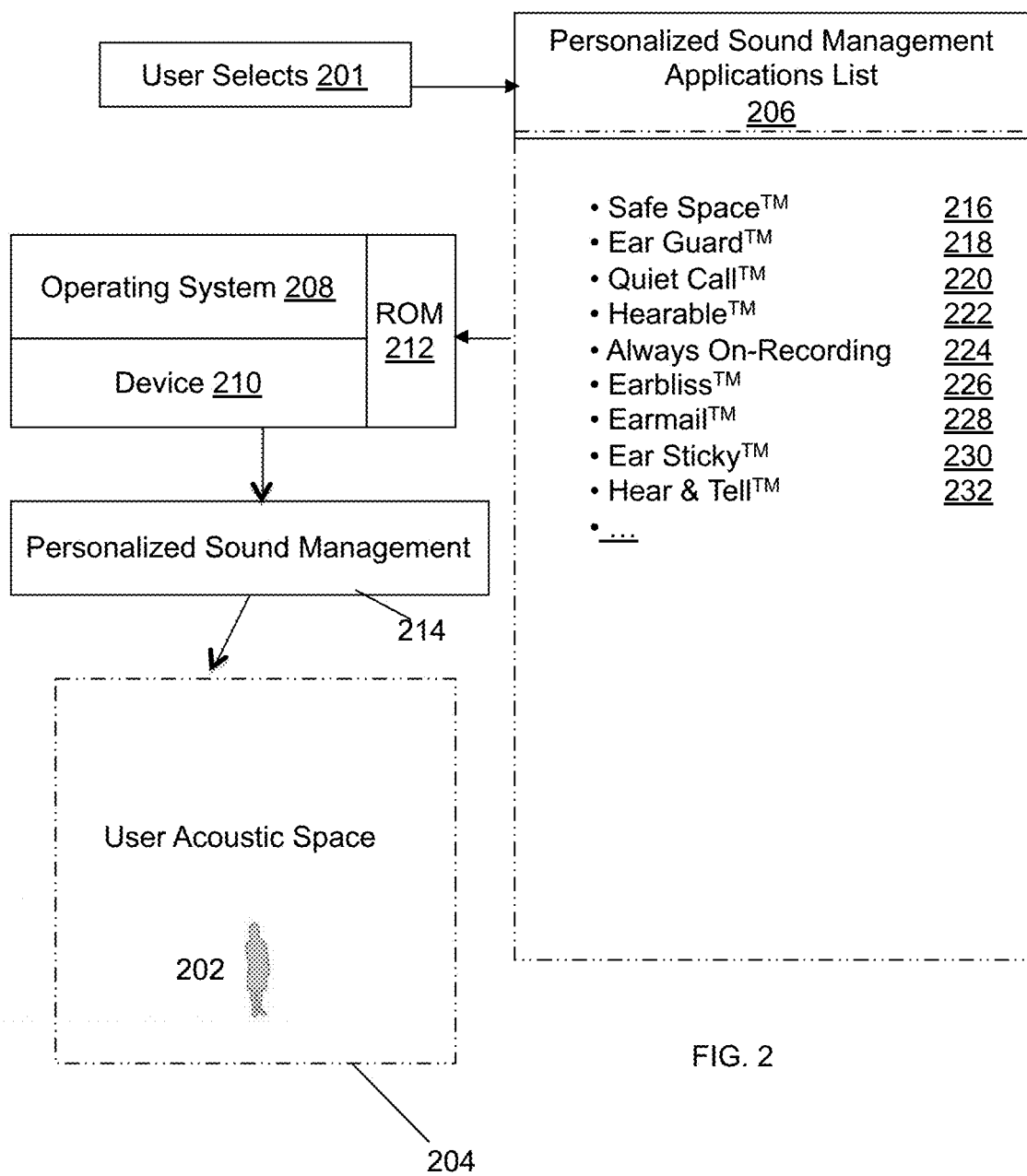
FIG. 2 illustrates a block diagram of a partial list of applications for personalized sound management in accordance with at least one exemplary embodiment.

FIG. 2 is a diagram illustrating a partial list of applications for personalized sound management in accordance with at least one exemplary embodiment. A user 202 has an acoustic space 204 that includes both real sounds and potential sounds. In many cases, acoustic space 204 can be inundated with a variety of sounds not under control of user 202. This lack of control over acoustic information and sound within acoustic space 204 can make for a reduction in quality of life, loss of efficiency, or more seriously affecting user's 202 health and safety.

In at least one exemplary embodiment, a user 202 selects 201 at least one personalized sound management application from a personalized sound management applications list 206. Although only a partial list, applications such as Safe Space™ 216, EarGuard™ 218, Quiet Call™ 220, Ear Sticky™ 230, Hearable™ 222, Always On-Recording™ 224, Earbliss™ 226, Hear & Tell™ 232, and Ear Mail™ 228 will be used to illustrate how acoustic space 204 is personalized and managed for the benefit of user 202. A more detailed explanation of personalized sound management applications 206 will be described.

The selected applications of user 202 are loaded into ROM 212. An operating system 208 is configured operably with device 210 and ROM 212. Operating system 208, in conjunction with personalized sound management applications 206, provides an interface to the user for personalized sound management 214 to meet user needs to manage user acoustic space 202 and for controlling device 210.

ROM 212 can be read only memory such that the selected applications from personalized sound management list 206 cannot be tampered with or rewritten. However in at least one exemplary embodiment ROM 212 can also be memory that can be read and written to so that a user can change settings. Alternately, ROM 212 can be other types of memory such as fe-ram, phase change memory, magneto-resistive memory, hard drive, sram, dram, eprom, eeprom, and other non-volatile or read only memories where the selected applications are secure from any type of downloading, tampering, or modification through physical or software protection. Monitoring of ROM 212 and the selected applications can also be added where notification is sent or device 210 is disabled when an improper action is detected. ROM 212 ensures that an application will operate as disclosed for user 202.

Components of device 210 can be built in a single unit or operatively coupled units. For example, multiple devices of 210 can be wired, optically connected, wirelessly connected or a combination thereof. Operating system 208 can be run remotely to operate device 210 or reside within device 210. Similarly, ROM 212 can be located in device 210 or remote to device 210. In at least one exemplary embodiment, operating system 208 resides in ROM 212. Device 210 typically has at least one microphone or at least one speaker, or both. The at least one microphone provides acoustic information for use in conjunction with personalized sound management applications. The at least one speaker provides acoustic information to user 202 and acoustic space 204. Device 210 has a microprocessor (not shown) for running applications 206. In at least one exemplary embodiment the microprocessor is dedicated to running personalized sound management applications 206.

In general, personalized sound management applications are customizable point solutions that allow user 202 to handle a variety of tasks associated with managing acoustic space 204. The selection of personalized sound management applications will depend on the person, the device, and the acoustic space being managed. Non-limiting examples of devices that can use personalized sound management applications with the appropriate hardware and operating system, are earpieces, media devices, and vehicles.

Described hereinbelow are brief overviews of the user selected personalized sound management applications:

Safe Space™ 216 is an "intelligent hearing" application
that detects and outputs a response based on the identification of a recognized sound. The concept of recognizing sounds is described as Sonic Signature Detection. Safe Space™ 216 also includes a user defined hierarchy and can provide responses based on the hierarchy.

A brief example is provided of how Safe Space™ 216 manages the acoustic space corresponding to the interior of an automobile. As is well known, automobiles are designed to have a quiet interior space. Sound insulation is deliberately placed around the car interior to attenuate sounds coming from the car exterior. Furthermore, automobile drivers often listen to high volume music while driving. This combination makes it difficult to hear sounds such as emergency vehicles. People often get seriously injured because they hear the emergency vehicle when it is in close proximity to the vehicle and panic causing an accident. All descriptions below describing personalized sound management applications assume that the device using the application has incorporated within it the hardware and software required to run the application and perform the application function.

In this example, Safe Space™ 216 detects emergency vehicle horns when they are a substantial distance away. In at least one exemplary embodiment, a microphone is exterior to the car and can pick up sounds in the ambient or car exterior. Sonic signatures related to emergency vehicles such as fire trucks, ambulances, and police cars are stored in the system. Safe Space™ 216 analyses sounds from the microphone. A response is provided if one of the stored sonic signatures is detected. In at least one exemplary embodiment, upon detecting a fire truck siren, Safe Space™ 216 can initiate playing the identified signal through the car stereo system for the car driver to hear and respond to. In at least one exemplary embodiment, Safe Space™ 216 can calculate the direction, distance, and street (through GPS) of the approaching emergency vehicle. The information is then provided visually or vocally to the driver. For example, the car stereo automatically turns down the music and states through the speaker system that an ambulance is coming east bound on 3.sup.rd Street or an ambulance is approaching from the right.

EarGuard™ 218 is a personalized sound management application that improves listening quality and safety. Hearing disorders are increasing at a very high rate. Many people live in an environment such as a noisy urban environment or an industrial manufacturing area where sound pressure levels are consistently high. Moreover, people themselves are subjecting themselves to loud and sustained sounds. Examples of extreme or sustained sound exposure are portable media players using earbuds, sport shooting, and rock concerts. The trend is a growing population of people that have or will have hearing problems.

The ear is a very sensitive instrument having a large dynamic range that allows us to hear sounds ranging from a whisper to a shout. Subjecting the ear to man-made cacophony is now known to metabolically exhaust the highly specialized sensory cells in the inner ear, causing them to die and be replaced by scar tissue in the hearing organ. Ear Guard™ 218 is an application that monitors the sound exposure of the user and protects the ear from damage.

Briefly, Earguard™ 218 improves listening quality and safety by employing a personal hearing zone that measures sound levels within the ear and in one exemplary embodiment an intelligent level control to protect against over amplification. Earguard™ 218 includes a sound pressure level (SPL) dose management system. The SPL dose management system takes into account both transient and long term sound. In at least one exemplary embodiment, when sound at the user's eardrum is above a certain threshold known to begin the process of metabolically exhausting the ear, the metric known as SPL Dose increases. The SPL dose decreases when sound is below that threshold according to a recovery function that mirrors the recovery of the ear from excessive sound exposure. In at least one exemplary embodiment, Earguard™ 218 will indicate to the user damage to the ear is likely if the sound exposure is continued. In this scenario, the user has the control to take the appropriate action to protect his/her ears.

In at least one exemplary embodiment, an intelligent level adjustment system is a personalized sound management application that automatically estimates the preferred listening level of an audio content signal (e.g. speech or music audio from a device) depending on an analysis of the level, other acoustic features of the ambient environment, and an analysis of the audio content signal. Thus, a human-machine relationship is nurtured with this bi-directional control flow from human to the intelligent level adjustment system and from intelligent level adjustment system to the human user.

A substantial benefit of an application such as Earguard™ 218 is the protection of the ear from damage. Furthermore, this safeguard if propagated will prevent hearing loss thereby reducing the financial burden on the economy in years to come for the individual, business, and government for hearing loss remedies. Thus, using Earguard™ 218 could not only stem the growth in hearing related problems but greatly reduce it over the years to come.

Quiet Call™ 220 is an application that allows user 202 having heard a voice message to respond to the remote caller through a non-verbal means. An example of a non-verbal response is a key-pad entered text message. The entered text message is converted to a speech audio message and is sent to the remote caller. The caller then receives the speech audio message.

An example of the utility of Quiet Call™ 220 is illustrated when user 202 is in an important business meeting but is required to provide input to another remote meeting. User 202 receives the voice message sent from someone in the remote meeting. User 202 responds by entering the response through his/her phone keypad; the text is converted to voice and sent to the person at the remote meeting who sent the original message. User 202 does not have to interrupt the meeting to listen to the voice message nor to reply. Thus, the meeting attended by user 202 can move forward with little or no loss of momentum that would occur if the meeting was disrupted by the call.

Hearable™ 222 is a speech enhancement application that improves voice communication. For example, Hearable™ 222 can be used with an earpiece device having at least two microphones, an ambient sound microphone for receiving sounds in the ambient environment and an ear canal microphone for receiving sounds in the ear canal. A common use for the earpiece would be with a communication device such as a cell phone or other phone system. The earpiece using the Hearable™ 222 application would normally use the ambient sound microphone for receiving and transmitting the user's spoken voice. In this mode, the user's voice will be natural sounding and easily recognizable on the receiving end.

In a noisy environment it can be difficult to carry on a telephone conversation. The ambient sound microphone will pick up the voice and the noise in the ambient environment. The earpiece will switch to the ear canal microphone when the ambient sound microphone detects a high background noise level. The user's voice is readily picked up by the ear canal microphone but the noise in the ambient environment is substantially reduced. Switching to the ear canal microphone allows the receiving party to clearly hear the user's voice. The problem with using the ear canal microphone is that user's voice received in the ear canal sounds different because of frequency roll off in the upper spectrum of the voice range. Although the user can be heard clearly, the user's voice may not sound right to the receiving end.

Hearable™ 222 is a personalized sound management application that improves the sound quality of the user's voice. Hearable™ 222 uses a combination of the sound received by the ambient sound microphone and the ear canal microphone to create a more natural sounding voice. The combination of the two signals is a function of the background noise level. Explaining further the signal from the ambient sound microphone is used less as the background noise level increases. Hearable™ 222 allows a user to have a conversation in a noisy environment while providing a high quality voice signal that is intelligible and recognizable at the receiving end.

Always On-Recording™ 224 is a personalized sound application that acts as its name implies. A device using the Always On-Recording™ 224 application is recording the most current audio information for user recall. The recording is stored in a buffer that will allow the user to immediately access the audio information. The buffer will have a finite amount of storage. The recording time will be a function of the buffer or memory available for the Always On-Recording™ 224 application.

Always On-Recording™ 224 provides utility for short durations of recording. For example, in an application where a user is receiving information such as a phone number or driving directions. The user knows that the device employing Always On-Recording™ 224 has the stored acoustic information and can immediately listen-again to the buffer contents thereby repeating the phone number or driving directions. Similarly, if the user was discussing a contract term and wanted to know exactly what the person said, the user could immediately re-listen to make sure that what they thought they heard is exactly what they heard.

Earbliss™ 226 is a personalized sound management application to provide acoustic isolation from someone who snores while allowing other sounds to be heard. A large percentage of the population suffers though sleepless nights because of the sounds generated by people with sleep apnea and more generally due to loud snoring. Moreover, sleep deprivation can have serious consequences related to health and disposition.

Earbliss™ 226 is a sleep zone technology that utilizes sonic signature detection to insulate sleep partners against intrusion from snoring while still providing awareness of priority sounds. In this example, a sonic signature is acoustic information related to the sounds of a person snoring. In at least one exemplary embodiment, Earbliss™ 226 is an application that is used in conjunction earpieces.

Sealing the ear canal with ear plugs will attenuate the snoring but also blocks out all sounds. Hearing is one of the most vital senses that we have. Under normal conditions we cannot turn off our hearing which allows us to wake in a critical situation. Ear plugs will block out sounds of consequence. For example, the user may not hear their baby crying or a child leaving their room.

Earbliss™ 226 enables a user to attenuate snoring while hearing other sounds around them. The earpieces fit in the ear canal of the user to seal or partially seal the ear canal. The earpieces have an ambient sound microphone for receiving acoustic information from the ambient environment and an ear canal receiver for providing sound to the user's ear canal. As mentioned previously, the earpieces will have a sonic signature related to snorer's snoring stored in memory in the device.

The ambient sound microphone picks up all sounds in the ambient environment including the snorer's snoring. The earpiece processes all the acoustic information coming from the ambient sound microphone and looks for signals similar to stored sonic signatures. Pattern recognition approaches are applied based on the known sonic signatures to detect the snoring sounds from their corresponding sonic signatures. More specifically, sonic signatures can then be compared to learned models to identify a corresponding snoring sound. Once identified the snoring sound is suppressed and not output to the ear canal by the ear canal receiver. Thus, the wearer of the earpieces does not hear the snoring.

Conversely, sounds in the ambient environment that are not recognized through the processing of acoustic information by the earpieces can be passed transparently to the ear canal receiver for reproduction within the ear canal. In this mode, the sound produced in the ear canal sufficiently matches the ambient sound outside the ear canal, thereby providing a "transparency" effect other than the suppressed sonic signature (snoring). The earpieces can also enhance sound. For example, the earpieces having sonic signatures related to a fire truck siren or a baby crying can detect either signal and then amplify the signal (fire truck siren, baby crying) so as to make the wearer of the earpieces aware of the signal's detection. Thus, Earbliss™ 226 modifies the acoustic environment of the user to eliminate what does not need to be heard while allowing the user to be aware of other sounds in a normal context.

Ear Mail™ 228 is a personalized sound management application for converting text to voice. In particular, Ear Mail™ 228 provides great utility to users of email and text messaging although not limited to these examples. Email and text messaging is becoming a very popular form of communication among a large portion of the population. It is not always convenient or in some cases not prudent to review written text depending on the situation.

Ear Mail™ 228 converts the text of a message or email to a speech audio message using a text to speech algorithm. The converted speech audio message is replayed through a loudspeaker coupled to a device using the Ear Mail™ 228 application. For example, Ear Mail™ 228 used in a smart phone coupled to the stereo system of a car through a blue tooth connection could playback the text or emails through the car speakers. The user could hear their messages while driving safely down the road.

Ear Sticky™ 230 is a personalized sound management application for recording information that can be saved and used for future use. In at least one exemplary embodiment, Ear Sticky™ 230 is a mobile communication application that can be used in a device such as a cell phone or an earpiece that is operably coupled to other devices. Ear Sticky™ 230 can record communication through a device or sounds in the ambient environment. Sounds in the ambient environment are recorded by an ambient sound microphone.

In a first example of an Ear Sticky™ 230 application, a conversation between a husband and wife occurs and a list of items to pick up at several stores is disclosed. The user of Ear Sticky™ 230 does not need to write down or remember this list. The conversation is being recorded and stored in a buffer. The user activates Ear Sticky™ 230 to store the recorded conversation to be reviewed at a later time. Thus, the user of Ear Sticky™ 230 could recall and listen to the list on the way home to ensure that the right items are picked up at the appropriate store.

In a second example of an Ear Sticky™ 230 application, a device records with an ambient sound microphone. For example, the user of Ear Sticky™ 230 comes up with a great concept to solve a problem he or she has been working on for some time. The user can enable Ear Sticky™ 230 and uses the ambient sound microphone to record his or her voice to convey the idea, concept, or thoughts and store it for review at a later time. In general, Ear Sticky™ 230 provides utility and convenience in storing and recalling sounds in one's acoustic space.

Hear & Tell™ 232 is a personalized sound management application for recording a sound, training a Gaussian mixture model to learn features of the sound and then storing the Gaussian mixture model in memory of the device. A user of Hear & Tell™ 232 can record the sound or provide a sound, called herein as a sonic signature. The device is operably coupled to at least one microphone to compare sounds received from the microphone against the stored sonic signature. The device can perform an operation that modifies the user's acoustic space 204 once a sound is identified as being similar to a sonic signature. Examples of several operations the device can perform are passing the detected signal through to the user, boosting the sound such that the user is made aware of the detected sound, rejecting the sound so the user does not hear the detected sound, attenuating the detected sound, and replacing the detected sound with an alternate sound to name.

The Hear & Tell™ 232 application will store a Gaussian mixture model (GMM) for every sonic signature that it has been trained to recognize. Each GMM is completely specified by a mixture of mean vectors, a mixture of covariance matrices, and a mixture of weights.

An example of a warning sound (e.g. siren of emergency vehicle) will be used to further illustrate the Hear & Tell™ 232 learning application. Each GMM provides a model for the distribution of the feature statistics for each warning sound in a multi-dimensional space. Upon presentation of a new feature vector, the likelihood of the presence of each warning sound can be calculated. In at least one exemplary embodiment, each warning sound's GMM is evaluated relative to its anti-model, and a score related to the likelihood of that warning sound is computed in order to determine if a sound is detected. A threshold can be applied directly to this score to decide whether the warning sound is present or absent. Similarly, a sequence of scores can be relayed and used in a more complex rule set to determine absence or presence of the sound. Thus, Hear & Tell™ 232 allows a user to store, model, and train a device for sonic signatures under user control and selection thereby allowing a user to modify their acoustic space through the detection of a sound and response by the device.

In general, personalized sound management applications are customizable point solutions that allow user 202 to handle a variety of tasks associated with managing acoustic space 204. The selection of personalized sound management applications will depend on the person, the device, and the acoustic space being managed. Examples of devices that can use personalized sound management applications with the appropriate hardware and operating system, but not limited to these examples, are earpieces, media devices, and vehicles.

As described hereinabove, a suite of personalized sound management applications 206 are provided. The user 202 can select the desired applications and have control over their acoustic space 204. The selected applications are stored in ROM 212. Under user control, user 202 selects the parameters of personalized sound management applications 206 using operating system 208 for implementing applications 206 in device 210 for managing acoustic space 204 based on the individual's needs and wants.

Figure 3:
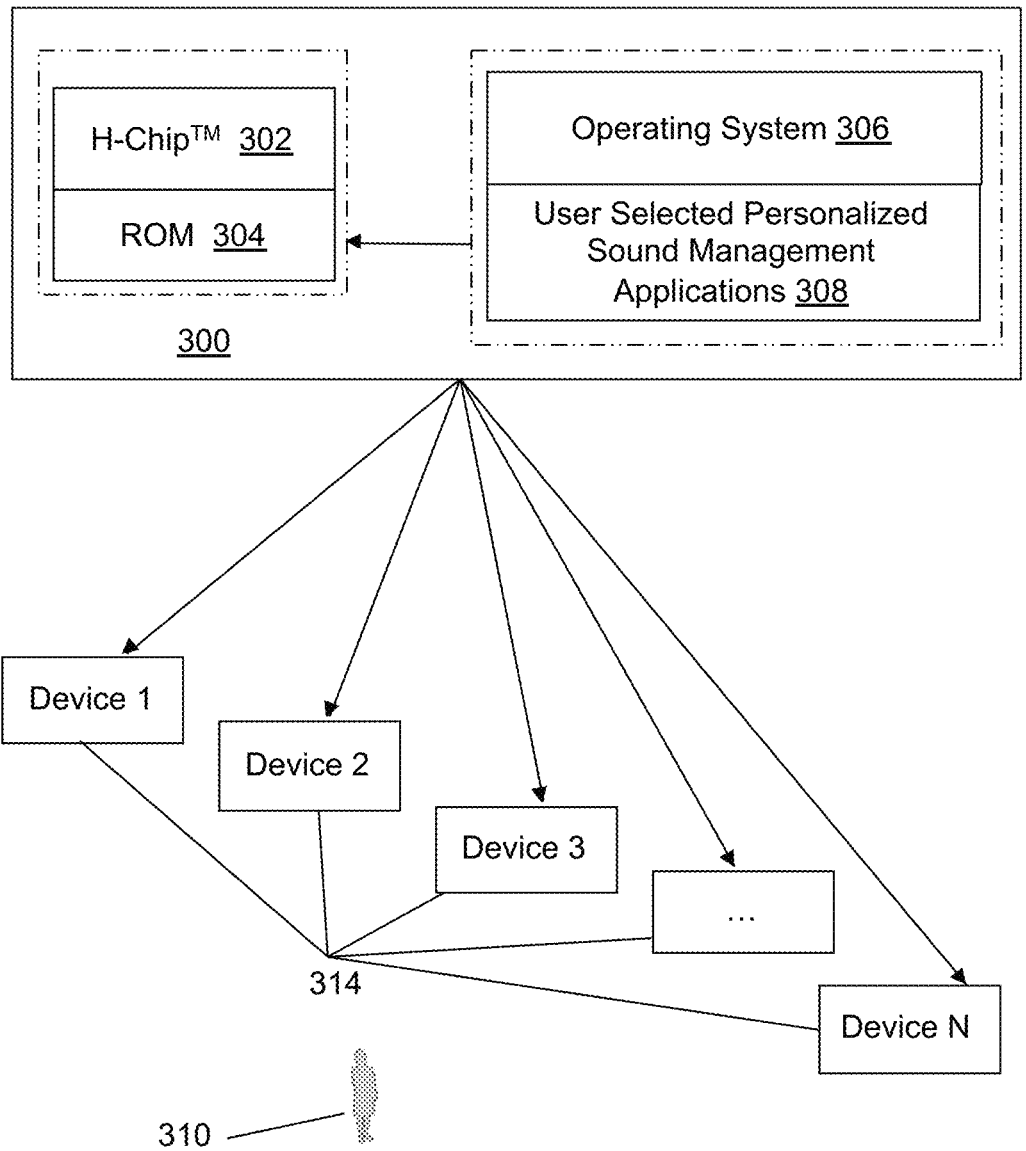
FIG. 3 illustrates a block diagram of the interaction of a personalized management enabled device with other devices in accordance with at least one exemplary embodiment.

FIG. 3 is a diagram illustrating a module 300 for implementing personalized sound management in accordance with at least one exemplary embodiment. Module 300 comprises an H-Chip™ 302, a ROM 304, an operating system 306, and user selected personalized sound management applications 308. In at least one exemplary embodiment, module 300 comprises the H-Chip™ 302 with ROM 304 built into H-Chip™ 302. Both operating system 306 and user selected personalized sound management applications 308 are stored on ROM 304. Alternately, H-Chip™ 302 and ROM 304 can be separate chips allowing for a larger block of memory.

H-Chip™ 302 is a microprocessor, DSP, or logic circuit that implements personalized sound management applications 308. H-Chip™ 302 is optimized for low power dissipation while running user selected personalized sound management applications 308. In at least one exemplary embodiment, H-Chip™ 302 can be a dedicated engine for running applications 308.

Module 300 comprises an application engine (firmware) and a dedicated processor that simplifies the integration of user selected and user controlled personalized sound management applications 308 into a device. In an exemplary embodiment, module 300 is integrated into each device in devices 314. Devices 314 typically, although not always have at least one microphone and at least one speaker. User 310 in conjunction with module 300 can personalize how each device manages sound to the user.

An additional aspect of module 300 is that a third party manufacturer merely builds the acoustic portion of their device around module 300. In an exemplary embodiment, a manufacturer does not and cannot modify operating system 306 and user selected personalized sound management applications 308. Thus, the manufacturer saves time, effort, and money through the seamless integration module 300 into a single hardware solution for maximum transportability into 3.sup.rd party form factors.

Figure 4:
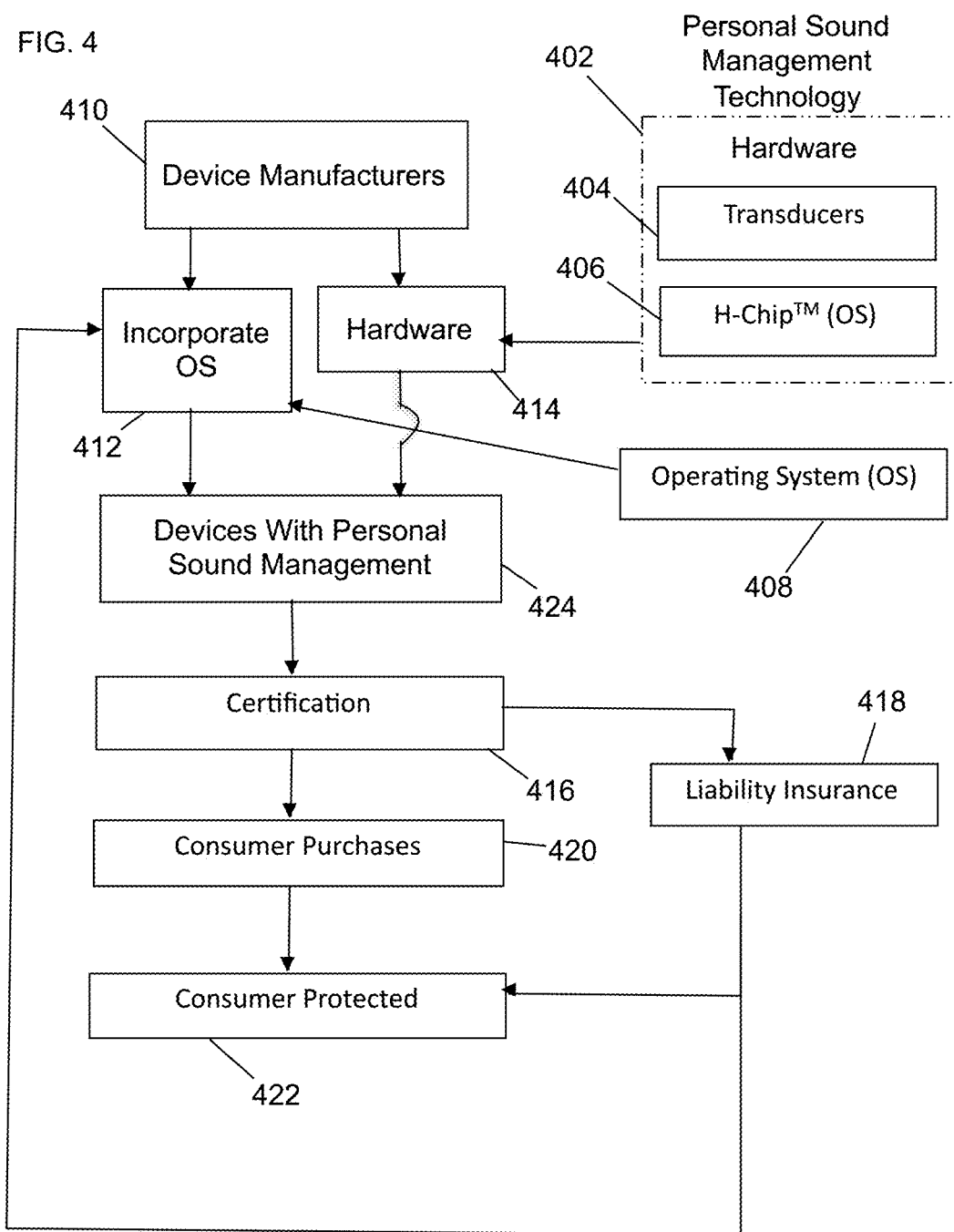
FIG. 4 illustrates a flow chart of a process of providing personalized sound management in accordance with at least one exemplary embodiment.

FIG. 4 is a diagram illustrating a process of providing personalized sound management in accordance with at least one exemplary embodiment. In general, the technology related to providing personalized sound management comprises hardware components and software. In at least one exemplary embodiment, the hardware 402 comprises transducers 404 and H-Chip™ 406.

Transducers 404 are speaker and microphones for respectively providing and receiving sound in an acoustic space. Depending on the application, the size and form factor of transducers 404 may be a critical design parameter. Transducers 404 can be a speaker for providing high fidelity sound to enhance a user's experience. Similarly, transducers 404 can be a microphone for receiving acoustic information and in some cases can pick up sounds inaudible to the user.

H-Chip™ 406 can be a microprocessor, digital signal processor, logic circuit, or applications specific integrated circuit for use implementing the software applications listed hereinabove and other programs related to personalized sound management. H-Chip™ 406 includes operating system 408 specific for managing the device as it relates to personalized sound management and allows user control to adjust the parameters of each application for their specific needs.

Hardware 402 can be integrated into existing devices or next generation devices for adding utility, providing safety, and allowing personalization of a user's acoustic space. Providing hardware 402 enables device manufacturers 410 to rapidly integrate the technology into their products. This will quicken the adoption cycle of the technology for the benefit of the general public in health and safety, and for the individual through personalization. Hardware 402 can be a circuit board to which transducers 404 and H-Chip™ 406 are operatively attached.

Device manufacturers 410 can provide their own hardware 414 or use transducers 404 and H-Chip™ 406. The operating system and application software is incorporated 412 and stored in read only memory (ROM). In at least one exemplary embodiment, operating system 408 and the application software can be stored in ROM. Using read only memory for storage prevents device manufacturers 410 or consumers from tampering with the software code thereby maintaining the integrity of the system and how it performs for the user. Note herein when referring to ROM storage, at least one exemplary embodiment can include RAM or other read/write storage methods.

People in the consumer product industry have stated that any new product and even old products in the hands of consumers may produce liability issues that companies associated with the product have to deal with. This often delays an introduction of a product or adds substantial cost to a product launch. In at least one exemplary embodiment, device manufacturers 410 provide their product for certification 416. In at least one exemplary embodiment, certification 416 is performed by an independent company from device manufacturers 410. Certification 416 is a process whereby a new product is exhaustively tested to ensure the device will perform to specification under a variety of conditions and tolerances. In particular, certification 416 tests the operating system and the device performance in implementing the applications related to personal sound management. Should the device not pass certification testing, it can be repaired or redesigned. The repaired or redesigned device can then undergo certification 416 to determine if it meets the test specifications.

In at least one exemplary embodiment, an insurance policy 418 may be provided covering the device manufacturers 410 using operating system 408, hardware 402, and the application software. This provides substantial benefits in that the device manufacturers 410 can deploy the technology with less risk. Moreover, each company providing devices will know that the personalized sound management system is similar or identical to others in the market. As mentioned hereinabove, the operating system and application software can be stored in ROM ensuring it cannot be rewritten. Additional measures can be taken to determine if the software is being used out of context and shutting down the operation of the device.

Once tested and certified, device manufacturers 410 can manufacture, market, and sell devices with personalized sound management 424 and be covered from a liability perspective under provisions in the insurance policy 418. A consumer purchases 420 a certified device and may also be covered under the same insurance policy 418 or may have a second policy directed to the consumer. Consumer protected 422 under insurance policy 418 and having certification 416 will instill consumer confidence to the quality and reliability of the device. This will be discussed in greater detail hereinbelow. Thus, this process is very efficient in creating manufacturer adoption of the personalized sound management technology while protecting both device manufacturers 410 and the consumer.

Figure 5:
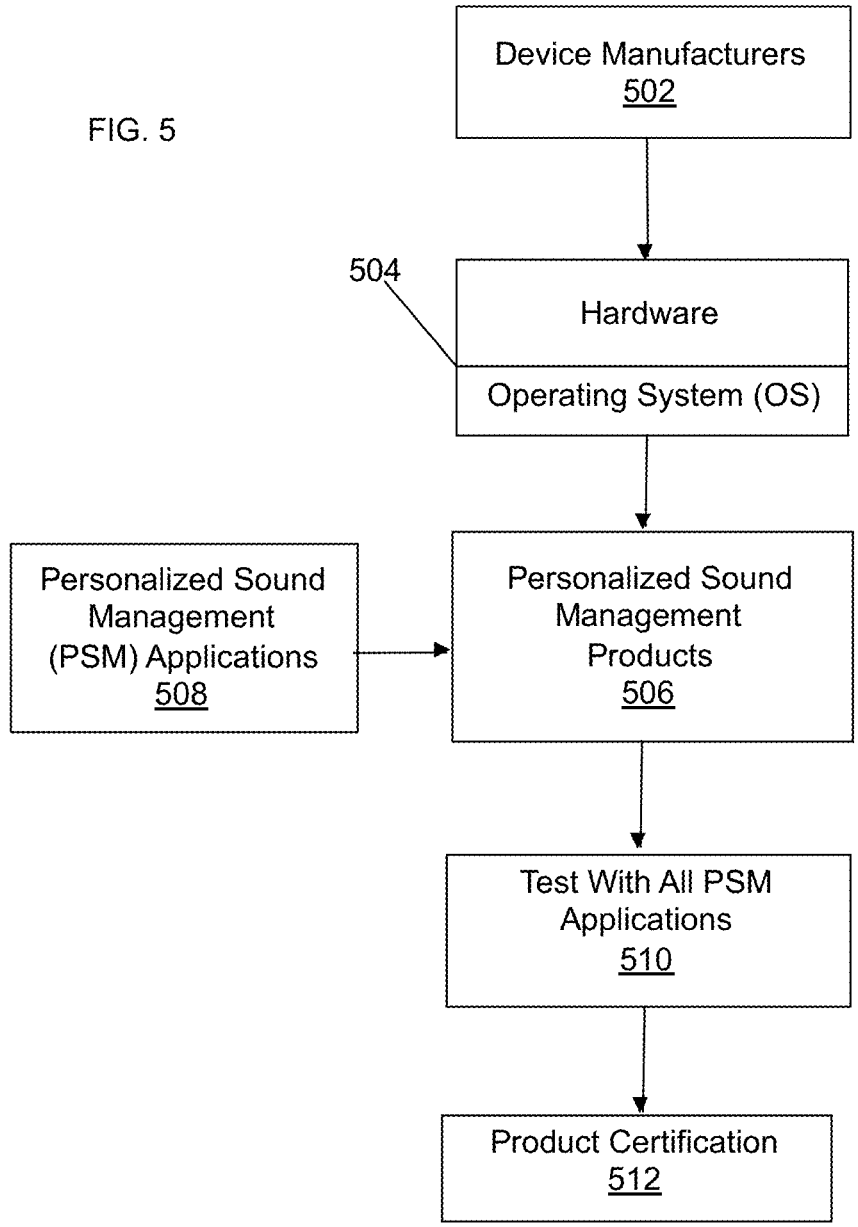
FIG. 5 illustrates a flow chart of an application testing in accordance with at least one exemplary embodiment.

FIG. 5 is a diagram illustrating application testing in accordance with at least one exemplary embodiment. Device manufacturers 502 develop, prototype, and manufacture products 506. Products 506 include hardware and operating system 504 for running and performing Personalized Sound Management (PSM™) applications 508.

In at least one exemplary embodiment, hardware and operating system 504 is capable of running all personalized sound management applications 508. Products 506 may or may not use all of personalized sound management applications 508. Similarly, an end user or customer of products 506 may or may not use all of personalized sound management applications 508.

Hardware and operating system 504 of products 506 are loaded with all personalized sound management applications 508. The hardware and operating system 504 are exercised in testing 510 to ensure that it can run personalized sound management applications 508 per specification. Product 506 may or may not be tested for all personalized sound management applications 508 depending on the capability of the device. Products 506 will be tested 510 for the implementation of all personalized sound management applications it is capable of running to meet user specifications for the product (i.e. product certification 512). In at least one exemplary embodiment, should a product run only a subset of personalized sound management applications, the product can be designed and tested to lock out the running of applications not specified for the particular product (even though hardware and operating system 504 can run personalized sound management applications 508).

A scale of economy for developing and manufacturing hardware and operating system 504 is achieved by having a number of different device manufacturers 502 standardize on the engine (hardware and operating system 504) for implementing personalized sound management. Consistency of product, ability to expand scope of product, and lowering cost through volume manufacturing are all achieved by this methodology. In the example where liability insurance may be purchased by the product certification company (or other company) testing 510 all personalized sound management applications 508 in products 506 ensures that hardware and operating system 504 perform per specification independent of the product it is placed in. Furthermore, having little or no variation on the operation of hardware and operating system 504 and personalized sound management applications 508 minimizes risk. An added benefit is that a large statistical database of diversified products is generated that will allow improvements to managing personalized sound management devices to improved device performance as well as lower liability risk. The consumer benefits by having a highly exercised and stable product that improves their health, safety, and quality of life.

Figure 6:
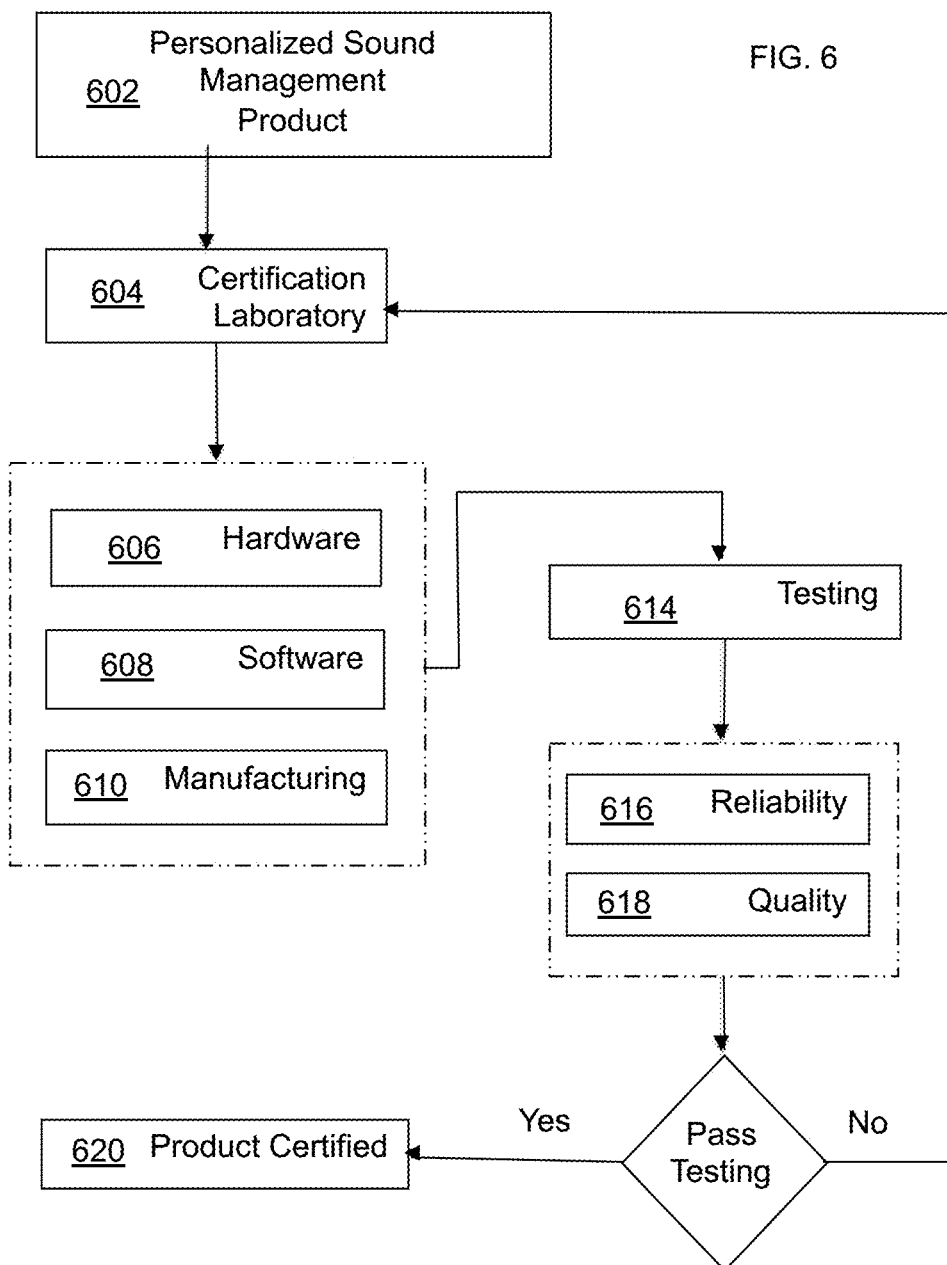
FIG. 6 illustrates a flow chart of the testing of a personal sound management device in accordance with at least one exemplary embodiment.

FIG. 6 is a diagram illustrating testing of a personalized sound management product 602 in accordance with at least one exemplary embodiment. In at least one exemplary embodiment, testing of all products incorporating personalized sound management applications are tested by a single entity. Personalized sound management product 602 can be developed and manufactured by a number of different companies. As previously mentioned, this allows the single entity, should it so desire to purchase a liability insurance policy that covers the manufacturers making personalized sound management product 602 and consumers using personalized sound management product 602.

Personalized sound management product 602 is tested by certification laboratory 604. In at least one exemplary embodiment, certification laboratory 604 is independent from the different manufacturers that develop personalized sound management product 602 thereby providing unbiased testing. Testing 614 of hardware 606, software 608, and manufacturing 610 are performed on personalized sound management product 602. Testing 614 is related to operation and performance of personalized sound management applications. Hardware testing includes the processor, transducers, and other elements, which implement the personalized sound management of the device. Testing of software 608 includes the operating system and personalized sound management applications. Testing 614 includes reliability 616 and quality 618 testing. Testing 614 can also include human testing because in some embodiments, personalized sound management product may be worn in an orifice of the human body.

Upon passing testing 614 the personalized sound management product 602 is certified by certification laboratory 604. A product certified 620 can include some form of warranty, indemnification, and liability insurance for the device. Problems or issues with personalized sound management product 602 are reported to the company should it fail for any reasons. Corrective action can be taken and the device retested to determine if the issue has been resolved.

In at least one exemplary embodiment, certification laboratory 604 or its parent company will brand the product by placing a trademark or company logo on the approved personalized sound management product 602. The trademark or logo represents the incorporation of its personalized sound management technology in the product (hardware, software, and intellectual property) as well as the certification indicating the quality and reliability of the device.

Figure 7A:
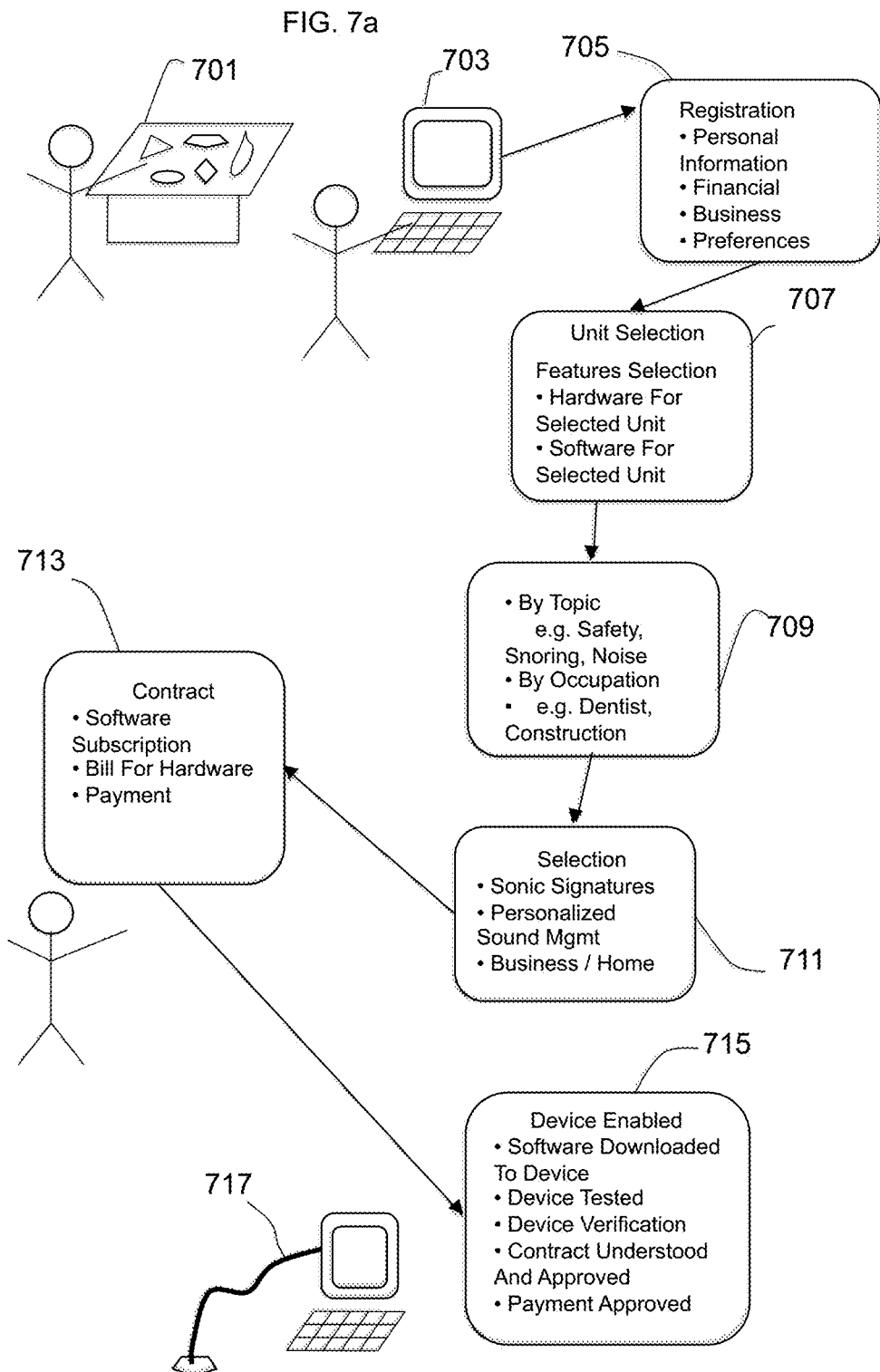
FIGS. 7a and 7b are diagrams illustrating a consumer purchase process in accordance with at least one exemplary embodiment.

FIG. 7a is a diagram illustrating a consumer purchase process for a personalized sound management product in accordance with at least one exemplary embodiment. A consumer reviews a number of different devices such as earpieces in a display area. The display area allows the consumer to look, feel, and touch the hardware. The consumer focuses on an earpiece 701 in the display area and wants to learn more about the device.

A sales person can demonstrate earpiece 701 allowing the consumer to test the functions and performance of the device. A demonstration room or test environment can be used to illustrate performance differentiation when compared to other earpieces. In at least one exemplary embodiment, earpiece 701 is an in-ear device that has a removable and disposable sealing section. This allows consumer testing using earpiece 701 while maintaining a sanitary condition by disposing of the sealing section after each test session.

The consumer indicates to the sales person that he or she would like to purchase earpiece 701. The sales person accesses a computer that is coupled to server system for completing a purchase transaction. The consumer provides registration information that is entered into a database in a step 703. The consumer or the sales person can enter the information into the database. The registration information 705 comprises information such as personal, financial, business, and preference. Personal information relates to data such as age, sex, home address, telephone number, email address, which identifies the consumer. Financial information relates the consumer's ability to pay such as credit history, credit card for billing, job information, and banking institutions. Business information relates to a business purchase of the component. Similar to above, business identification and business financial information would be entered with the purchase. Preferences relate to things such as how the consumer wants to be contacted (email, phone), do they want to be made aware of upgrades for their device, and other products they might have interest in. Other information or user experiences could also be collected during the registration process.

The unit selected by the consumer is then entered into the system in a step 707. In at least one exemplary embodiment, the system identifies the unit and provides a listing of the hardware, software, and subsystems that work with the earpiece 701. The consumer can look at the options available in a step 709 and select among these options. In at least one exemplary embodiment, the selection process can be facilitated by topic, occupation, or other characteristics by providing a list of typical user features applied to earpiece 701. For example, the consumer is purchasing earpiece 701 for a multimedia player. Earpiece 701 provides a substantial improvement in noise attenuation, musical clarity, definition, and dynamic range. The consumer is interested in the safety aspect (and selects this topic on the kiosk) provided by earpiece 701 in alerting the user to an emergency event. For example, earpiece 701 can detect and make the user aware of sirens, emergency sounds, alarms, etc. that would be difficult to hear when listening to music. The consumer by looking at the "safety" topic can select appropriate applications software and sonic signatures to alert the user of a safety situation for their specific device. The consumer can continue to look through other topics and select hardware and software that supplements and implements the desired user experience.

As mentioned previously, the options can be provided in a step 709 in many different formats. Another format of providing options is by occupation. For example, a dentist may be provided a package to outfit the entire office and patients. The earpieces substantially reduce noise related to drilling which are both a psychological barrier for dentistry and a hearing loss mechanism for people working in a dentist office. The occupation package can provide wireless communication between devices allowing dentists, assistants, and patients to talk or listen to music even in a noisy environment. Replaceable in-ear sealing sections would allow the staff to maintain sanitary conditions with each new patient. After reviewing the consumer selects the appropriate hardware and software to personalize their sound space (on the kiosk or computer) in a step 711.

In at least one exemplary embodiment, the selected application software provided to earpiece 701 is a subscription whereby the consumer pays a monthly fee to use the applications. Alternately, the selected application software can be a license or purchase associated with the earpiece 701 whereby a one time fee is paid. The consumer can discuss the terms of the agreement with the sales person or review the contract on the computer. If the consumer approves, the contract is signed or accepted and an initial payment is made for the hardware and software in a step 713. The consumer can have the subscription payment automatically billed to a credit card or other automatic payment methodology to ensure uninterrupted service.

The purchased earpiece is then connected via a wired or wireless connection to download the selected software and enabled in a step 715. A wired connection 717 such as a mini USB cable is shown in the illustration. Wired connection 717 connects to a server system having the appropriate software. In at least one exemplary embodiment, the selections from step 711 can be stored in memory and used to direct the downloading of software to the device, verify the software can be used in the device, and that the appropriate software has been loaded.

Figure 7B:
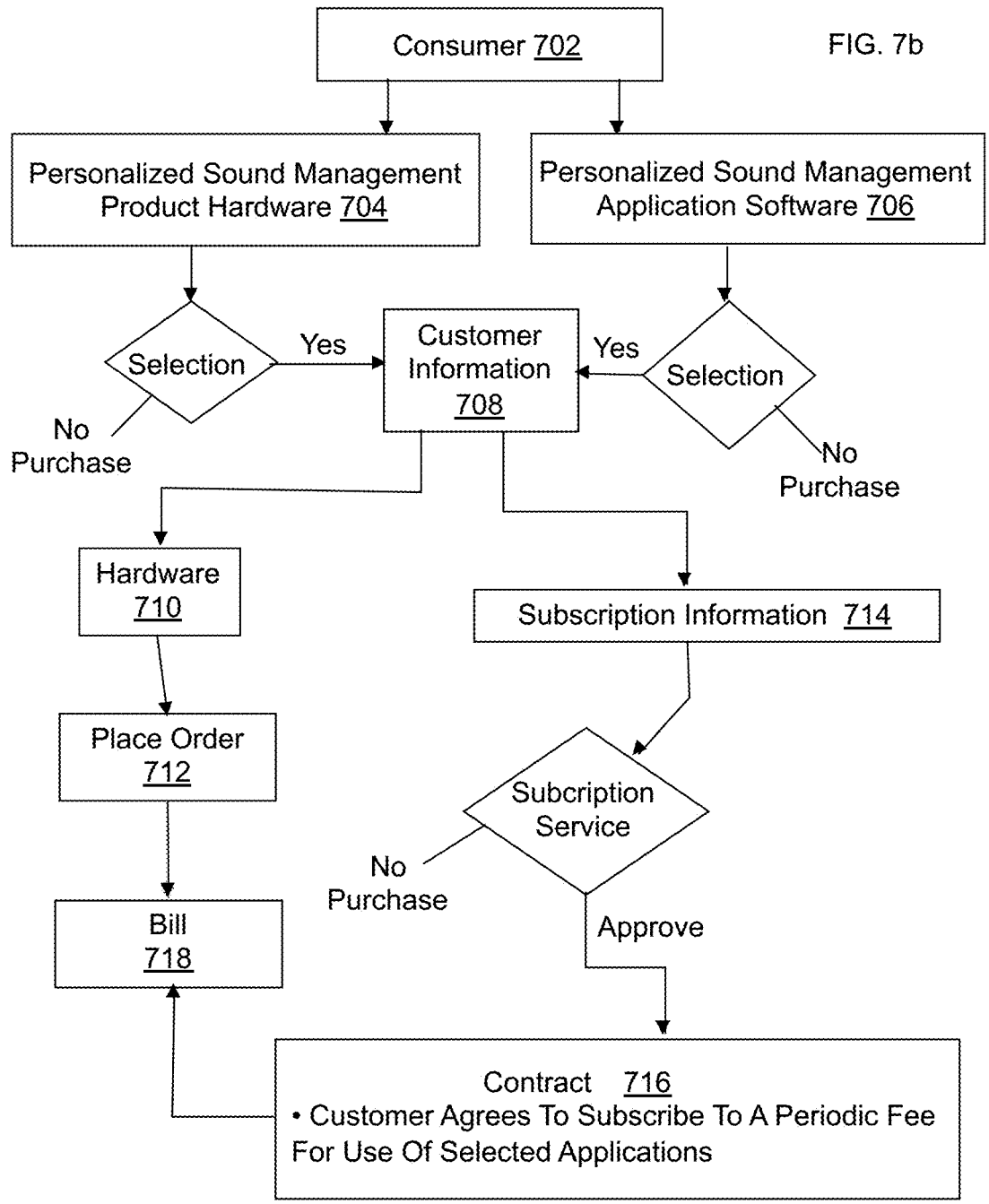

FIG. 7b is a diagram illustrating a consumer purchase process for a personalized sound management product in accordance with at least one exemplary embodiment. A consumer 702 can purchase personalized sound management product hardware 704 and personalized sound management application software 706. Software 706 works with hardware 704 to personalize and manage sound for consumer 702 for providing utility, safety, and health benefits.

Hardware 704 can range from a complete product such as a communication device, sound device, or earpiece to ancillary components for enhancing the look of the device or adding further hardware features. In the event that consumer 702 purchases hardware 704, customer information 708 is required to continue with purchase. In general, customer name, address, personal information and financial information are typically required to purchase hardware 704. Other information can also be collected through a questionnaire or some form of incentive. Should customer information 708 exist and consumer 702 is in good stead then generating customer information 708 is not required and the order process continues. Any issue that occurs in checking customer information 708 will be brought up for rectification to consumer 702. The hardware 710 that consumer 702 selected is verified and place order 712 is performed.

Personalized sound management application software 706 is a suite of applications that consumer 702 selects for their specific needs. Once customer information 708 has been established, consumer 708 is provided subscription information 714. Use of personalized sound management application software 706 is based on a periodic fee or subscription (for example, a monthly fee). Subscription information 714 informs consumer 702 as to the periodic subscription fees associated with the software 706, terms of use, bundled packages of applications, and other pertinent information to complete the decision process. Should consumer 702 approve of the terms, a contract 716 is provided to the customer to accept or decline. A bill 718 is generated when an order is placed either through purchasing hardware 710, accepting a subscription to personalized sound management application software 706, or both. In at least one exemplary embodiment, the purchase process is web based allowing consumer 702 to purchase from a client system via a communication path such as the internet or communication network.

Figure 8:
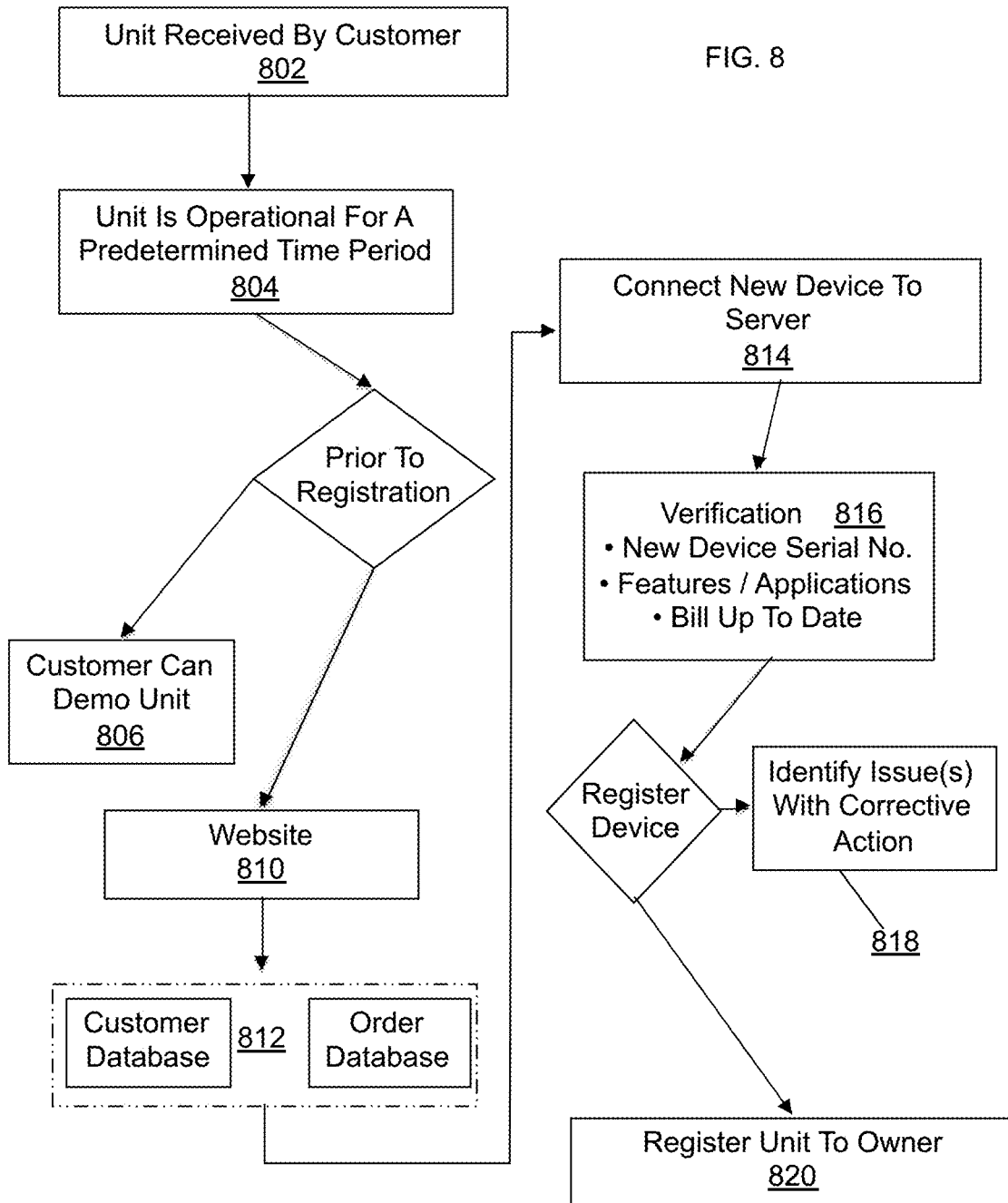
FIG. 8 illustrates a flow chart of registering a new device that includes personalized sound management applications in accordance with at least one exemplary embodiment.

FIG. 8 is a diagram illustrating registering a new device that includes personalized sound management applications in accordance with at least one exemplary embodiment. A new device or unit is received by a customer 802. The manufacturer has loaded the preordered personalized sound management applications chosen by customer 802 into the unit. Typically, customer 802 is going to want to try the unit shortly after receiving it (e.g., the unit is operational for a predetermined period of time 804, for example 1 week). In at least one exemplary embodiment, customer 802 can try the unit for a predetermined time period 804. In general, the time period 804 (for example, 15-30 minutes) is long enough for customer 802 to get a feel for the unit but is not a useful length of time. Furthermore, the unit will notify customer 802 through a transducer on the unit that they must register the device and that the unit will not be usable after the predetermined time period. Note that in at least one exemplary embodiment the customer would have the opportunity to demo certain features (806) not purchased.

In at least one exemplary embodiment, a website 810 is a portal to register the unit purchased by customer 802. Website 810 can have a web page devoted to registering new devices to simplify the process. Customer 802 may log in (if an account already exists) or provide personal information related to the registering process. A database 812 is accessed that includes both customer and order information in one or more databases. In at least one exemplary embodiment, the unit is in communication with the device manufacturer server 814 through website 810 or coupled thereto through a customer system.

Verification 816 verifies that all information is correct and that there are no pending issues 818 with a corrective action identified. The verification process 816 can checks things like device serial number, features and applications ordered by customer 802, personal/financial information. Once verification 816 is complete, it is determined at step 817 whether to register the device. Step 817 proceeds to step 820 if there are no pending issues 818. Registration 820 registers the unit to the owner after verification 816 is complete.

Figure 9:
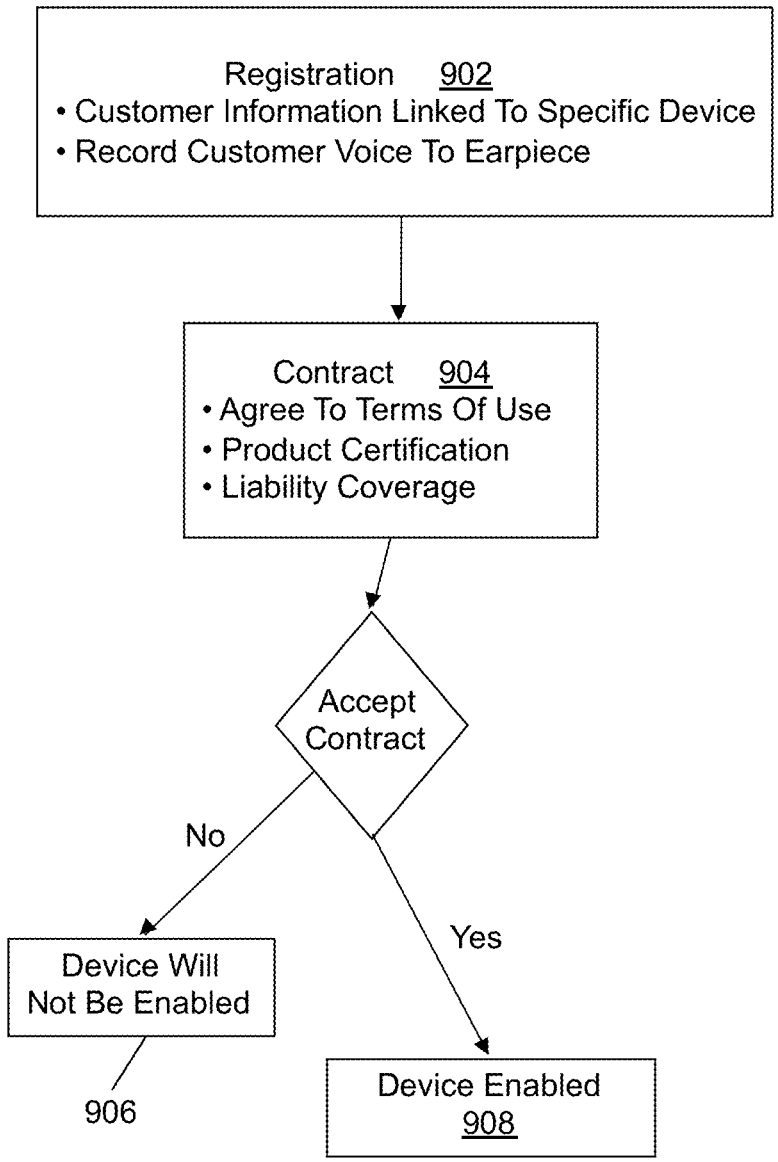
FIG. 9 illustrates a flow chart of enabling the new device in accordance with at least one exemplary embodiment.

FIG. 9 is a diagram illustrating enabling a device in accordance with at least one exemplary embodiment. In general, registration 902 links customer information to a device as disclosed in FIG. 8. The registration process includes a comprehensive legally-compliant, state-specific Informed Consent system for collecting and storing the Informed Consent of users.

In at least one exemplary embodiment, the device will have at least one microphone. In the process of registration 902 the customer voice is recorded by the device. The customer voice can be stored on the device and to the customer database. The customer voice can be used for a number of applications including voice verification to use the device thereby acting as a deterrent for others to use or steal the device.

As mentioned in FIG. 8 the unit or device can be enabled for a predetermined time period. Prior to enabling the new device, a contract 904 is provided for customer review. The contract outlines the terms of use for using the device and that the product had been certified through a rigorous testing process. In at least one exemplary embodiment, liability coverage may be provided to the customer if the contract is accepted. Having the liability coverage in conjunction with the certification process is powerful in building consumer confidence about personalized sound management.

At step 905, it is determined whether the contract is accepted. The new device is not enabled 906 if the customer does not accept contract 904. The new device is enabled 908 if the customer accepts contract 904. In at least one exemplary embodiment, the registration and enabling of the unit is through a client system coupled to the business server. Thus, the unit is enabled remotely.

Figure 10:
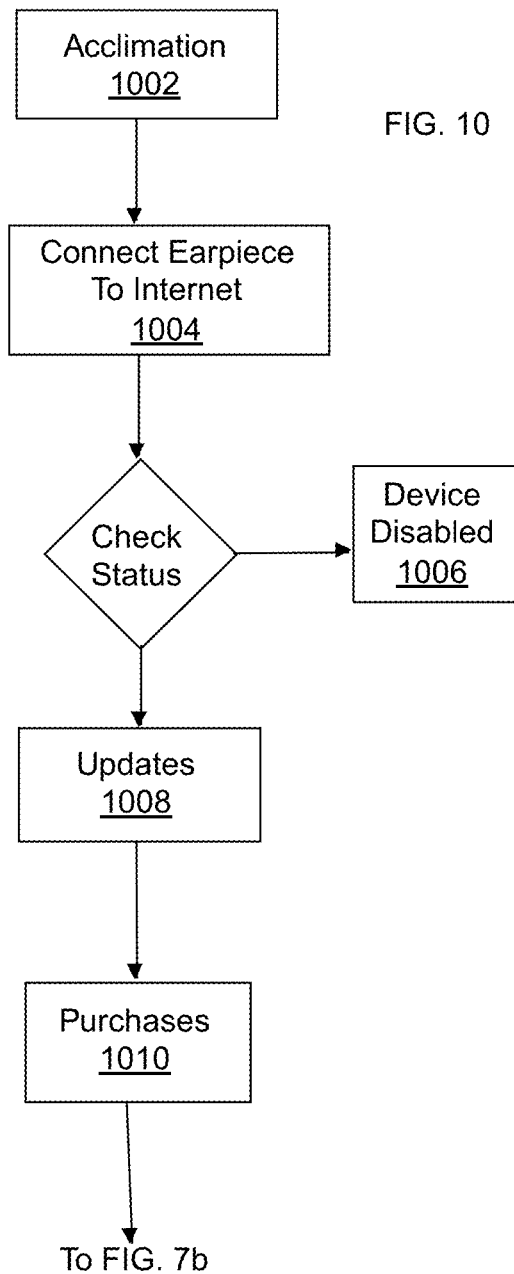
FIG. 10 illustrates a flow chart of updating a unit or device in accordance with at least one exemplary embodiment.

FIG. 10 is a diagram illustrating updating a unit or device in accordance with at least one exemplary embodiment. The device is enabled for use. In general, instructions or an operational video may be provided for a user to get acquainted with the device. Even with this help, a device may have so many features and applications that the user could get overwhelmed or frustrated trying to understand and operate the unit. In some cases, a user may not want even try to learn how to operate all the features and initially start out with the application that provides significant utility to the user. The user may never address learning how to use all the capabilities of the device. Moreover, misuse of a device can lead to dangerous operating conditions that could cause a serious or harmful situation.

Acclimation 1002 is a process to ensure that a user of a device appreciates the entire feature set but more particularly, enables the features in a way that ensures proper usage in a safe and structured manner. In at least one exemplary embodiment, acclimation 1002 comprises two components, a learning module and a reminder module. The learning module is a system that "teaches" the user of the device the functional components of the device. In at least one exemplary embodiment, the learning module may incorporate a learning system that evaluates the user in the domain of a particular competency before certain functions or features of the device are enabled. For example, features of the device are enabled sequentially, either automatically after the user has utilized a particular function for a predetermined time (thereby showing competency in using the feature) or following a user competency evaluation, which can be invoked either manually (when the user is confident in using the feature) or automatically.

The reminder module may or may not be used in acclimation 1002. The reminder serves to remind the user of the correct usage of features and also serves to remind the user of other features on the device which the user may not have used in a given time period. In at least one exemplary embodiment an evaluation is invoked based on a predetermined time period. The evaluation may be for a single function or feature or a combination of different functions. The predetermined time period before evaluating can vary depending on the function. Alternatively, the evaluation may be invoked based on a particular recent event, such as a software upgrade, or a detected change in user usage. If the user passes the evaluation, the evaluation may be repeated, the relevant learning mode for the corresponding function to which the users competency was evaluated may be repeated, or the corresponding function to which the users competency was evaluated may be disabled. Thus, acclimation 1002 allows a user to learn the device at a friendly pace, ensures that the user does know how to use a feature, and protects the user from using the device in a manner that could be harmful.

The device can be coupled 1004 from a client system to the business server to update software on the device or purchase new hardware and software. As disclosed hereinabove, the user information is checked to determine if there are any issues that need to be rectified (e.g. missed payment, user does not match to device, etc. . . . ). In the event that the issues cannot be rectified the device is disabled in a step 1006. In at least one exemplary embodiment, the user information, device, and personalized sound management applications correlate. The server checks for updates 1008 for the device and downloads updates to the device. The user goes through a similar process as described in FIGS. 7A-7B for a hardware or software purchase 1010 including agreeing to a contract to subscribe and contract to terms of use as described in FIG. 9.

Figure 11:
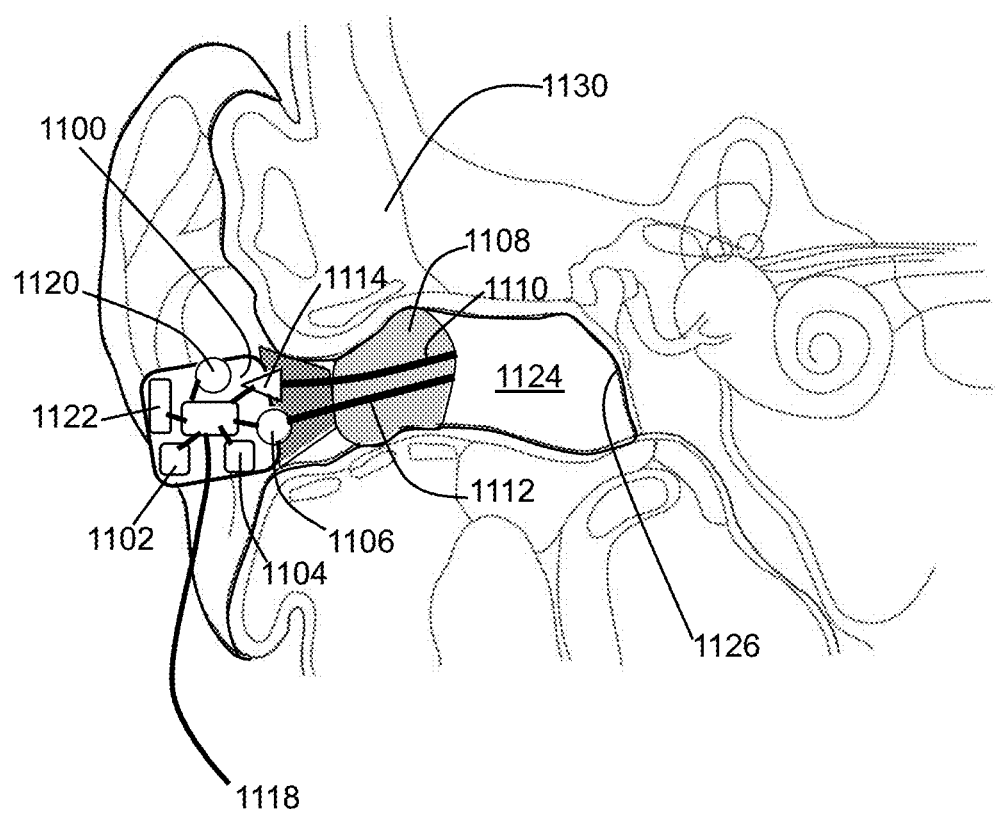
FIG. 11 illustrates a diagram of a device for implementing personalized sound management in accordance with at least one exemplary embodiment.

FIG. 11 is a diagram illustrating a device for implementing personalized sound management in accordance with at least one exemplary embodiment. The device is generally indicated as an earpiece that partially seals or seals a user's ear canal 1124 and is constructed and operates in accordance with at least one exemplary embodiment of the invention. As illustrated, the earpiece comprises an electronic housing unit 1100 and a sealing unit 1108. The earpiece depicts an electro-acoustical assembly for an in-the-ear acoustic assembly, as it would typically be placed in an ear canal 1124 of a user 1130. The earpiece can be an in the ear earpiece, behind the ear earpiece, receiver in the ear, partial-fit device, or any other suitable earpiece type. The earpiece can partially or fully occlude ear canal 1124, and is suitable for use with users having healthy or abnormal auditory functioning.

The earpiece includes an Ambient Sound Microphone (ASM) 1120 to capture ambient sound, an Ear Canal Receiver (ECR) 1114 to deliver audio to an ear canal 1124, and an Ear Canal Microphone (ECM) 1106 to capture and assess a sound exposure level within the ear canal 1124. The earpiece can partially or fully occlude the ear canal 1124 to provide various degrees of acoustic isolation. In at least one exemplary embodiment, the assembly is designed to be inserted into the user's ear canal 1124, and to form an acoustic seal with the walls of the ear canal 1124 at a location between the entrance to the ear canal 1124 and the tympanic membrane 1126 (or ear drum). In general, such a seal is typically achieved by means of a soft and compliant housing of sealing unit 1108.

Sealing unit 1108 is an acoustic barrier having a first side corresponding to ear canal 1124 and a second side corresponding to the ambient environment. In at least one exemplary embodiment, sealing unit 1108 includes an ear canal microphone tube 1112 and an ear canal receiver tube 1110. Sealing unit 1108 creates a closed cavity of approximately 5 cc between the first side of sealing unit 1108 and the tympanic membrane 1126 in ear canal 1124. As a result of this sealing, the ECR (speaker) 1114 is able to generate a full range bass response when reproducing sounds for the user. This seal also serves to significantly reduce the sound pressure level at the user's eardrum 1126 resulting from the sound field at the entrance to the ear canal 1124. This seal is also a basis for a sound isolating performance of the electro-acoustic assembly.

In at least one exemplary embodiment and in broader context, the second side of sealing unit 1108 corresponds to the earpiece, electronic housing unit 1100, and ambient sound microphone 1120 that is exposed to the ambient environment. Ambient sound microphone 1120 receives ambient sound from the ambient environment around the user.

Electronic housing unit 1100 houses system components such as a microprocessor 1116, memory 1104, battery 1102, ECM 1106, ASM 1120, ECR 1114, and user interface 1122. Microprocessor 1116 (or processor 1116) can be a logic circuit, a digital signal processor, controller, or the like for performing calculations and operations for the earpiece. Microprocessor 1116 is operatively coupled to memory 1104, ECM 1106, ASM 1120, ECR 1114, and user interface 1122. A wire 1118 provides an external connection to the earpiece. Battery 1102 powers the circuits and transducers of the earpiece. Battery 1102 can be a rechargeable or replaceable battery.

In at least one exemplary embodiment, electronic housing unit 1100 is adjacent to sealing unit 1108. Openings in electronic housing unit 1100 receive ECM tube 1112 and ECR tube 1110 to respectively couple to ECM 1106 and ECR 1114. ECR tube 1110 and ECM tube 1112 acoustically couple signals to and from ear canal 1124. For example, ECR 1114 outputs an acoustic signal through ECR tube 1110 and into ear canal 1124 where it is received by the tympanic membrane 1126 of the user of the earpiece. Conversely, ECM 1106 receives an acoustic signal present in ear canal 1124 though ECM tube 1112. All transducers shown can receive or transmit audio signals to a processor 1116 that undertakes audio signal processing and provides a transceiver for audio via the wired (wire 1118) or a wireless communication path.

The earpiece can actively monitor a sound pressure level both inside and outside an ear canal 1124 and enhance spatial and timbral sound quality while maintaining supervision to ensure safe sound reproduction levels. The earpiece in various embodiments can conduct listening tests, filter sounds in the environment, monitor warning sounds in the environment, present notification based on identified warning sounds, maintain constant audio content to ambient sound levels, and filter sound in accordance with a Personalized Hearing Level (PHL).

The earpiece can generate an Ear Canal Transfer Function (ECTF) to model the ear canal 1124 using ECR 1114 and ECM 1106, as well as an Outer Ear Canal Transfer function (OETF) using ASM 1120. For instance, the ECR 1114 can deliver an impulse within the ear canal 1124 and generate the ECTF via cross correlation of the impulse with the impulse response of the ear canal 1124. The earpiece can also determine a sealing profile with the user's ear to compensate for any leakage. It also includes a Sound Pressure Level Dosimeter to estimate sound exposure and recovery times. This permits the earpiece to safely administer and monitor sound exposure to the ear.

In at least one exemplary embodiment, the earpiece has a number of sonic signatures stored in memory. ASM 1120 is providing acoustic information from the ambient environment to processor 1116. Processor 1116 analyses the acoustic information for a sound similar to the sonic signature. Once identified, the earpiece will provide a response to the sound based on the application. In a first exemplary embodiment, the earpiece will reduce music or telephone call (or the dominant source of sound being provided by the earpiece) and amplify the identified signal (ambulance or police car) thereby notifying the user of the approaching vehicle. In a second exemplary embodiment, the earpiece will tell the user (through a synthesized voice) that an ambulance or police car is approaching including the direction of the vehicle. The earpiece can also provide the identified signal with the voice warning. Other variations are possible.

Conversely, the earpiece can perform the opposite operation. The earpiece can identify a signal similar to the sonic signature and then attenuate it before providing it through ECR 1114. For example, the user of the earpiece is a gun enthusiast. The user downloads a sonic signature related to a gun shot. The earpiece upon identifying the sound of the gun shot would attenuate the portion of the acoustic information provided by ASM 1120 similar to the sonic signature of the gun shot while allowing other signals to come through. Thus, the user could engage in a conversation at the gun range with the gun shot sounds attenuated while passing the conversation through the earpiece thereby protecting his ear from the loud sounds in this environment and being able to hear the conversation with more clarity.

In at least one exemplary embodiment, the earpiece can manually or automatically record, measure sound pressure levels, attach metadata (including time stamp and geocode), and upload the information when a communication path is present to a sound database. The earpiece is capable of running personalized sound management software disclosed herein. Moreover, hardware ingredients such as the transducers (ECR 1114, ASM 1120, and ECM 1106), processor 1116, and sealing unit 1108 are provided to manufacturers as disclosed in FIG. 3 for allowing a variety of companies to manufacture devices of their own earpiece designs. It should be noted that although an earpiece is used as an example of a personalized sound management device the components can be used in other communication devices and sound devices to personalize control of the sound.

In at least one exemplary embodiment, sealing section 1108 is a replaceable unit. Sealing section 1108 can pull out and be replaced as a unit. Sealing section 1108 performance can degrade over time due to particulate build up. There may also be sanitary or health reasons for replacing sealing section 1108 periodically. In at least one exemplary embodiment, sealing section 1108 replacement parts can be provided as part of a periodic subscription fee to a user, purchased over the counter in a store, or purchased through a web environment.

Figure 12:
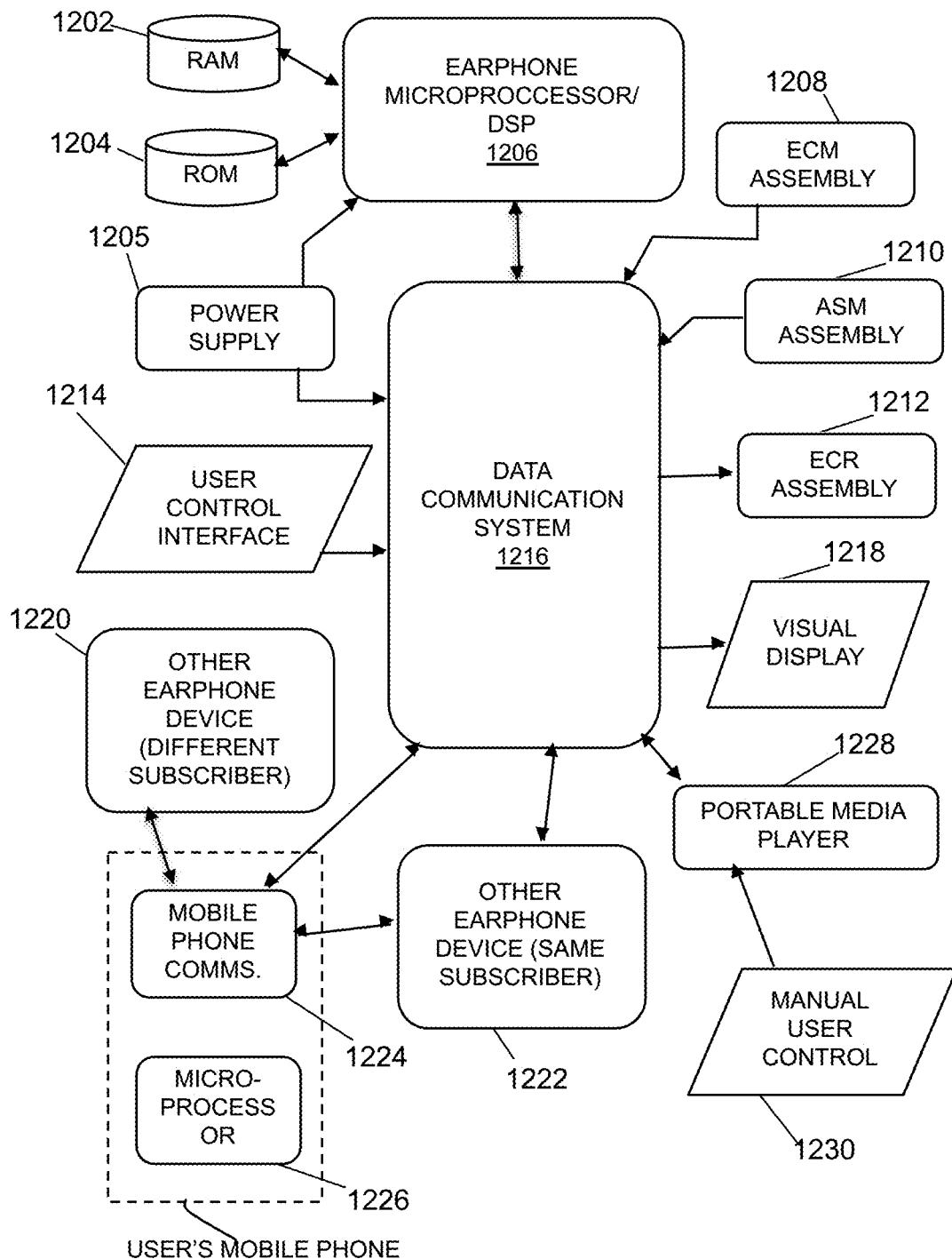
FIG. 12 illustrates a block diagram of a device for implementing personalized sound management in accordance with at least one exemplary embodiment.

FIG. 12 is a block diagram of a device for implementing personalized sound management in accordance with at least one exemplary embodiment. A power supply 1205 powers components of the earpiece including microprocessor/DSP 1206 (or processor 1206) and a data communication system 1216. As illustrated, the earpiece can include the processor 1206 operatively coupled through a data communication system 1216 to an ASM 1210, an ECR 1212, and ECM 1208. Data communication system 1216 can include one or more Analog to Digital Converters and Digital to Analog Converters (DAC). The processor 1206 can utilize computing technologies such as a microprocessor, Application Specific Integrated Chip (ASIC), and/or digital signal processor (DSP) with associated Random Access Memory (RAM) 1202 and Read Only Memory 1204. Other memory types such as Flash, non-volatile memory, SRAM, DRAM or other like technologies can be used for storage with processor 1206. The processor 1206 can also include a clock to record a time stamp.

In general, a data communication system 1216 is a communication pathway to components of the earpiece and components external to the earpiece. The communication link can be wired or wireless. In at least one exemplary embodiment, data communication system 1216 is configured to communicate with ECM assembly 1208, ASM assembly 1210, visual display 1218, and user control interface 1214 of the earpiece. As shown, user control interface 1214 can be wired or wirelessly connected. In at least one exemplary embodiment, data communication system 1216 is capable of communication to devices exterior to the earpiece such as the user's mobile phone 1232, a second earpiece 1222, and a portable media player 1228. Portable media player 1228 can be controlled by a manual user control 1230.

The user's mobile phone includes a mobile phone 1232 communication system 1224. A microprocessor 1226 is operatively coupled to mobile phone communication system 1224. As illustrated multiple devices can be wirelessly connected to one another such as an earpiece 1220 worn by another person to the user's mobile phone 1232. Similarly, the user's mobile phone 1232 can be connected to the data communication system 1216 of the earpiece as well as the second earpiece 1222. This connection would allow one or more people to listen and respond to a call on the user's mobile phone 1232 through their respective earpieces.

As illustrated, a data communication system 1216 can include a voice operated control (VOX) module to provide voice control to one or more subsystems, such as a voice recognition system, a voice dictation system, a voice recorder, or any other voice related processor. The VOX module can also serve as a switch to indicate to the subsystem a presence of spoken voice and a voice activity level of the spoken voice. The VOX can be a hardware component implemented by discrete or analog electronic components or a software component. In one arrangement, the processor

1206 can provide functionality of the VOX by way of software, such as program code, assembly language, or machine language.

ROM 1204 can be used to store personalized sound management applications to minimize the possibility of modification and tampering of the code. The RAM 1202 can also store program instructions for execution on the processor 1206 as well as captured audio processing data. For instance, memory RAM 1202 and ROM 1204 can be off-chip and external to the processor 1206 and include a data buffer to temporarily capture the ambient sound and the internal sound, and a storage memory to save from the data buffer the recent portion of the history in a compressed format responsive to a directive by the processor. The data buffer can be a circular buffer that temporarily stores audio sound at a current time point to a previous time point. It should also be noted that the data buffer can in one configuration reside on the processor 1206 to provide high speed data access. The storage memory can be non-volatile memory such as SRAM to store captured or compressed audio data. The non-volatile memory could also be used to store sonic signatures.

Data communication system 1216 can include an audio interface operatively coupled to the processor 1206 and the VOX to receive audio content, for example from portable media player 1228, cell phone 1232, or any other communication device, and deliver the audio content to the processor 1206. The processor 1206 responsive to detecting voice-operated events from the VOX can adjust the audio content delivered to the ear canal of the user of the earpiece. For instance, the processor 1206 (or the VOX of data communication system 1216) can lower a volume of the audio content responsive to detecting an event such as a sonic signature for transmitting the acute sound to the ear canal of the user. The processor 1206 by way of the ECM 1208 can also actively monitor the sound exposure level inside the ear canal and adjust the audio to within a safe and subjectively optimized listening level range based on voice operating decisions made by the VOX of data communication system 1216.

The earpiece and data communication system 1216 can further include a transceiver that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver can also provide support for dynamic downloading and uploading over-the-air to the earpiece. It should be noted also that next generation access technologies also can be applied to the present disclosure.

Data communication system 1216 can also include a location receiver that utilizes common technology such as a common GPS (Global Positioning System) receiver that can intercept satellite signals and therefrom determine a location fix of the earpiece and provide a geocode as an identifier for a recording or measurement such as sound pressure level.

The power supply 1205 can utilize common power management technologies such as replaceable batteries, supply regulation technologies, and charging system technologies for supplying energy to the components of the earpiece and to facilitate portable applications. A motor (not shown) can be a single supply motor driver coupled to the power supply 1205 to improve sensory input via haptic vibration. As an example, the processor 1206 can direct the motor to vibrate responsive to an action, such as a detection of a warning sound or an incoming voice call.

The earpiece can further represent a single operational device or a family of devices configured in a master-slave arrangement, for example, a mobile device and an earpiece. In the latter embodiment, the components of the earpiece can be reused in different form factors for the master and slave devices.

Figure 13:
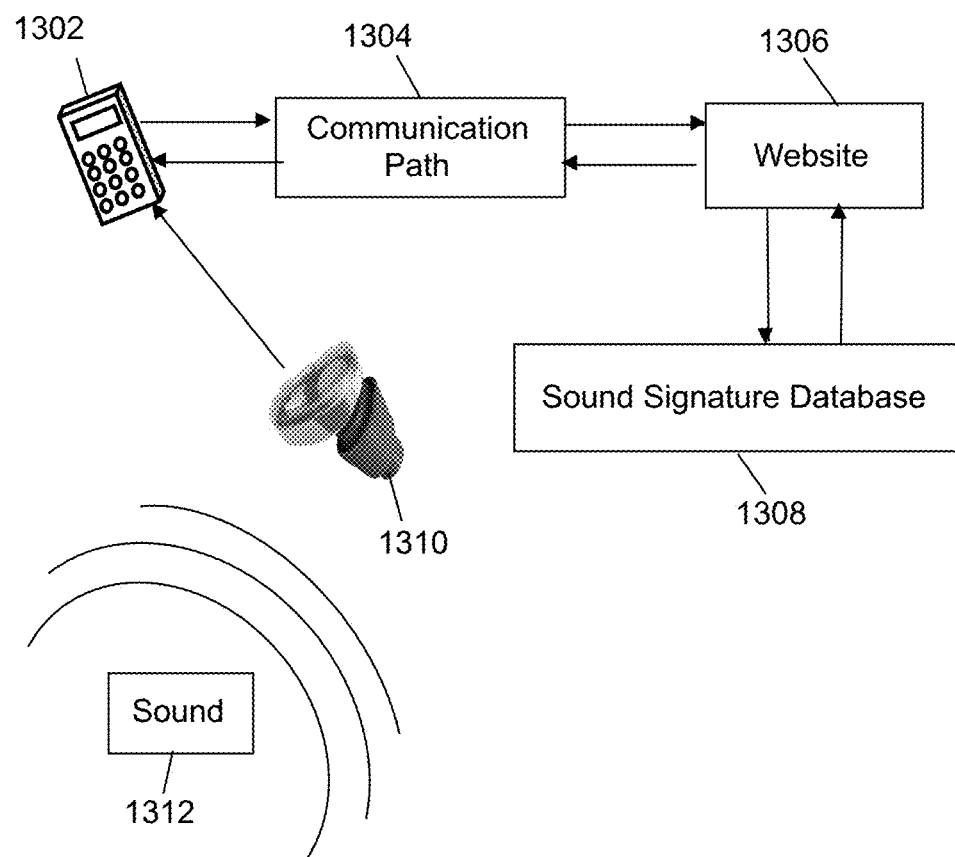
FIG. 13 illustrates a diagram of a communication device or earpiece configured to provide sonic signatures to a sonic signature database in accordance with at least one exemplary embodiment.

FIG. 13 is a diagram of a communication device 1302 or earpiece 1310 configured to provide sonic signatures to sonic signature database 1308 in accordance with at least one exemplary embodiment. Collecting a large number of sounds around the world is a daunting task. As mentioned previously, no group or business entity would have the ability to acoustically map the world on a continuous basis. In at least one exemplary embodiment, the collection of sonic signatures is achieved by mobilizing as many people as possible by making it simple to capture and provide a sound for sonic signature database 1308. This is achieved by adapting a common device having a potential of reaching billions of people for manually or automatically capturing sonic signatures and providing them to database 1308.

In at least one exemplary embodiment, communication device 1302 is a mobile communication device having a microphone for receiving sound. Examples of a communication device 1302 are a phone, cell phone, PDA, computer, two way radio, smart phone, and earpiece. Earpiece 1310 includes a microphone for capturing sound and the circuitry disclosed in FIG. 12. Earpiece 1310 is operably configured for recording sound and measuring sound pressure levels. The acoustic information received from the microphone of earpiece 1310 is recorded to memory residing in earpiece 1310 and tagged with metadata including a time stamp and geocode. The sound pressure level (SPL) is measured from the microphone signal through analog or digital signal processing typically before any audio processing occurs within earpiece 1310. The SPL measurement of this recorded event is associated to the stored recording and metadata. Similarly, communication device 1302 is adapted for capturing sound 1312 including recording, measuring sound pressure level, storing, and tagging with metadata (including a time stamp and geocode). In at least one embodiment, communication device 1302 could have additional circuitry similar to that in FIG. 12 in the device specifically for generating a sonic signature database. Alternately, the circuitry within communication device 1302 can be adapted for recording sound and measuring sound pressure level. In particular, mechanical aspects of the communication device such as microphone placement, microphone porting, as well as electronic audio processing (automatic gain control, equalization, etc. . . . ) is taken into account for ensuring an accurate sound pressure level measurement and recording.

In at least one exemplary embodiment, a user having communication device 1302 manually or automatically captures and provides a sonic signature to a sonic signature database 1308. For example, a microphone on communication device 1302 is always enabled for receiving sound. The sound can be stored in a buffer. The sound in the buffer is analyzed and based on a variety of criteria can be configured to be provided to database 1308. For example, criteria such as sound pressure level, time, frequency of sound, geographic location, or recognition of a sound (sonic signature detection) are but a few of the parameters that could be used to determine that the sound in the buffer is worthy of saving. Metadata is automatically attached such as a time stamp and geocode but the user can also add information. In at least one exemplary embodiment, a communication path 1304 is opened and a link is made to website 1306 and more particularly to database 1308 where the stored sounds can be automatically uploaded. In at least one exemplary embodiment, the sonic signature, sound pressure level, and metadata could be immediately sent if a communication path 1304 is available to save memory. Further communication between website 1308 and the user of communication device 1302 or earpiece 1310 can take place to edit, identify, describe, and format the provided sound 1312 at a more convenient time. It should be noted that video information that includes audio information can also be provided in similar fashion as disclosed hereinabove. The audio information from the video can be used for sonic signature database 1308.

Earpiece 1310 and communication device 1302 can be operably coupled together. A priority could be set up such that earpiece 1310 is the primary recorder of sound 1312 when enabled by the user. Earpiece 1310 can be used with other devices for example a portable media player. Earpiece 1310 can automatically or manually record, measure SPL, and tag metadata of sound 1312 as described hereinabove. The sonic signatures stored in earpiece 1310 could be sent to website 1306 and sonic signature database 1308 if earpiece 1310 is coupled to a communication path 1304 or through another device to which it is operably coupled that has a communication path. Alternately, the sonic signatures could be uploaded via website 1306 and sonic signature database 1308 at a more convenient time, for example a wired or wireless link to the user's personal computer at home, allowing the user to also provide additional metadata before providing the information. Thus, a common device has been provided that is adapted for capturing, storing, measuring SPL, adding metadata including a time stamp and geocode, and uploading the acoustic information to a database thereby including the broadest number of people across the largest geographic area for sound collection on a continuous basis.

Figure 14:
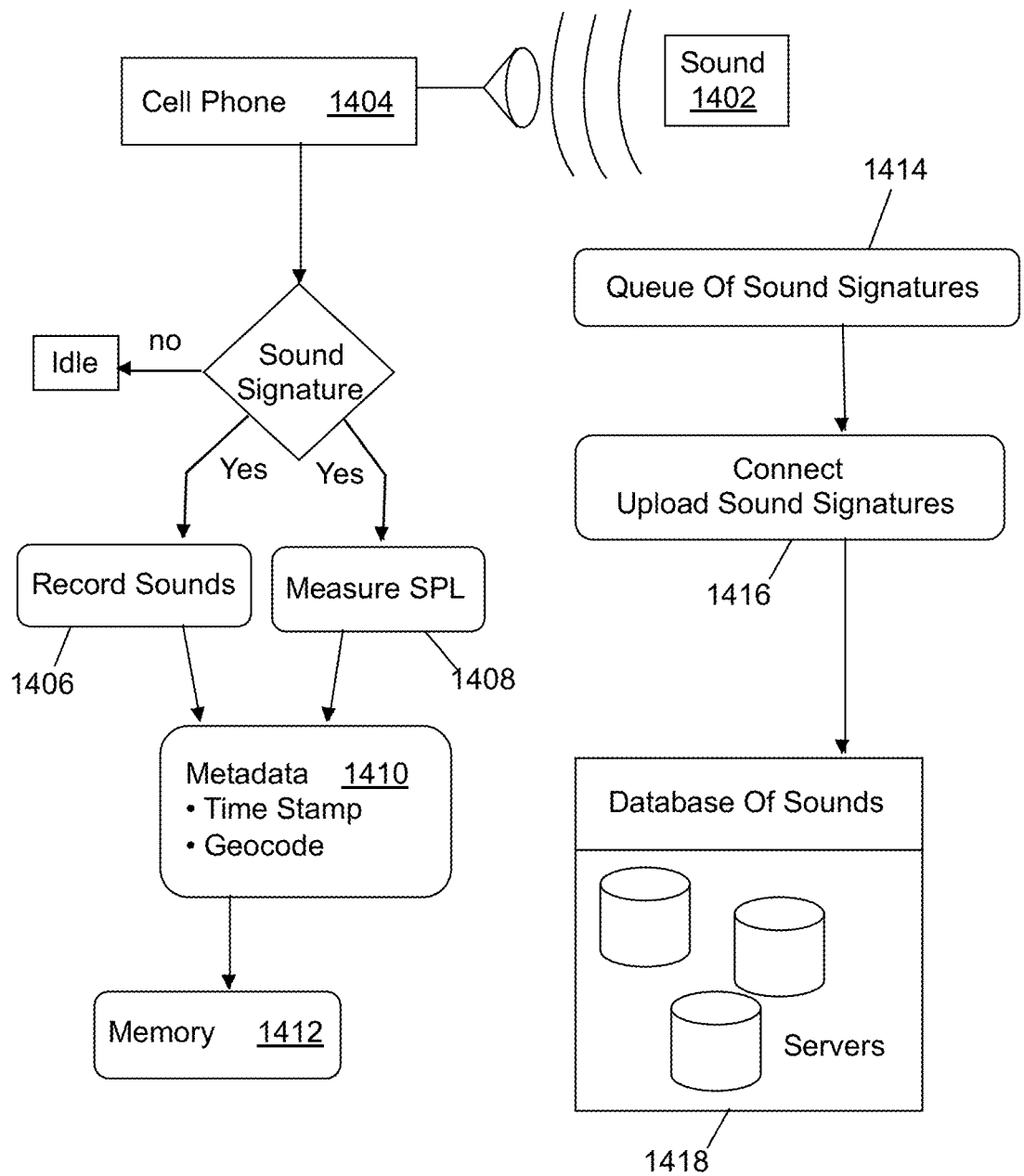
FIG. 14 illustrates a block diagram of a cell phone capturing a sonic signature and providing the sonic signature to a database of sounds in accordance with at least one exemplary embodiment.

FIG. 14 is a block diagram illustrating a cell phone 1404 capturing a sonic signature and providing the sonic signature to a database of sounds 1418 in accordance with at least one exemplary embodiment. Cell phone 1404 is enabled for capturing a sonic signature via an exclusive button or through an automatic process. In at least one exemplary embodiment, the user can select whether a sound is recorded, a sound pressure level measurement is recorded, or both are acquired. A default can be that both are acquired automatically.

A sound 1402 is received by a microphone on cell phone 1404 and stored in a buffer in a record sounds step 1406. The sound in the buffer is analyzed and determined to be saved. The sound pressure level (SPL) of the sonic signature is measured or calculated in a measure SPL step 1408. The user can also manually enter metadata 1410 via a keyboard to a metadata table or can enter vocal description in an attached audio stream. Metadata 1410 includes a time stamp and a geocode corresponding to the sonic signature.

In at least one exemplary embodiment, the sonic signature, sound pressure level, and metadata can be stored in memory 1412 that resides on cell phone 1404. A queue of sonic signatures 1414 can be stored in memory 1412 for uploading at an appropriate time. The user can initiate uploading of the queue of sonic signatures 1414 to database of sounds 1418 when a communication path is completed. In at least one exemplary embodiment, cell phone 1404 can automatically connect 1416 to servers in database of sounds 1418 and upload queue of sonic signatures 1414 when a communication path is enabled. Although stored on database of sounds 1418, there may be an iterative process to determine if the sonic signatures are in the correct format or are unique enough to be permanently stored. Thus, a large database of sounds 1418 can be collected world wide by an automatic process using a common device such as a cell phone that could not be accomplished by direct means. In at least one exemplary embodiment, the database of sounds 1418 is used in conjunction with personalized sound management applications configured to provide sonic signatures for identifying and providing a response to the identified sound.

To encourage retailers to actively engage and participate in selling Hearium Labs branded products, a business model has been developed based on an annuity revenue sharing methodology. Through this patent pending approach, for the first time, retailers, operators and other suppliers will be able to carry a single audio earpiece or other device in their stores that can be sold to a wide and deep range of consumers. Utilizing an "iPod/iTunes" approach, suppliers will earn profit off the sale of the hardware in store and Personalized Sound Management applications at and after the point of sale. As the consumer continues to personalize their earpiece or device over time, the supplier will earn residuals of up to 50% of the application revenues through a co-operative sharing program between them and Hearium Labs.

To accomplish this, Hearium Labs has enabled the hardware solution to work off of a webified environment that is being architected with commercial flexibility for consumer driven point of sale purchase and activation. This approach allows for the Personalized Sound Management applications to be remotely downloaded and activated on the hardware through any Internet equipped PC and web-based browser. Consumers will thus be able to "enhance" their devices by adding both purchased and subscription applications and personalize their experience with technology designed to acclimate devices to the wearer and their environment.

In general, a process has been provided that eliminates barriers for mass adoption of a new technology. The result is that the technology can be provided by a number of manufacturers thereby having ubiquitous availability at release. Universal compatibility is also provided by using the same hardware and software in each new product having personalized sound management. Certification ensures that each device is manufacturable and performs to specification. Manufacturers and consumers benefit because liability coverage may be provided. Consumers can adapt to the technology rapidly through an acclimation process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

We claim:
1. A device comprising:
   a microphone configured to measure sound and generate a microphone signal;
   a user interface;
   a memory configured to store instructions;
   a data buffer configured to store at least a portion of the microphone signal;
   a second memory configured to store data;
   a processor operatively coupled to the memory, the processor operatively coupled to the audio buffer, the processor operatively coupled to the data buffer, wherein the processor is configured to execute the instructions to perform operations comprising:

receiving the microphone signal;

sending a portion of the microphone signal to the data buffer;

analyzing the data buffer for detecting a sonic signature;

retrieving sound data from the microphone if the sonic signature is detected;

sending a portion of the sound data to a remote server;

determining a user request in the portion of the sound data, wherein the determination is accomplished by the remote server or a second server;

retrieving a first data in response to the user request, wherein the remote server or the second server or a third server retrieves the first data;

sending the first data to the device and storing the first data in the second memory;

retrieving the first data from the second memory; and sending the first data to the user interface.

2. The device according to claim 1, wherein the user interface is a speaker.

3. The device according to claim 2, wherein the operations further comprise:

converting the first data into a first acoustic signal if the first data is not already in the form of an acoustic signal.

4. The device according to claim 3, wherein the operations further comprise:

sending the first acoustic signal to the speaker.

5. The device according to claim 1, wherein the user interface is a display.

6. The device according to claim 5, wherein the operations further comprise:

converting the first data into first visual data if the first data is not already in the form of visual data.

7. The device according to claim 6, wherein the operations further comprise:

sending the first visual data to the display.

8. The device according to claim 1, wherein the sonic signature is at least one word.

9. The device according to claim 8, wherein the user request is a verbal request from the user to retrieve at least one of a song, weather predictions, news, a video, or a combination thereof.

10. The device according to claim 1, wherein the user interface is an earphone.

11. The device according to claim 1, wherein the portion of the audio data includes meta data.

12. The device according to claim 1, wherein the first data includes meta data.

13. The device according to claim 1, wherein the user request is determined by the remote server by detecting additional sonic signatures in the portion of the sound data.

14. The device of claim 1, wherein the user request is determined by use of a gaussian mixture model or learned model.

15. A method comprising:

receiving a microphone signal;

sending a portion of the microphone signal to an data buffer;

analyzing the data buffer for detecting a sonic signature wherein the sonic signature is at least one word;

recording sound data if the sonic signature is detected;

adding meta data to a portion of the sound data to generate a mixed data signal;

sending the mixed data signal to a remote server;

determining a user request from the mixed data signal, wherein the determination is accomplished by the remote server;

retrieving a first data in response to the user request, wherein the remote server retrieves the first data;

sending the first data from the remote server to the device and storing the first data in a memory;

retrieving the first data from the memory; and sending the first data to the user interface.

16. The method according to claim 15, wherein the user interface is a speaker.

17. The method according to claim 16, further comprising:

converting the first data into a first acoustic signal if the first data is not already in the form of an acoustic signal; and sending the first acoustic signal to the speaker.

18. The method according to claim 15, wherein the user interface is a display.

19. The method according to claim 18, further comprising:

converting the first data into first visual data if the first data is not already in the form of visual data; and sending the first visual data to the display.

20. The method according to claim 15, wherein the user request is determined by the remote server by detecting additional sonic signatures in the portion of the sound data.

* * * * *